United States Patent
Xia et al.

(10) Patent No.: US 11,564,257 B2
(45) Date of Patent: Jan. 24, 2023

(54) COORDINATED WIFI STATIONS WITH SHARED TXOP IN TIME DOMAIN

(71) Applicant: SONY GROUP CORPORATION, Tokyo (JP)

(72) Inventors: Qing Xia, San Jose, CA (US); Mohamed Abouelseoud, San Francisco, CA (US); Liangxiao Xin, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 51 days.

(21) Appl. No.: 17/069,468

(22) Filed: Oct. 13, 2020

(65) Prior Publication Data
US 2021/0315009 A1    Oct. 7, 2021

Related U.S. Application Data

(60) Provisional application No. 63/046,010, filed on Jun. 30, 2020, provisional application No. 63/003,347, filed on Apr. 1, 2020.

(51) Int. Cl.
*H04W 12/06*    (2021.01)
*H04W 74/08*    (2009.01)
*H04W 84/12*    (2009.01)

(52) U.S. Cl.
CPC ....... *H04W 74/0816* (2013.01); *H04W 12/06* (2013.01); *H04W 84/12* (2013.01)

(58) Field of Classification Search
CPC .................................................. H04W 12/28
USPC .......................................................... 370/329
See application file for complete search history.

(56) References Cited

U.S. PATENT DOCUMENTS 10,492,223 B2 * 11/2019 Lee .................. H04W 74/0816

FOREIGN PATENT DOCUMENTS

| EP | 3123759 B1 | 5/2019 |
| WO | WO-2018075745 A1 | 4/2018 |
| WO | 2018128642 A1 | 7/2018 |

OTHER PUBLICATIONS

Nishio, Takayuki et al., "A Mechanism for Cooperation in CSMA Networks", IEICE Trans. Commun., vol. E95-B, No. 6, Jun. 6, 2012, pp. 1944-1952.

* cited by examiner

*Primary Examiner* — Dang T Ton
(74) *Attorney, Agent, or Firm* — O'Banion & Ritchey LLP; John P. O'Banion

(57) ABSTRACT

A wireless local area network (WLAN) protocol allowing a Transmit Opportunity (TXOP) holder to share the TXOP with other stations. An intent to share the TXOP is communicated to the Access Point (AP). Upon gaining channel access, the TXOP holder directly or indirectly communicates that the TXOP can be shared with other STAs, after which scheduling information (time and duration) are shared with the STAs. When the TXOP occurs, the STAs can access the channel at the time and for the duration specified, thus providing increased use of the TXOP to improve efficiency.

25 Claims, 58 Drawing Sheets

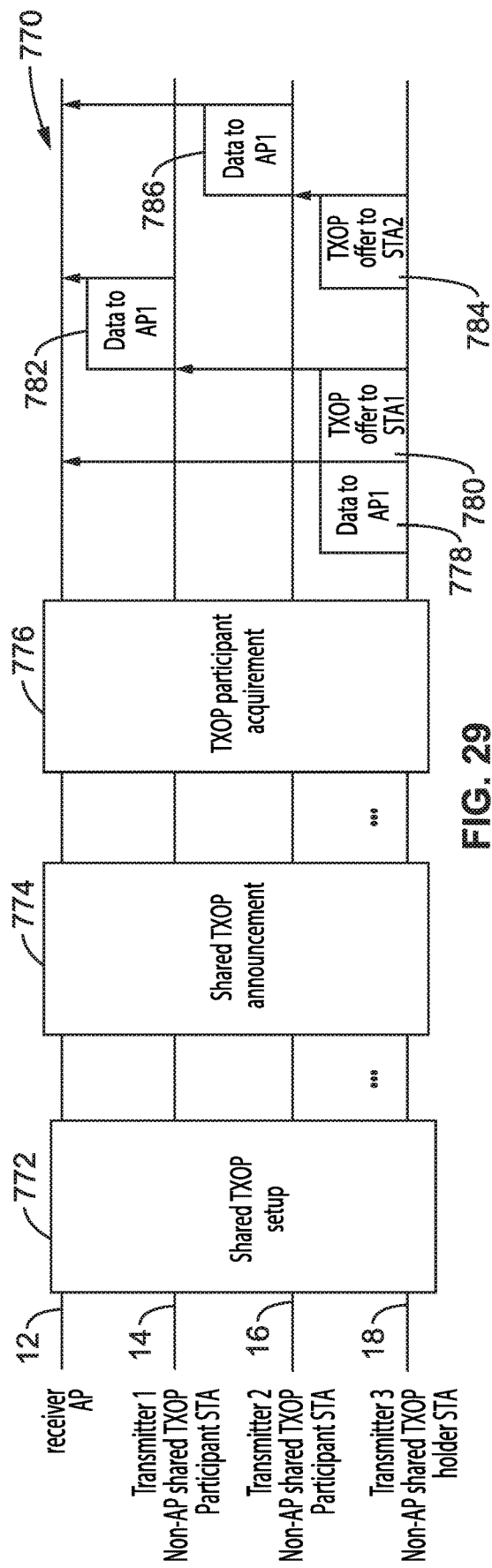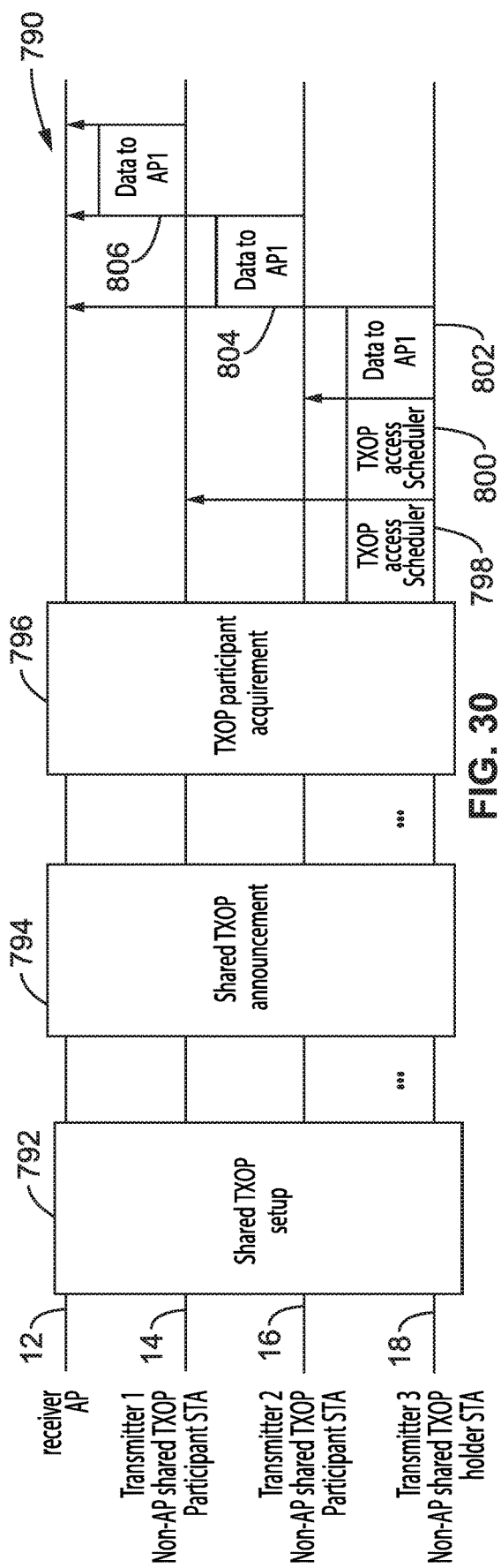

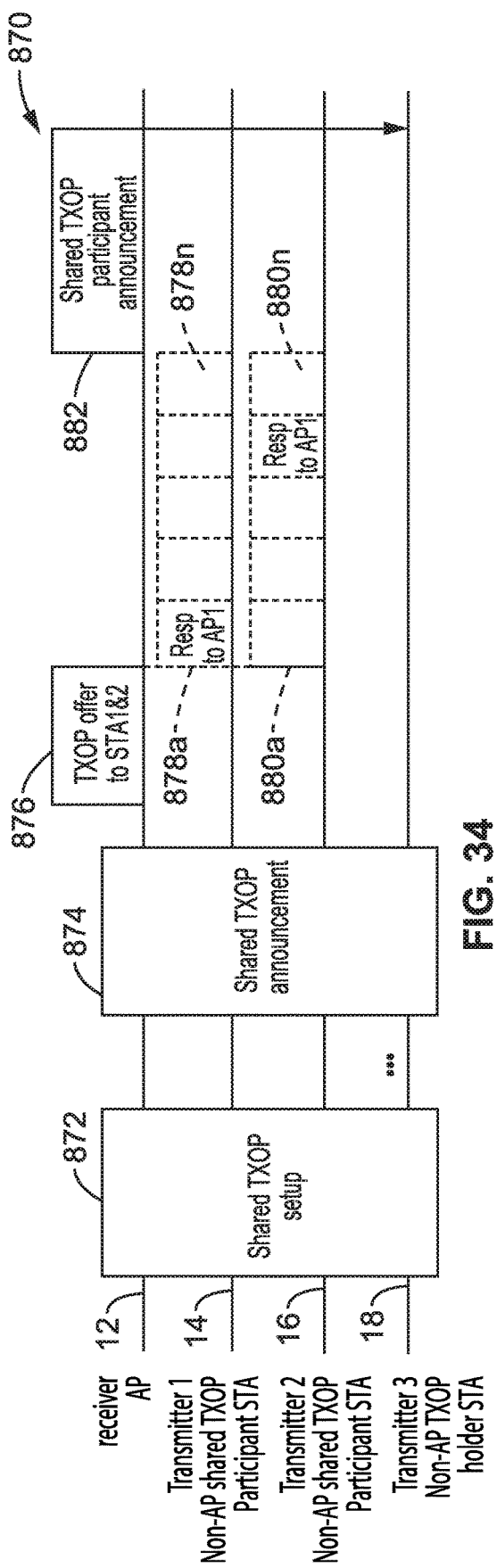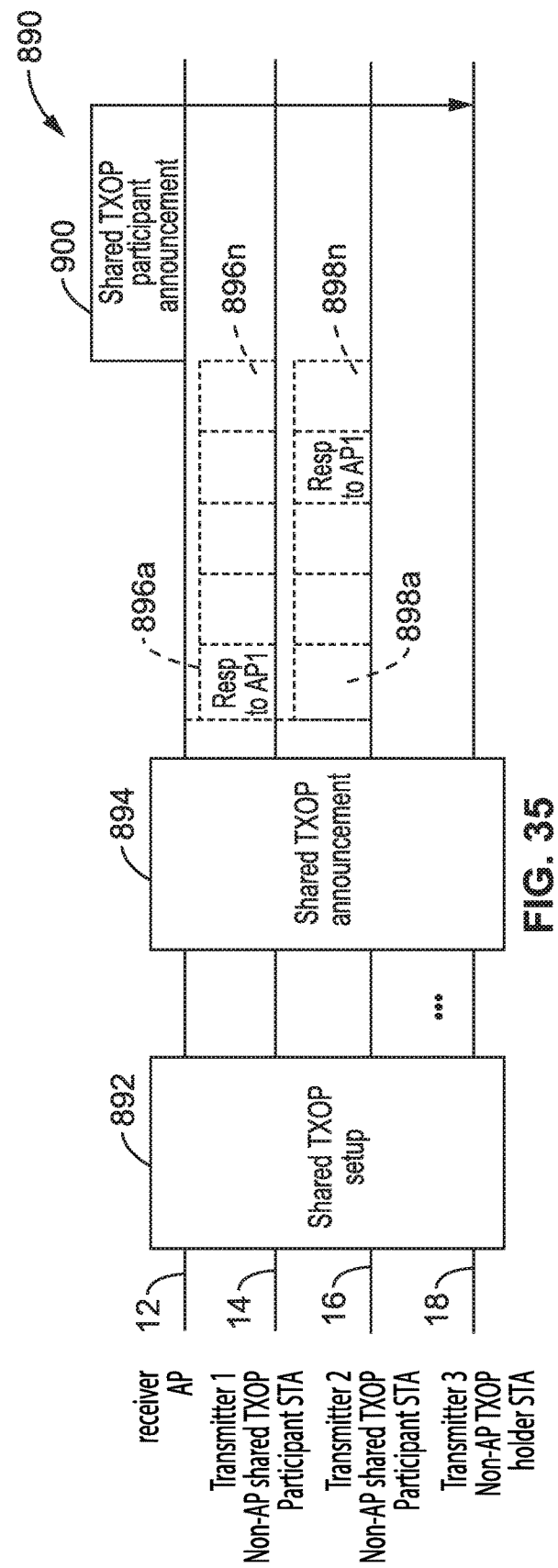

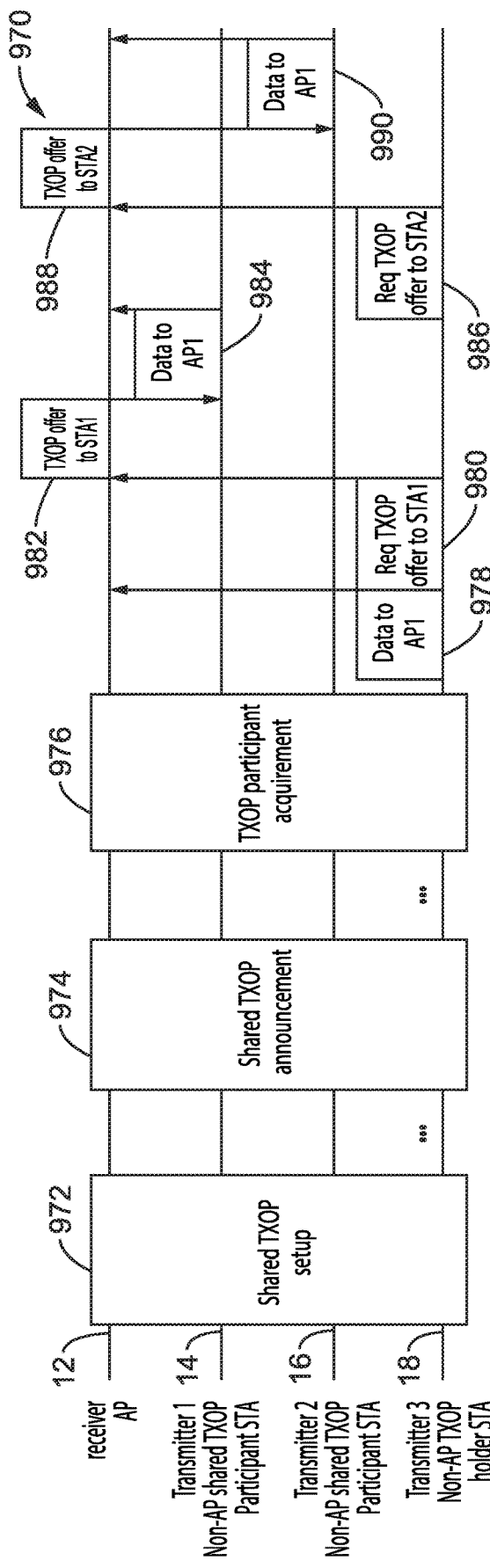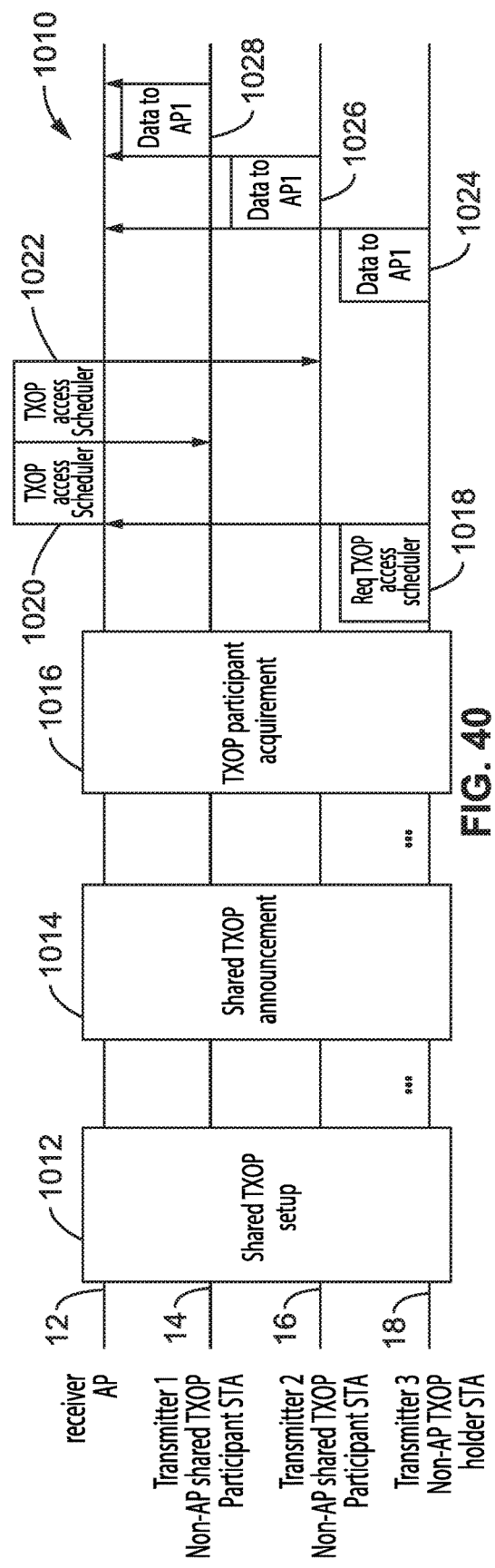

FIG. 55

| Frame Control | Duration | RA | TA | BSS ID | STA Share Offer/Request 1 | ... | STA Share offer/ Request n | FCS |
|---|---|---|---|---|---|---|---|---|
| Octets: 2 | 2 | 6 | 6 | 6 | 4 | | 4 | 4 |

| Priority | STA AID | TXOP Share Request | TXOP Resource Request | TXOP Share Offered | TXOP Resource Offered | Reserved |
|---|---|---|---|---|---|---|
| B0 – B3 | B4 – B11 | B12 | B13 – B18 | B19 | B20 – B25 | B26 – B31 |
| Bits: 4 | 8 | 1 | 6 | 1 | 6 | 6 |

| Frame Control | Duration | RA | TA | FCS |
|---|---|---|---|---|
| Octets: 2 | 2 | 6 | 6 | 4 |

← MAC header →

| Frame Control | Duration | RA | FCS |
|---|---|---|---|
| Octets: 2 | 2 | 6 | 4 |

← MAC header →

(1590)

| Allocation Control | Source AID | Destination AID | Allocation Start | Allocation block duration |
|---|---|---|---|---|
| 1 | 1 | 1 | 4 | 2 |

Octets:

| TID | Allocation Type | Reserved |
|---|---|---|
| B0 B3 | B4 B5 | B6 B7 |
| 4 | 2 | 2 |

Bits:

| Frame Control | Duration | RA | TA | STA TXOP participant 1 | ... | STA TXOP Participant n | FCS |
|---|---|---|---|---|---|---|---|
| 2 | 2 | 6 | 6 | 6 | ... | 6 | 4 |

Octets:

| Priority | TXOP Share Request | TXOP Duration Request | TXOP Share Offered | TX Duration Offered | Reserved |
|---|---|---|---|---|---|
| B0  B3 | B4 | B5  B20 | B21 | B22  B37 | B38  B39 |

Bits: 4, 1, 16, 1, 16, 2

| Frame Control | Duration | RA | TA | STA Share Offer/ Request 1 | ... | STA Share offer/ Request n | FCS |
|---|---|---|---|---|---|---|---|

Octets: 2, 2, 6, 6, 7, ..., 7, 4

| Priority | STA Address | STA AID | TXOP Share Request | TXOP Duration Request | TXOP Share Offered | TX Duration Offered | Reserved |
|---|---|---|---|---|---|---|---|
| B0  B3 | B4  B11 | B12  B19 | B20 | B21  B36 | B37 | B38  B53 | B54  B55 |

Bits: 4, 8, 8, 1, 16, 1, 16, 2

FIG. 77 — 1970

| Frame Control | Duration | RA | TA | TXOP share offered | STA TXOP Access Allocation 1 | ... | STA TXOP Access Allocation n | FCS |
|---|---|---|---|---|---|---|---|---|
| 2 | 2 | 6 | 6 | 2 | 9 | ... | 9 | 4 |

Octets: 2

FIG. 78 — 1990

| Allocation Control | STA Address | Participant Address | Allocation Start | Allocation block duration |
|---|---|---|---|---|
| 1 | 1 | 1 | 4 | 2 |

Octets: 1

FIG. 79 — 2010

| Priority | Reserved |
|---|---|
| B0  B3 | B4  B7 |
| 4 | 4 |

Bits:

| Frame Control | Duration | RA | TA | STA1 Configuration | STA2 Configuration | ... | STA n Configuration | FCS |
|---|---|---|---|---|---|---|---|---|
| 2 | 2 | 6 | 6 | 9n+1 | 9n+1 | ... | 9n+1 | 4 |

Octets:

| TXOP Holder MAC Address | STA TXOP Access Allocation 1 | STA TXOP Access Allocation 2 | ... | STA TXOP Access Allocation n |
|---|---|---|---|---|
| 1 | 9 | 9 | ... | 9 |

Octets:

COORDINATED WIFI STATIONS WITH SHARED TXOP IN TIME DOMAIN

CROSS-REFERENCE TO RELATED APPLICATIONS

This application claims priority to, and the benefit of, U.S. provisional patent application Ser. No. 63/046,010 filed on Jun. 30, 2020, incorporated herein by reference in its entirety. This application claims priority to, and the benefit of, U.S. provisional patent application Ser. No. 63/003,347 filed on Apr. 1, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication networks, and more particularly to multiple-user transmissions in which a STA obtaining the Transmit Opportunity (TXOP) shares it with other stations in a single Basic Service Set (BSS).

2. Background Discussion

The use of Wi-Fi networks continues to grow at a very rapid pace. This growth is spurred by the fast development of novel applications and the increasing amount of smart-devices in the market which require access to the internet through Wi-Fi network. With the growing number and the increasing demand of Wi-Fi users, there is significant impetus to achieve increased throughput, lower latency and higher efficiency.

Some applications, for example real time gaming, are very sensitive to delay, and thus have higher requirements for low latency in order to provide an enjoyable user experience, such as by supporting real time interaction between different game players.

However, the current 802.11 technique initiates the uplink (UL) multi-user (MU) transmission at the AP level. This means, if non-AP STAs need to send UL Data to the AP and sense that the current channel is free (not busy), and they cannot simply start the transmission. The non-AP STAs have to wait until they receive a trigger frame from the associated AP to start the UL Data transmission.

Thus, the present approaches utilized in current WLAN protocols are unable to provide the beneficial levels of performance which are increasing in demand.

Accordingly, a need exists for increasing performance of WLAN communications, including regarding TXOP transmissions. The present disclosure fulfills that need and provides additional benefits over previous technologies.

BRIEF SUMMARY

In conventional 802.11 protocols, the Transmit Opportunity (TXOP) scheduling is performed on the AP level. A STA that obtains a TXOP in a conventional wireless LAN network cannot send data without receiving a trigger frame from the AP, thus constraining channel utilization efficiency.

In the protocol of the disclosed technology non-AP STAs are allowed to perform TXOP scheduling in the time domain (time sharing the TXOP interval). In this case, the non-AP STA can schedule a TXOP access once it obtains (grabs) the channel and then it can share the TXOP with other non-AP STAs to improve channel utilization efficiency and achieve lower latency transmissions in the wireless LAN network.

In at least one embodiment of the disclosed technology the TXOP holder STA starts the coordination process and shares its TXOP with other STAs in the same BSS in the time domain without waiting for the trigger frame from AP. Multiple different scenarios are described, including with or without the AP, and the use of semi static TXOP sharing.

In a scenario without AP coordination, a station obtaining a TXOP in a wireless LAN network shares its TXOP with other stations in the same BSS by: (a) exchanging messages with the AP to inform and/or gain approval of sharing its TXOP with other STAs; (b) broadcasting a message to other STAs in the BSS to indicate that coming TXOP is available to be shared upon gaining access to the channel; (c) exchange messages with other STAs in the BSS to know which STAs are requesting time in the TXOP which is open for sharing; (d) sending messages to STAs that will share the TXOP with the STA to inform the duration and time when the channel access will happen.

In a scenario with AP coordination a STA obtaining a TXOP in a wireless LAN network shares its TXOP with other stations in the same BSS by: (a) exchanging messages with the AP to inform and/or gain approval for sharing its TXOP with other STAs; (b) broadcasting a message to other STAs in the BSS to indicate that the upcoming TXOP is available to be shared; (c) exchange messages with other STAs in the BSS to know which STAs are requesting time in the TXOP which is open for sharing; (d) sending messages to STAs that will share the TXOP with the STA to inform them of the duration and time when the channel access is to take place.

In semi-static TXOP sharing the following takes place: (a) an exchange of RTS and CTS occurs between the sharing STA and the AP announcing that the coming TXOP is allowed to be shared according to the agreed on configuration; (b) once other STAs sharing the TXOP receive the RTS or CTS showing that the TXOP is to be shared and recognize that they are included in the sharing configuration, the STAs can determine when to access the channel; (c) the RTS/CTS messages being used in this disclosure are modified RTS/CTS with added fields containing information about the sharing the TXOP; (d) different messages can be exchanged between the STA sharing its TXOP and the AP, so that other STAs can receive the messages and obtain information about the TXOP sharing.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL
VIEWS OF THE DRAWING(S)

The technology described herein will be more fully understood by reference to the following drawings which are for illustrative purposes only:

FIG. 29 is a communication sequence diagram of a TXOP schedule and access with unicast TXOP offer frame, according to at least one embodiment of the present disclosure.

FIG. 30 is a communication sequence diagram of a TXOP schedule and access with unicast TXOP access scheduler, according to at least one embodiment of the present disclosure.

FIG. 34 is a communication sequence diagram of the TXOP participant acquirement stage with response after receiving a TXOP offer, with AP, according to at least one embodiment of the present disclosure.

FIG. 35 is a communication sequence diagram of a TXOP participant acquirement stage with response after receiving CTS, with AP, according to at least one embodiment of the present disclosure.

FIG. 39 is a communication sequence diagram of a TXOP schedule and access stage with a unicast TXOP offer frame, using AP coordination, according to at least one embodiment of the present disclosure.

FIG. 40 is a communication sequence diagram of a TXOP schedule and access stage with unicast TXOP access scheduler frame, using AP coordination, according to at least one embodiment of the present disclosure.

FIG. 55 is a data field diagram of a Sharing Offer/Request frame according to at least one embodiment of the present disclosure.

FIG. 56 is a data field diagram of a STA Share Offer/Request Information field according to at least one embodiment of the present disclosure.

FIG. 57 is a data field diagram of an RTS-share frame according to at least one embodiment of the present disclosure.

FIG. 58 is a data field diagram of a CTS-share frame according to at least one embodiment of the present disclosure.

FIG. 65 is a data field diagram of a STA TXOP Schedule field according to at least one embodiment of the present disclosure.

FIG. 66 is a data field diagram of an Allocation Control subfield according to at least one embodiment of the present disclosure.

FIG. 67 is a data field diagram of a Shared TXOP Participant Announcement frame according to at least one embodiment of the present disclosure.

FIG. 74 is a data field diagram of a Share Offer/Request Information field according to at least one embodiment of the present disclosure.

FIG. 75 is a data field diagram of a Sharing Offer/Request frame according to at least one embodiment of the present disclosure.

FIG. 76 is a data field diagram of an STA Share Offer/Request info field according to at least one embodiment of the present disclosure.

FIG. 77 is a data field diagram of a Sharing Configuration frame according to at least one embodiment of the present disclosure.

FIG. 78 is a data field diagram of an STA TXOP Access Allocation field according to at least one embodiment of the present disclosure.

FIG. 79 is a data field diagram of an Allocation Control subfield according to at least one embodiment of the present disclosure.

FIG. 80 is a data field diagram Sharing Configurations frame according to at least one embodiment of the present disclosure.

FIG. 81 is a data field diagram of a STA Configuration field according to at least one embodiment of the present disclosure.

DETAILED DESCRIPTION

1. Introduction

Figure 1:
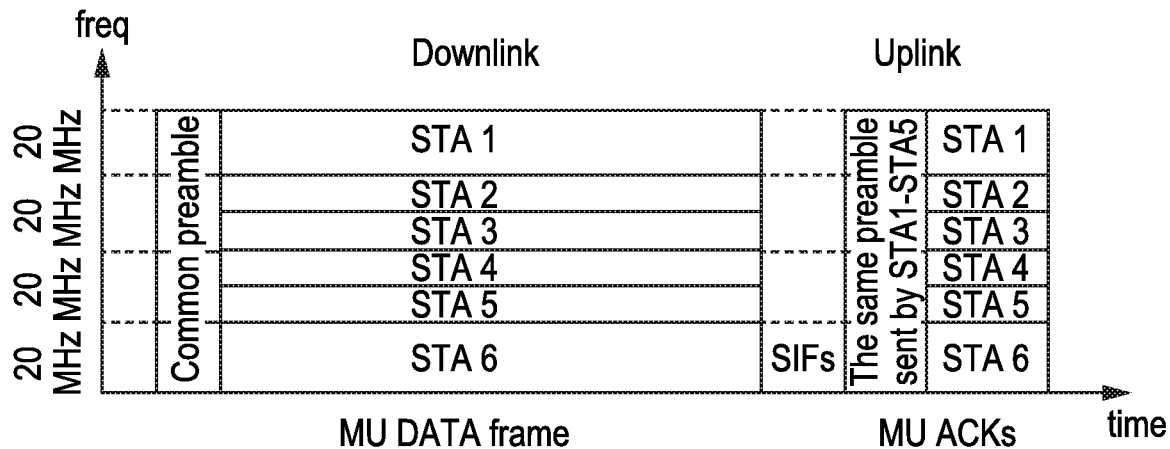
FIG. 1 is a slotted transmission diagram for an MU Data frame in a DownLink (DL) Orthogonal Frequency Division Multiple Access (OFDMA) Multiple Input Multiple Output (MIMO) transmission.

Numerous protocol amendments have been proposed for improving the performance of 802.11 WLANs, and most specifically for systems which communicate over the 2.4 GHz and 5 GHz bands. The majority of these techniques target data rate improvements from the perspective of the PHYsical (PHY) layer, such as increasing bandwidth from 20 MHz to 160 MHz, proposing new modulation and coding schemes and improving MIMO system operation.

Other MAC layer improvements have been introduced to reduce the overhead of transmission and hence increase data throughput. This can be accomplished for example by reducing the interframe spacing, aggregating and segmenting packets, and applying power consumption protocols to alternate between the awake state and the doze (sleep) state for STAs to save their power.

IEEE 802.11ax technique introduced OFDMA, where adjacent subcarriers are grouped into resource units (RUs). By assigning RUs for Multi-users (MU) up link (UL) and down link (DL) DATA transmission, the technique maximizes transmission rate.

Orthogonal Frequency Division Multiple Access (OFDMA) allows many users to use the same time resources at the same time and splits the frequency domain among them. This results in improved use of channel resources and allows latency reduction since more users can be scheduled at the same time.

2.1. WLAN Features Affecting Delay

2.1.1. Channel Access and Delay Tolerance

Both contention-based and contention free access are allowed in WLAN devices. The contention based access requires the device to sense the channel and contend for the channel if it is busy in order to gain access to the channel. This mechanism introduced additional transmission delays which were necessary for collision avoidance. Contention-free channel access allows the AP to gain access to the channel without contention. This is allowed in the Hybrid Controlled Channel Access where channel access coordination is accomplished by using a shorter inter-frame spacing equal to PIFs (PCF Inter-Frame spacing) compared to the DIFS (Distributed Inter-Frame spacing) used by other STAs. Although contention free access appears to be a good solution to avoid contention delay, it is not widely deployed and the majority of Wi-Fi devices are using contention based access.

For a STA to access the channel it has to sense the channel and find that it is not busy prior to obtaining and utilizing the channel. This channel is considered busy when: (a) the STA detects a preamble of a frame, wherein the channel is considered busy for the length of the detected frame; (b) the STA detects in-band energy at more than 20 dB of the minimum sensitivity; or (c) the STA detects that the channel virtually busy by reading the NAV of a detected frame.

802.11ax introduced two NAVs to avoid collision that might happen by faulty resetting the NAV timer. It will be appreciate that one Network Allocation Vector (NAV) is for the BSS STAs and the other NAV is for the non-BSS STAs. The STA maintains the two NAVs separately.

802.11ax uses Carrier Sense Multiple Access/Collision Avoidance (CSMA/CA) for channel access for all legacy 802.11 WLAN devices. Accordingly, for an AP to send a trigger frame for an UpLink Multiple-Input Multiple-Output (UL MIMO) transmission it still needs to contend for channel access. In order to enable the AP to win (obtain) channel access over any STA in its BSS, 802.11ax introduced a second set of Enhanced Distributed Channel Access (EDCA) for 802.11ax devices only, which allows legacy non 802.11ax devices to access the channel freely with EDCA and increase the chance of the AP gaining access to the channel in order to schedule UpLink (UL) or DownLink (DL) OFDMA MIMO data transmission.

2.1.2 Multi-User Transmission and Reception 802.11 WLAN devices allow the use of a MIMO antenna for transmission and reception as well as for OFDMA channel access. IEEE 802.11ax supports the multi-user transmission in both uplink and downlink.

This allows multi-stream transmission to one or more users through up to 8 streams for example in SU-MIMO DL in 802.11ac or through multi-user transmission to more than one user through MU-MIMO DL transmission as defined in 802.11ac. This allows the AP to assign one or more streams to STAs in its BSS.

With the use of wide channels for data transmission, up to 160 MHz, the channel is expected to be interference frequency selective where some frequencies experience different interference levels than others. This affects the expected achievable rate and degrades the performance. To solve this problem 802.11ax introduced OFDMA where adjacent subcarriers are grouped into resource units (RUs). These RUs can be assigned to different receivers to maximize transmission rates. This scheduling can result in maximizing the Signal to Interference and Noise Ratio (SINR) for each receiver and hence allows selecting a higher Modulation and Coding Scheme (MCS) and therefore increases achieved throughput.

OFDMA allows many users to use the same time resources at the same time and split the frequency domain among them. The result is better use of resources and allows latency reduction since more users can be scheduled at the same time. This also allows STAs needing to communicate small amounts of data to occupy narrow RUs making scheduling very efficient and providing improved distribution of resources among applications that require access to the channel, while reducing channel access time and the overhead of frame headers and preambles.

OFDMA can be more efficient when it is combined with MIMO transmission. An RU can be used to send multiple spatial streams to a STA depending on the MIMO capacities of the STAs. Also, one RU can be assigned to more than one STA to share where each can have one or more spatial streams depending on the MIMO capacities of the STAs. Packing more STAs in the same resource can also help with improving latency for the STAs and APs.

FIG. 1 shows an example of DL OFDMA MIMO transmission. The AP is sending a PHY preamble to all STAs to specify the frequency/RUs mapping and RUs assignment for STAs. Following the preamble, the AP sends DL DATA to the specific STA (e.g., STA 1-STA 6) using the RU assignment for this STA. The Multi-user ACK transmission should be synchronized to the reception of DL DATA frame where STAs starts transmission of a SIFS after reception of the DL trigger frame.

Figure 2:
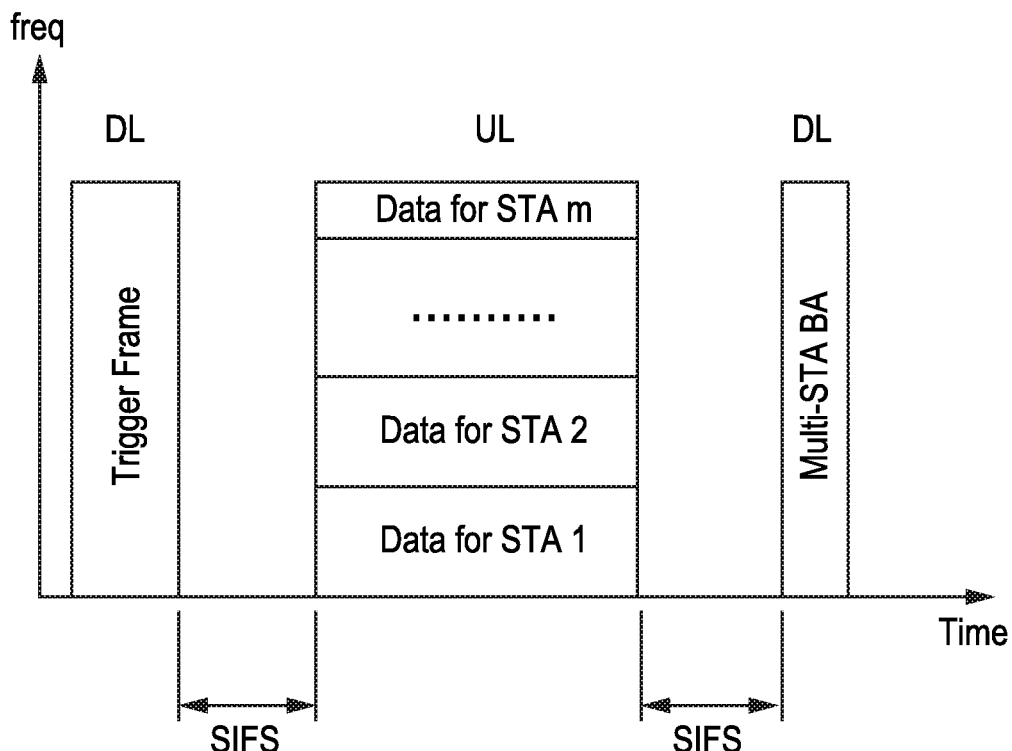
FIG. 2 is a slotted transmission diagram of an UpLink (UL) Orthogonal Frequency Division Multiple Access (OFDMA) Multiple Input Multiple Output (MIMO).

FIG. 2 shows an example of a UL OFDMA MIMO transmission. The AP is sending a trigger frame to all STAs containing the frequency and/or RU mapping and RU assignments for the STAs. The UL MIMO transmission is preferably synchronized to the reception of that frame where STAs starts transmission with a SIFS after the reception of the DL trigger frame.

2.1.4. Retransmission

Figure 3:
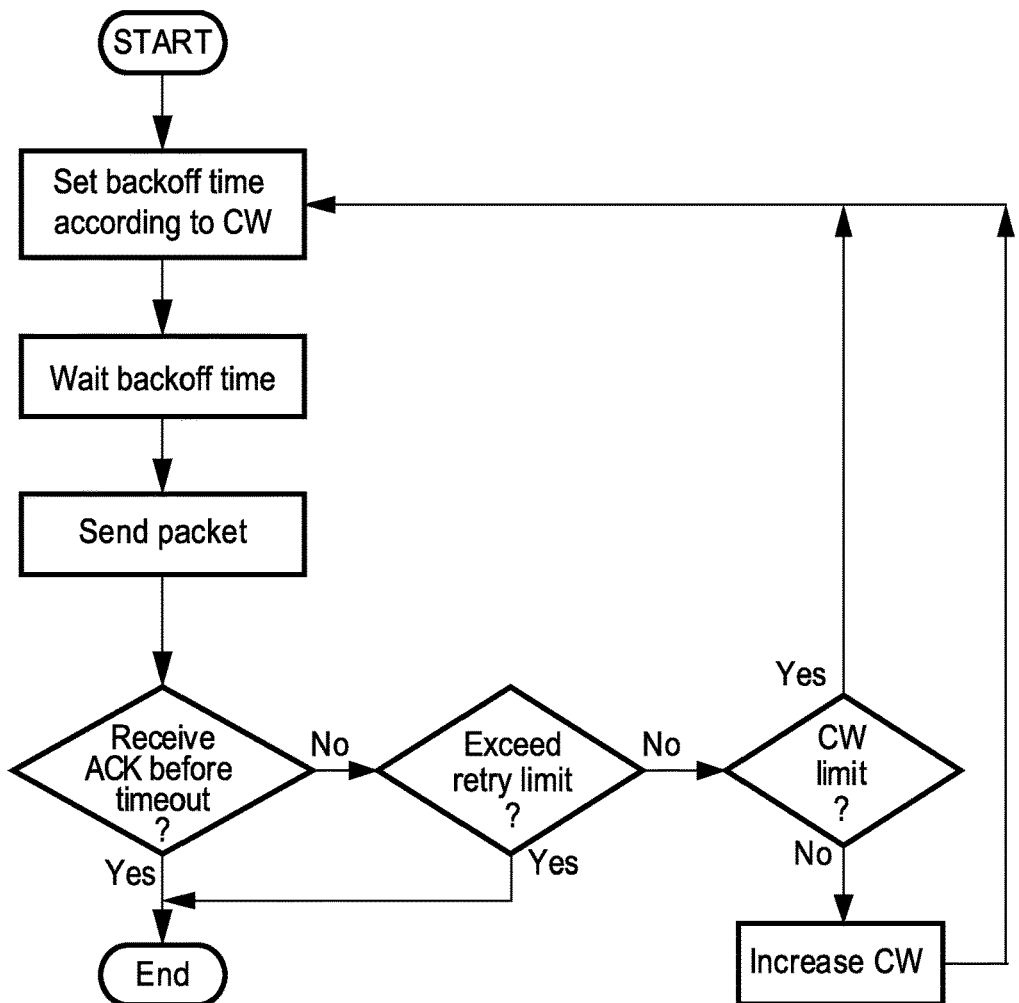
FIG. 3 is a flow diagram of a conventional retransmission scheme in CSMA/CA.

FIG. 3 illustrates the retransmission scheme in CSMA/CA. In WLAN systems, IEEE 802.11 uses CSMA/CA to allow STAs to have access to the channel for packet transmission and retransmission. In CSMA/CA systems, before each transmission and retransmission, the STA is required to sense the channel state and if it does not appear busy to set a backoff time to contend for channel access. The backoff time is decided by a uniform random variable between 0 and the size of contention window. After the STA waits for the backoff time and senses that the channel is idle, the STA sends a packet. The retransmission is required if the STA does not receive an ACK before timeout. Otherwise, the transmission succeeds.

When the retransmission is required, the STA checks the number of retransmissions of the packet. If the number of retransmission exceeds the retry limit, then the packet is dropped and no retransmissions are scheduled. Otherwise, the retransmission is scheduled. If the retransmission is scheduled, then another back off time is needed to content for channel access for the retransmission. If the size of the contention window does not reach its upper limit, the STA increases it. The STA sets another back off time depending on the new size of the contention window. The STA waits the back off time for retransmission and so on so forth.

Figure 4:
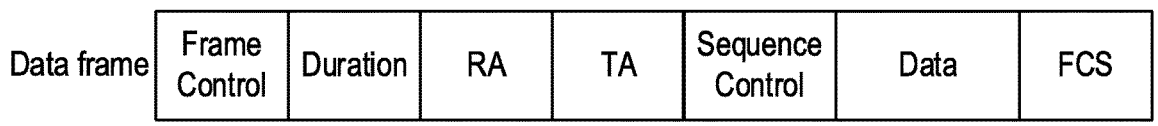
FIG. 4 is a data field diagram of a packet frame format for carrying Data in a regular WLAN system.

FIG. 4 illustrates the data frame format in the regular WLAN system. A Frame Control field indicates the type of frame. A Duration field contains NAV information used for CSMA/CA channel access. An RA field contains an address for the recipient of the frame. A TA field contains the address of the STA that transmitted the frame. A Sequence control field contains the fragment number and the sequence number of the packet. A Data field is shown for conveying the data to be communicated. A Frame Check Sequence (FCS) can be seen here, and in many other data formats described in the present disclosure, it provides an error-detecting code added to a frame in a communications protocol.

Figure 5:
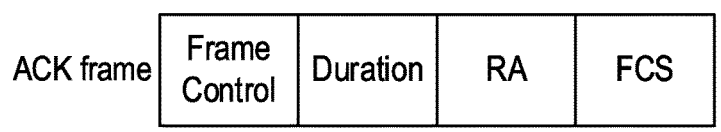
FIG. 5 is a data field diagram of an ACK packet frame format in a regular WLAN system.

FIG. 5 illustrates an ACK frame format in a regular WLAN system. A Frame Control field indicates the type of the frame. A Duration field contains NAV information used for CSMA/CA channel access. An RA field contains an address for the recipient of the frame. A Frame Check Sequence (FCS) can be seen here and in many other data format described in the present disclosure and provides an error-detecting code added to a frame in a communications protocol.

Figure 6:
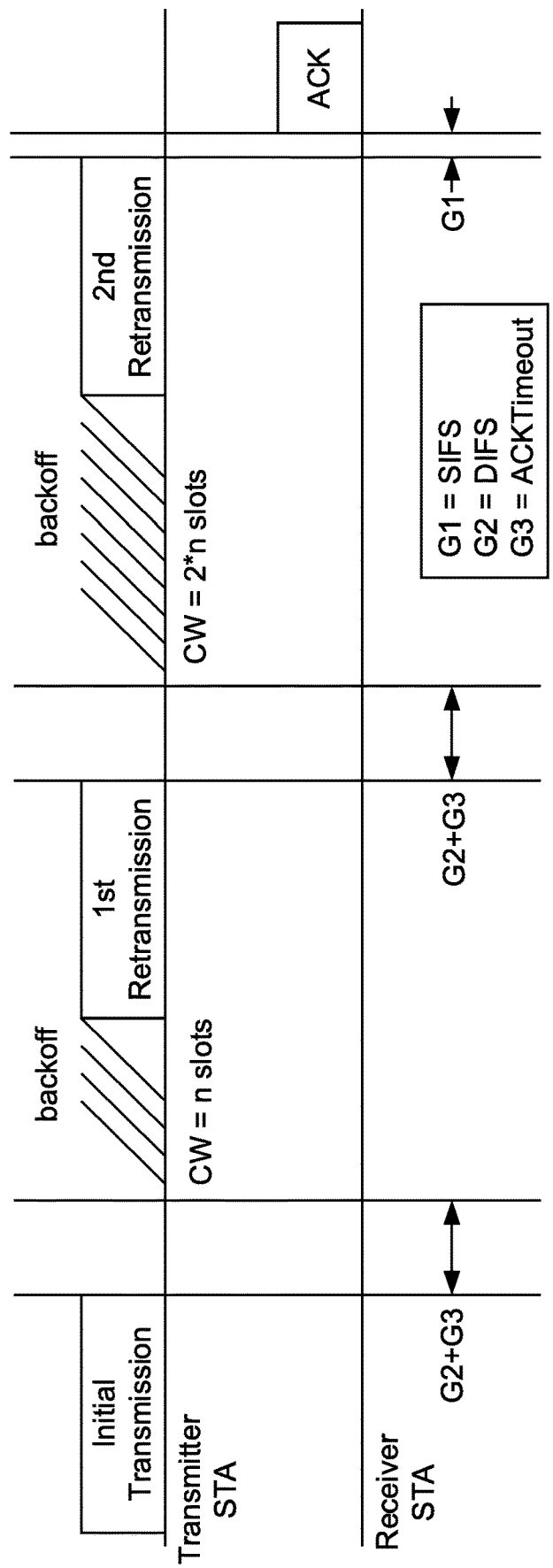
FIG. 6 is a communication sequence diagram of a double sized contention window when performing retransmission in CSMA/CA.

FIG. 6 illustrates a double sized contention window utilized in an example of retransmission under CSMA/CA where the backoff time is increased for each retransmission. The data packet frame and the ACK frame use the formats as shown in FIG. 4 and FIG. 5, respectively. After the transmitter transmits the initial transmission of a packet, it does not receive the ACK before timeout. Then, it sets another backoff time, whereby the size of contention window is "n" slots. After waiting the backoff time, the transmitter STA retransmits the packet for the first time. However, the retransmission also fails. The transmitter STA needs to retransmit the packet and sets the backoff time again to contend for channel access. This time, the size of the contention window is doubled, which is 2*n slots, due to the retransmission. The expected backoff time is also doubled by the contention window size. The second retransmission succeeds since it receives an ACK before timeout.

Figure 7:
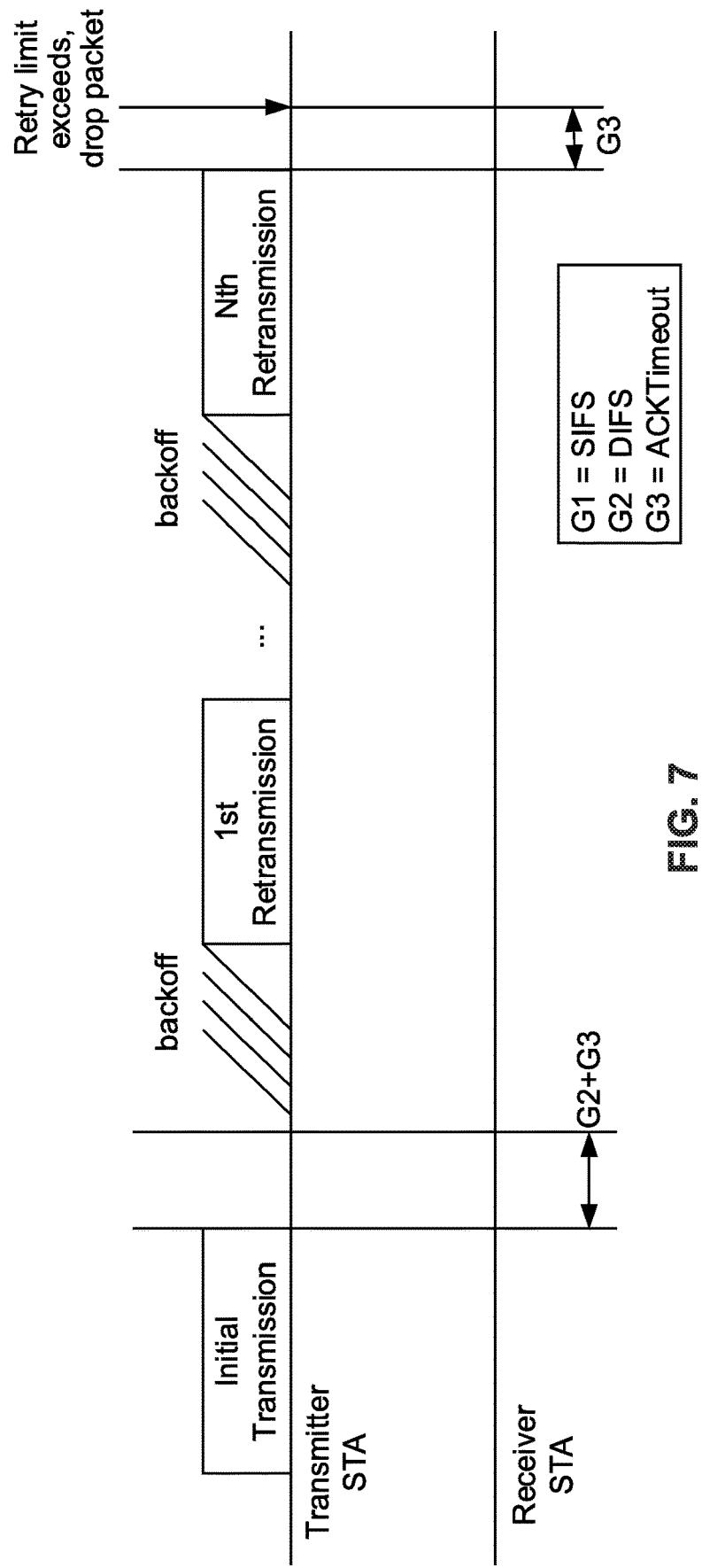
FIG. 7 is a communication sequence diagram of a packet dropped due to the retry limit in CSMA/CA.

FIG. 7 depicts an example of a packet dropped due to the retry limit in CSMA/CA being exceeded. The data packet frame and the ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 8:
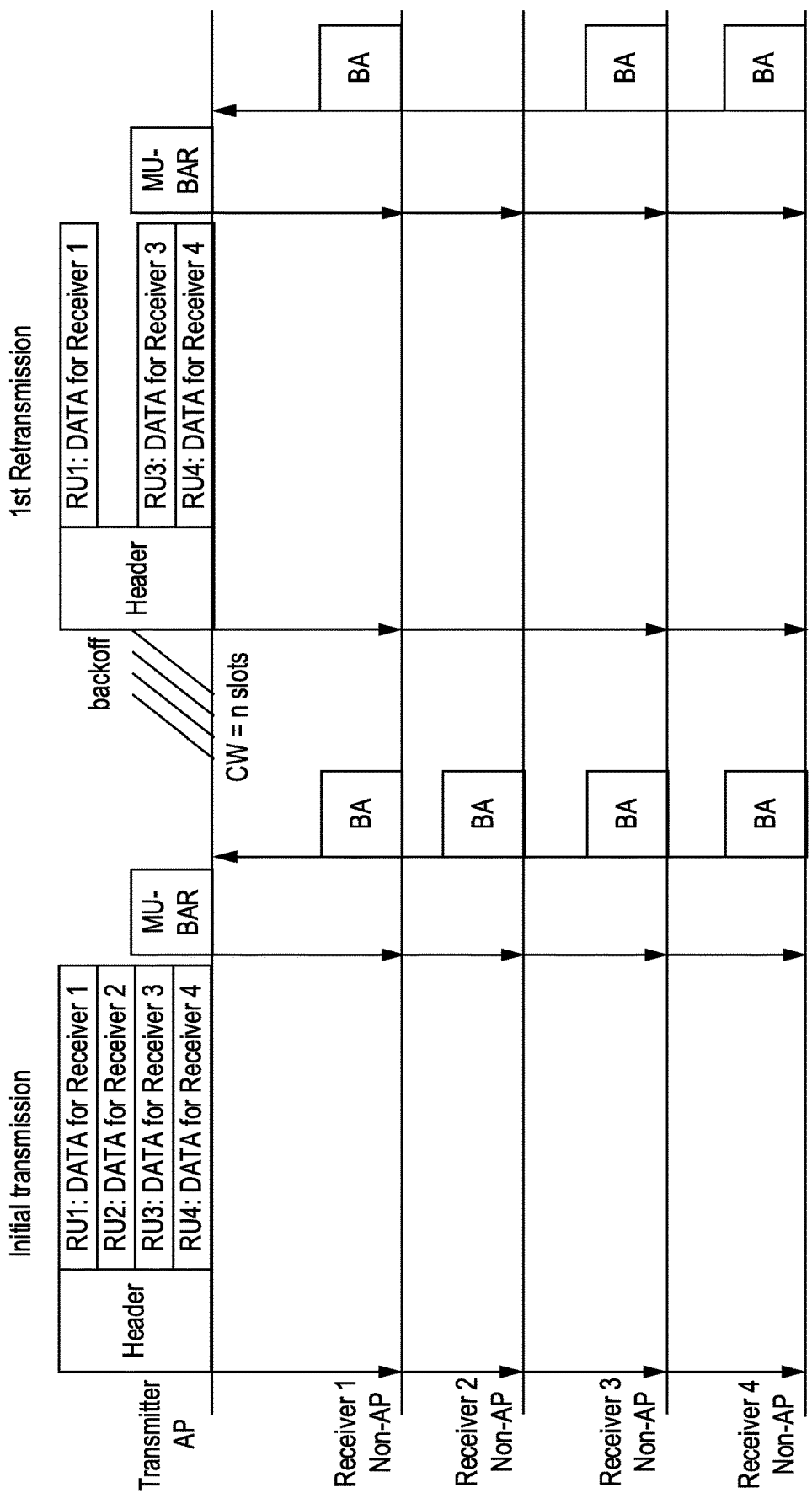
FIG. 8 is a communication sequence diagram of a legacy retransmission scheme in the downlink of an OFDMA system.

FIG. 8 depicts a legacy retransmission scheme showing an example of downlink multi-user (DL MU) transmission using OFDMA. The transmitter AP transmits data packets to its receivers 1, 2, 3, and 4. The data packet could use the HE MU PPDU format. After finishing the initial transmission, the AP sends a multi-user Block ACK request (MU-BAR) to all the receivers. The receivers then send block ACK (BA) back to the AP. According to the content in the BAs, the AP decides to retransmit the packets to receivers 1, 3, and 4. It contends for the channel and waits the backoff time, with the first retransmission occurring after the AP gains channel access.

Figure 9:
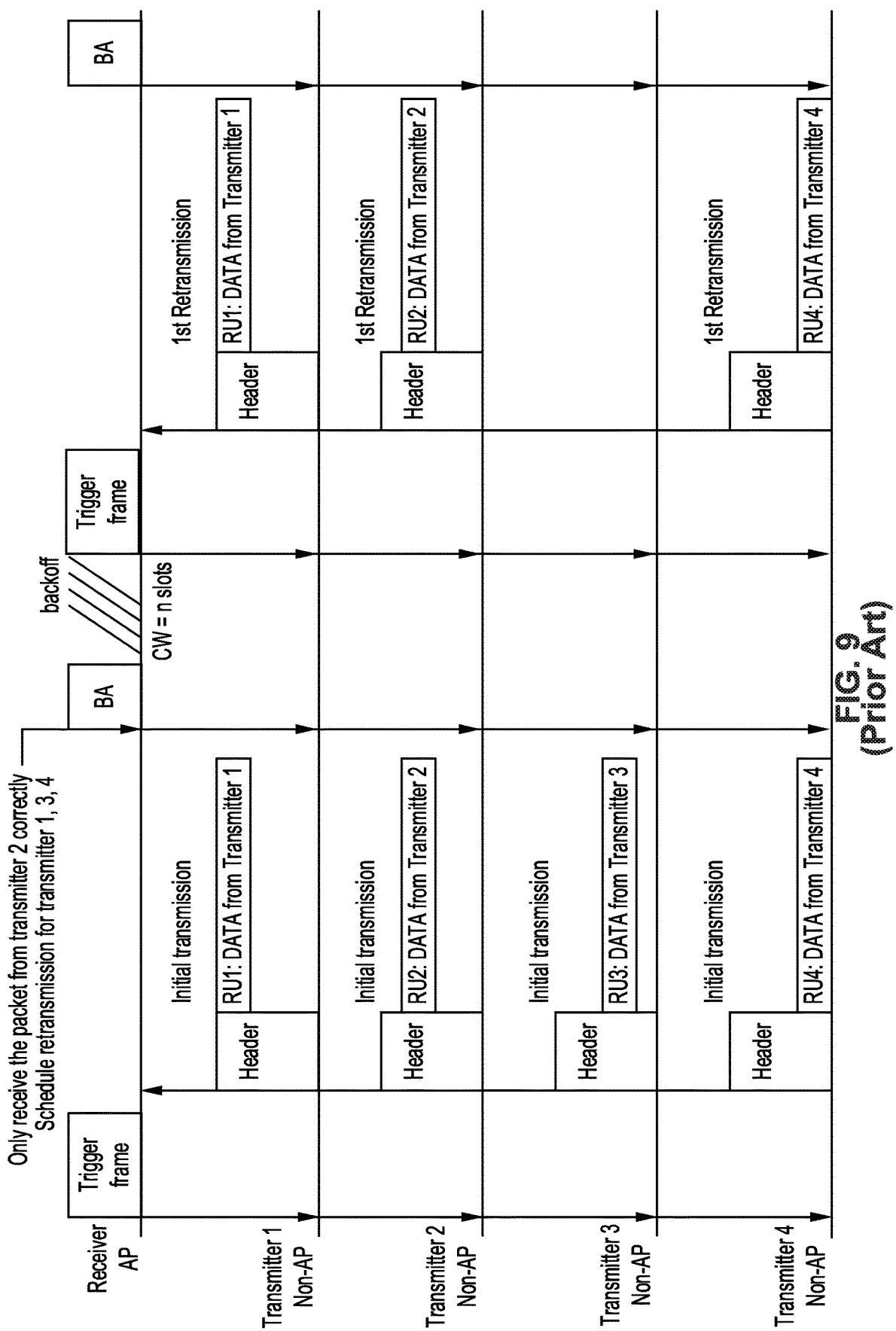
FIG. 9 is a communication sequence diagram of a legacy retransmission scheme in the uplink of an OFDMA system.

FIG. 9 depicts a legacy retransmission scheme showing an example of uplink multi-user (UL MU) transmission using OFDMA. The AP first sends a trigger frame to all the transmitters 1, 2, 3, and 4. The transmitters receive the trigger frame and start the initial transmission using the channel resource allocated by the trigger frame. The data packets could use the High Efficiency (HE) trigger based (TB) PPDU format. It will be noted that a PPDU is a Physical Layer Conformance Procedure (PLCP) Protocol Data Unit (PPDU). The AP receives the data packets from the transmitters and sends a BA frame to report the correctness of the transmission. In this example, only the packet from transmitter 2 was received correctly and a retransmission needs to be scheduled for transmitters 1, 3, and 4. The AP contends for the channel and waits a backoff time to gain channel access, after which retransmission proceeds in the same manner as the initial transmission.

3. Problem Statement

For the MU UL transmission, previous techniques, such as 802.11n/ac implements Request-To-Send/Clear-To-Send (RTS/CTS) or RTS/CTS with bandwidth indication to help avoid collisions. However, this scheme only allows one user to occupy the channel at one time. Besides, a long delay is introduced by the overhead of RTS/CTS frame exchange.

As a comparison, the 802.11ax technique implements an OFDMA scheme, which allows different users to access the channel simultaneously by utilizing a different resource unit (RU). This improves channel utilization efficiency and reduces average delay. However, current 802.11ax techniques rely on the AP to initiate UL transmissions for a shared Transmit Opportunity (TXOP). It should be noted that a Transmit Opportunity (TXOP) is a MAC layer feature used in IEEE 802.11-based wireless local area networks (WLANs). TXOP defines the time duration for which a station can send frames after it has contended and gained access to the transmission medium.

Thus, since a TXOP currently relies on the AP to initiate the process, if a non-AP STA senses the channel is ideal (inactive) and has Data to transmit to the AP, it has to wait until receiving the trigger frame from the associated AP to start the UL DATA transmission. Also, the non-AP STA has to rely on the AP to schedule and distribute available channel resources between this non-AP STA which obtains (grabs) the channel and the other non-AP STAs. In this case, it introduces several problems including low channel utilization efficiency and, thus, increased delay.

4. Contribution of the Invention

The present disclosure provides a new solution to enable multi-user UL transmission in the time domain over the shared TXOP in a single BSS. In this disclosure STAs share these TXOPs with other STAs in the BSS in the time domain. This can beneficially reduce channel access latency by STAs contending for the channel and once any STA gains access it shares its TXOP with other STAs. Thus, STAs do not necessarily need to wait for the AP to allow access to the channel through trigger based (TB) access.

A few example Scenarios of using Multi-User UpLink (UL) transmission in the Shared TXOP in a Single BSS in the time domain include: (1) a dynamic scenario of shared TXOP in the time domain, without an AP as coordinator; (2) a dynamic scenario of shared TXOP in the time domain with an AP as coordinator; and (3) a semi-static scenario in the time domain either with, or without, an AP as coordinator.

4.1. Dynamic Scenario of Shared TXOP

A brief summary is provided below of the disclosed protocol showing four stages for each class. In the last two stages alternative solutions are depicted in subgraphs of the protocol.

4.1.1. Dynamic Scenario of Shared TXOP without AP Coordinator

FIG. 10A through FIG. 10D illustrate an example embodiment 10, 50, 70, 110 of a first dynamic scenario shared TXOP in the time domain, without using an AP as coordinator depicting interactions between AP 12, STA1 14, STA2 16 and STA3 18. Scenario 1: Non-AP TXOP holder STA (STA3) obtains (grabs) the channel, instead of waiting for AP1 to send a trigger frame. STA3 will coordinate with other STAs and share the TXOP with other STAs in the time domain.

Figure 10A:
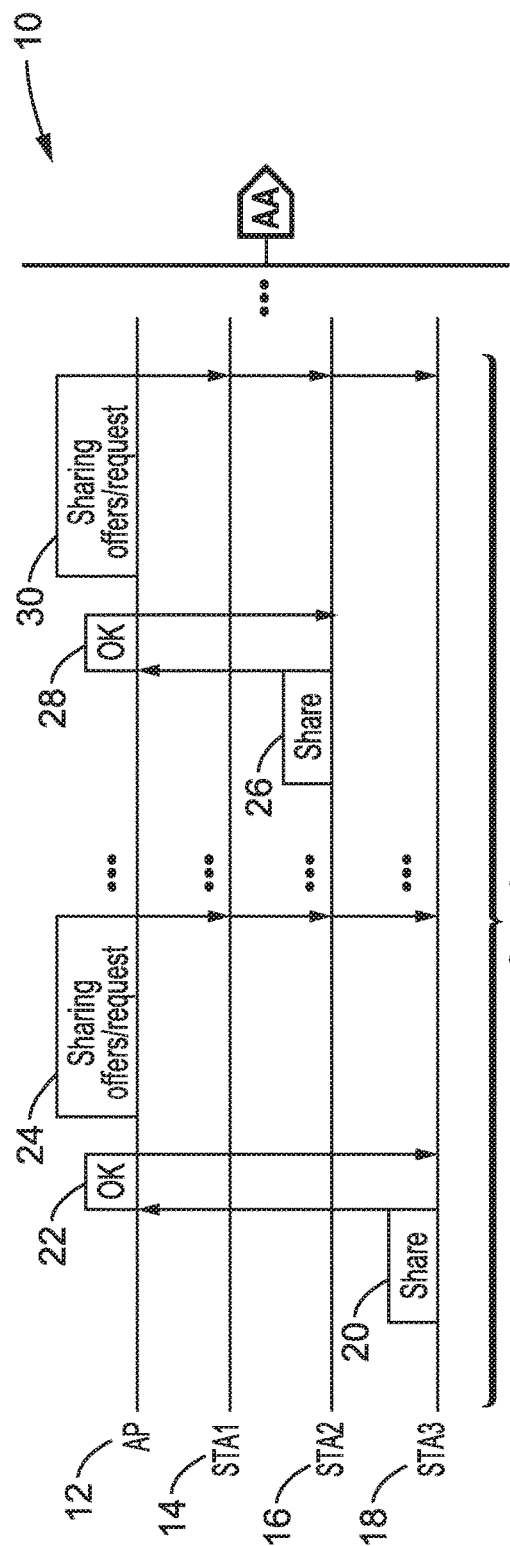
FIG. 10A through FIG. 10D is a communication sequence diagram of a dynamic scenario of shared TXOP in time domain, without AP as coordinator, according to at least one embodiment of the present disclosure.

FIG. 10A shows an embodiment 10 performing Stage 0 processing 32 in which the following setup is performed: (a) exchange shareability information; (b) exchange contention slot information; and (c) exchange time allocation information. STA3 obtains the channel and indicates the share information 20 in a frame sent to the AP (for example, an element can be attached to the authentication, association frame or any other frame exchanged with the AP), which acknowledges 22 receipt back to STA3. Then, the AP broadcasts the latest share information 24 of all the associated non-AP STAs. Later in the figure STA2 obtains the channel and repeats the process with exchanging a frame with AP to indicate the share information 26 and receiving an ACK 28. After this the AP broadcasts the latest share information of all the associated non-AP STAs 30 with a sharing offers/requests frame.

Figure 10B:
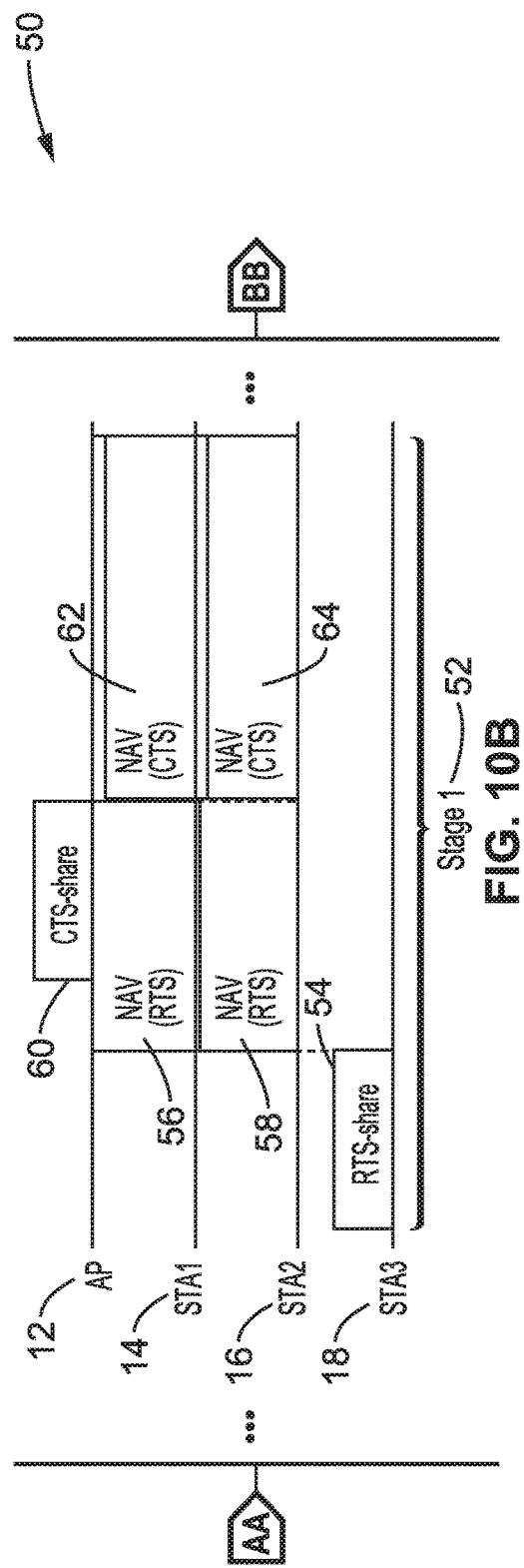

FIG. 10B shows an embodiment 50 of performing Stage 1 processing 52 announcements in which the following is performed: (a) TXOP holder STA indicates that coming TXOP is available to be shared; and (b) two new frames are utilized comprising RTS-share and CTS-share. STA3 sends an RTS-share 54 to AP, which reserves the channel for the TXOP by setting the NAV. STA1 and STA2 check the NAV 56, 58 when receiving RTS-share 54. The AP responds with a CTS-share 60 to STA3, which reserves the channel with the updated NAV. STA1 and STA2 receive the CTS-share frame and are made aware of NAV 62, 64.

Figure 10C:
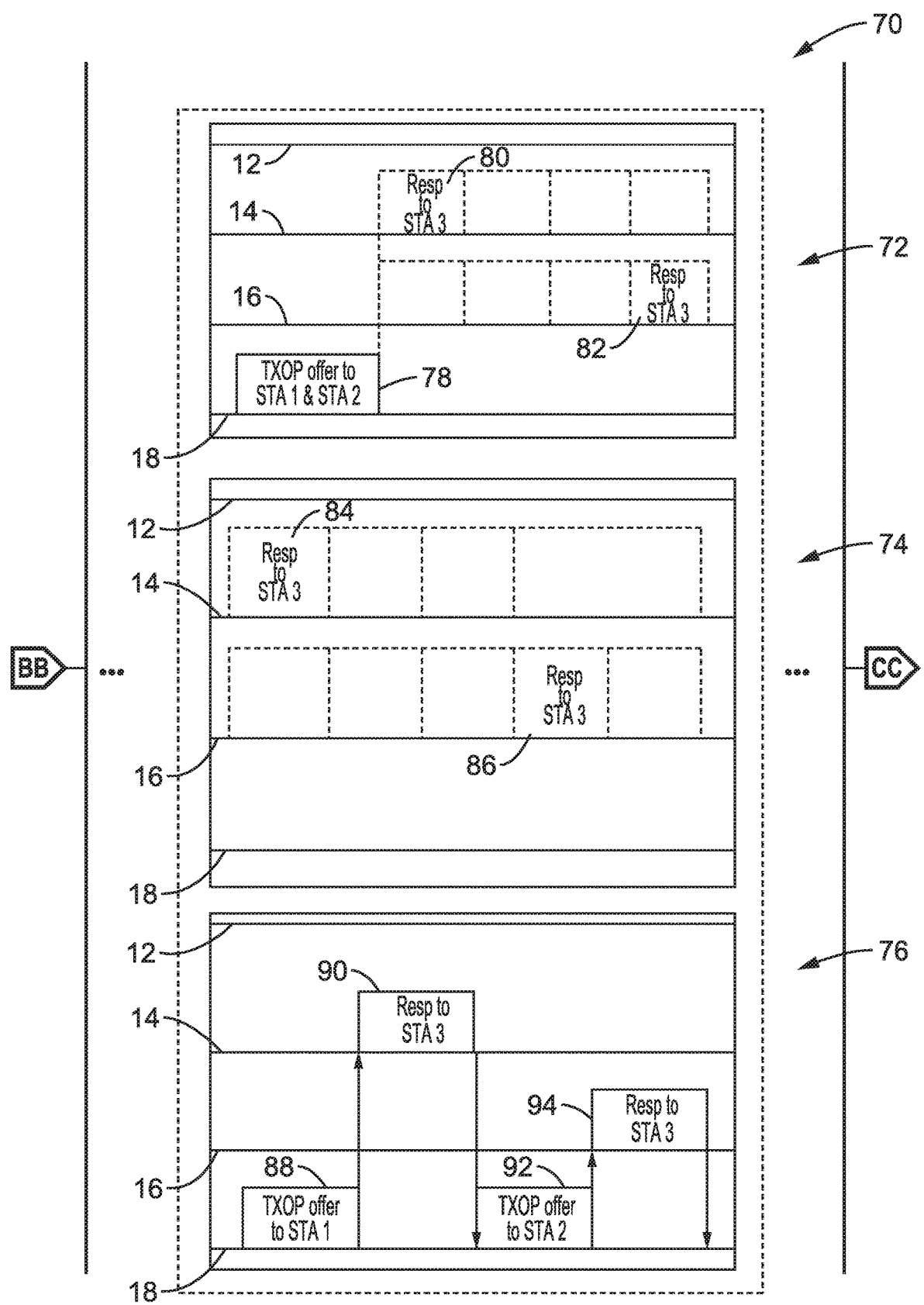

FIG. 10C shows a Stage 2 embodiment 70 for acquiring shared TXOP participants, showing three different alternatives for knowing which non-AP STAs are requesting time in the upcoming shared TXOP, by: (a) broadcasting 72 a share frame+ACK (Dedicated/random access); (b) generating an ACK 74 after receiving RTS or CTS (Dedicated/random access); and (c) Repeating of unicasting 76 share+ short-response.

At the top of the figure a share frame 72 is broadcast with the example depicting STA3 broadcasting a TXOP offer 78 to STA1 and STA2, to which a response is generated 80, 82 in the time slots of the TXOP.

In the middle of the figure a response frame 74 can be seen being received after a shared RTS/CTS which contains sharing information. In the example the shared RTS/CTS (not shown here) has been generated and STA1 and STA2 utilize their timeslots in the TXOP to send a response, such as an Access Request frame 84, 86 back to STA3.

At the bottom of the figure the requests are handled 76 in response to unicasting of offers and responses. In the example shown STA3 sends a TXOP offer 88 to STA1, and STA1 responds 90, then STA3 sends a TXOP offer 92 to STA2, and STA2 responds 94.

Figure 10D:
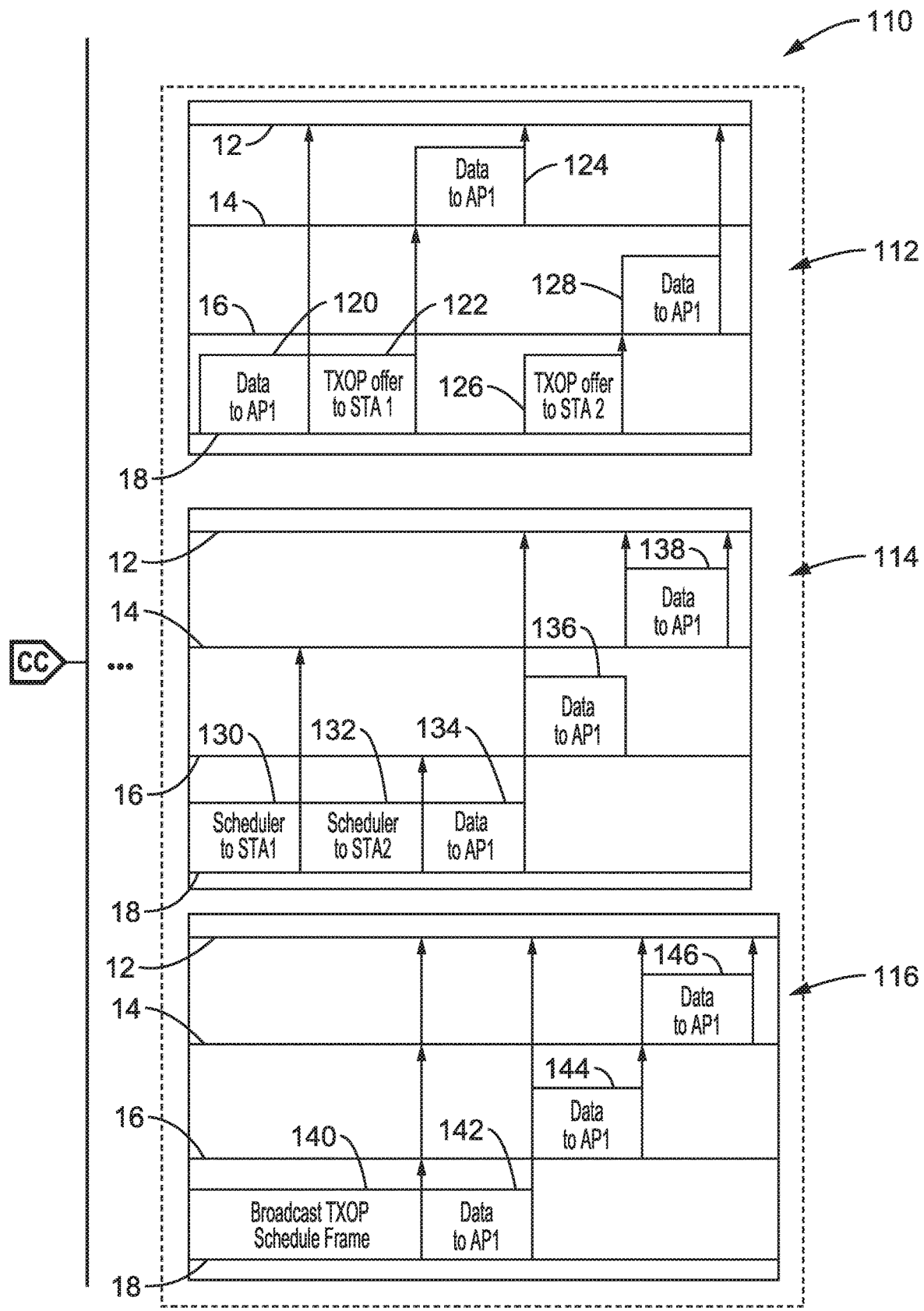

FIG. 10D shows a Stage 3 embodiment 110 performing scheduling and access in which TXOP access is performed in three variations: (a) dedicated polling 112 in which data is polled one by one; (b) setting a schedule by either unicasting 114, or broadcasting 116, for all STAs (scheduler frame), after which STAs transmit in the scheduled TXOP slot.

In the upper portion 112 of the figure a one by one (dedicated) polling is performed. In the example shown STA3 sends Data 120 to the AP, and then a TXOP offer 122 to STA1, which in response to the offer sends its Data 124 to the AP. After STA1 has used its shared time, then STA3 extends a TXOP share offer 126 to STA2, and STA2 in response to this offer sends its Data 128 to the AP.

In the middle portion 114 of the figure is depicted setting a schedule for all STAs by unicasting scheduler frames. In the example shown STA3 sends a schedule 130 to STA1, then a schedule 132 to STA2, after which it sends its Data 134 to the AP. STA2 can be seen transmitting Data 136 to the AP in its scheduled TXOP timeslot, after which STA1 sends Data 138 to the AP.

In the lower portion 116 of the figure is depicted broadcasting a schedule for all STAs. In the example shown STA3 broadcasts a schedule 140 which can be received by STA1 and STA2. After this STA3 sends its Data 142 to the AP. STA2 can be seen transmitting Data 144 to the AP in its scheduled TXOP timeslot, after which STA1 sends Data 146 to the AP in its respective timeslot.

4.1.2. Dynamic Scenario of Shared TXOP with AP Coordinator

FIG. 11A through FIG. 11D illustrate an example Scenario 2 150, 170, 190, 230 with variations. The scenario depicts a situation in which STAs cannot communicate with each other directly and an AP (AP1) is utilized as the coordinator.

Figure 11A:
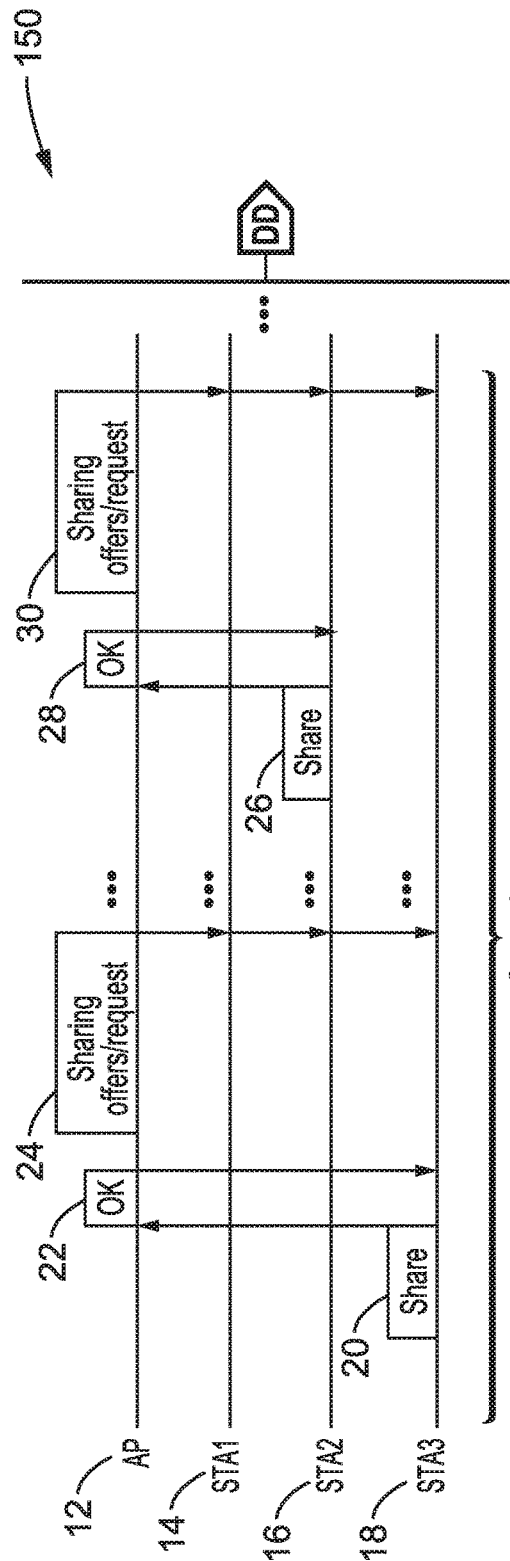
FIG. 11A through FIG. 11D is a communication sequence diagram of a dynamic scenario of shared TXOP in time domain, with AP as coordinator, according to at least one embodiment of the present disclosure.
Figure 11B:
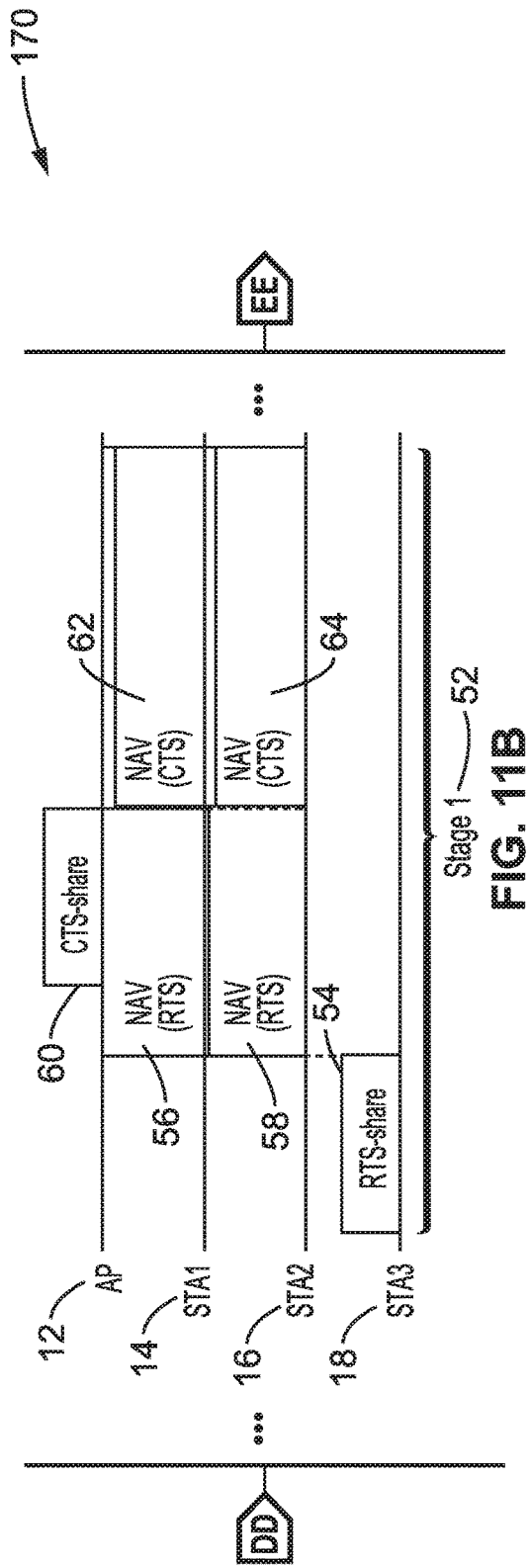

In FIG. 11A and FIG. 11B are seen Stage 0 150 and stage 1 170, which depict the same operations represented in FIG. 10A and FIG. 10B.

Figure 11C:
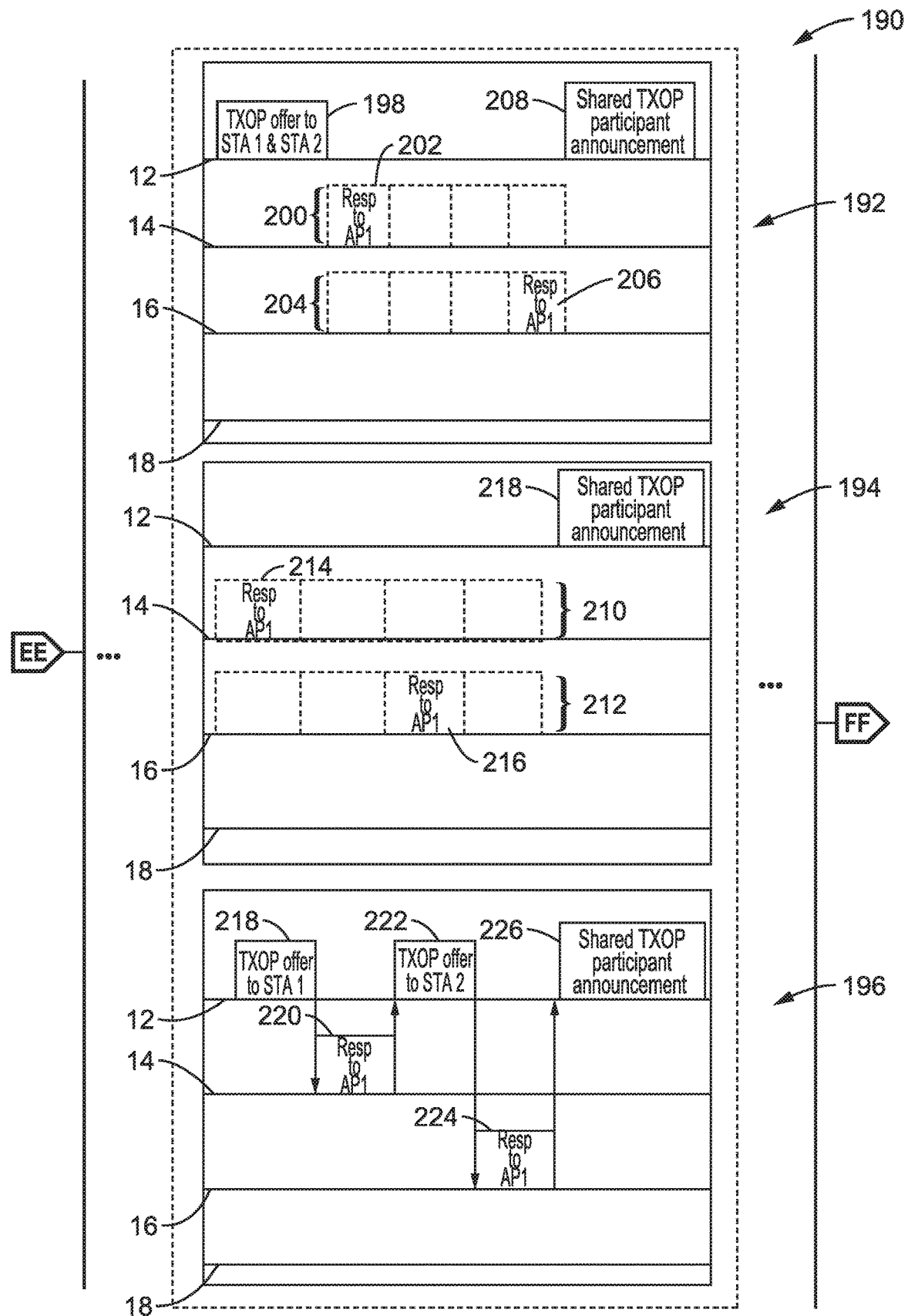

FIG. 11C shows a Stage 2 embodiment 190 of requests in which the AP finds the shared TXOP participant STAs and informs the TXOP holder STA, depicted with three variations 192, 194, 196.

In the upper portion 192 of the figure is an example in which the AP broadcasts a TXOP offer 198 to STA1 and STA2 to determine if they want to participate in an upcoming stage of shared TXOP. Then during the current stage of TXOP, once other non-AP STAs receive this TXOP offer frame, and are willing to participate in the shared TXOP, they should respond in the time slots with random access or dedicated access to the channel 200, 204, and STA1 sends response 202 and STA2 sends response 206 back to the AP. The AP then unicasts 208 the shared TXOP participants announcement frame to STA3 with an indication of the buffer status of each non-AP TXOP participant STA that wants to join the following shared TXOP.

In the middle portion 194 of the figure a shared RTS/CTS has been sent indicating the start of the shared TXOP. In response to this in the current stage of TXOP 210, 212, the non-AP STAs that want to join the following shared TXOP can directly respond to the AP with an indication of their buffer status by randomly accessing or performing a dedicated access of the channel. STA1 sends response 214 and STA2 sends response 216 to the AP on whether they want to participate. The AP then announces 208 the shared TXOP participant information by indicating their buffer status and unicasting the shared TXOP participant announcement frame to STA3.

In the lower portion 196 of the figure is an example in which the AP unicasts offers to one or more of the STAs to determine if they want to participate. In the example shown the AP sends a TXOP offer 218 to STA 1 and STA 1 responds 220. The AP then sends a TXOP offer 222 to STA 2 and STA 2 responds 224. The AP then includes 226 the shared TXOP participant information such as their buffer status and unicasts a shared TXOP participant announcement frame to STA3.

Figure 11D:
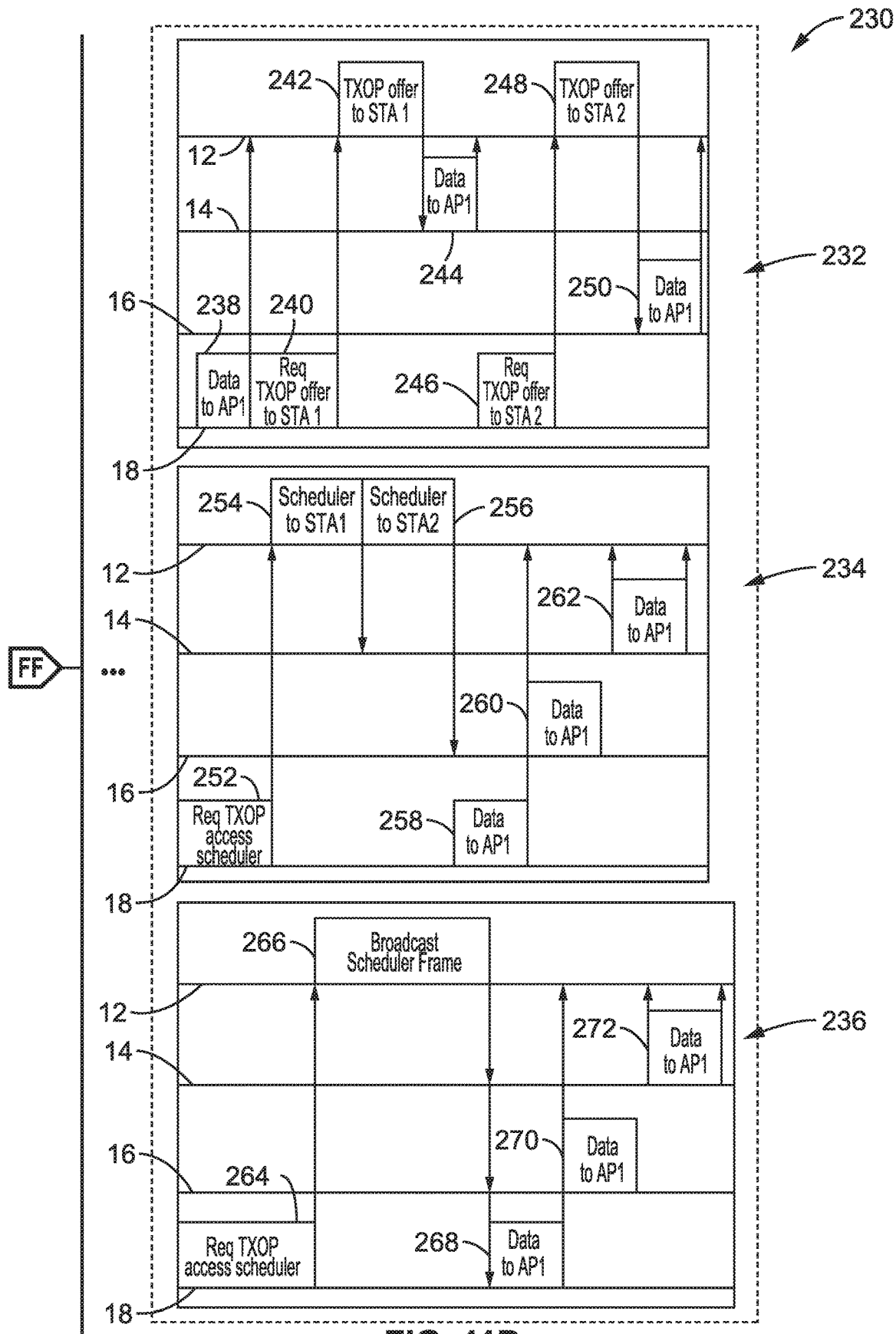

FIG. 11D shows a Stage 3 embodiment 230 which is the shared TXOP access is passed by the AP. Variations are shown in which: (a) the TXOP holder unicasts offers 232 through the AP, (b) the TXOP holder broadcasts sharing offers and schedule to the AP which either unicasts 234, or broadcasts 236 these schedules to the non-AP STAs.

In the upper portion of the FIG. 232 is an example showing STA 3 sending Data 238 to AP, after which it sends a request TXOP offer 240 for STA1 to the AP. The AP then sends the TXOP offer 242 to STA1 and STA1 sends Data 244 back to the AP. Similarly, STA 3 sends a request TXOP offer 246 for STA2 to the AP. The AP then sends the TXOP offer 248 to STA2 and STA2 sends Data 250 back to the AP.

In the middle portion of the FIG. 234 is an example showing STA 3 sending a request TXOP access schedule 252 for all stations to the AP. The AP then unicasts a schedule 254 to STA 1, then unicasts a schedule 256 to STA 2. After this, the TXOP holder of STA3 sends its Data 258 to the AP, after which the other stations send Data in their scheduled time slots, seen as Data 260 and 262.

In the lower portion of the FIG. 236 is an example showing STA 3 sending a request TXOP offer schedule 264 for all stations to the AP. The AP then broadcasts this schedule 266 to STA1 and STA2. With this overhead completed STA 3 then sends Data 268 back to the AP, followed by the other stations sending data to the AP in their respectively scheduled TXOP slots, shown here with Data 270 from STA 2, and Data 272 from STA 1.

Figure 12:
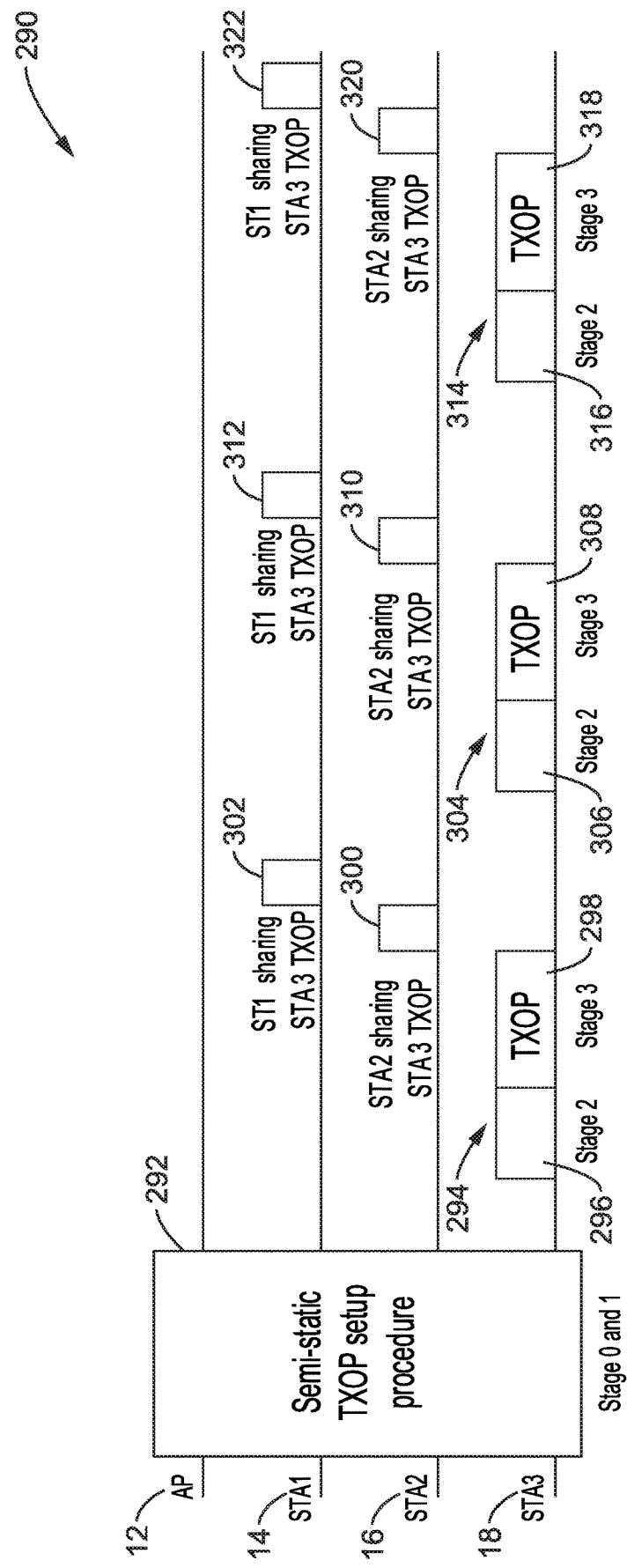
FIG. 12 is a communication sequence diagram of a semi-static scenario in the time domain, with or without the AP as coordinator, according to at least one embodiment of the present disclosure.

FIG. 12 illustrates a semi-static overview example Scenario 3 290 depicting interactions between AP 12, STA1 14, STA2 16 and STA3 18. Shown combined here is Stage 0 and Stage 1 292 which includes both a share offer/request setup stage and a TXOP holder configuration setup stage. Stage 2 represents a TXOP sharing announcement stage and Stage 3 represents a TXOP sharing phase.

The STA can set a configuration for TXOP sharing at some point through a setup procedure (with STAs or with the AP) and every time a TXOP is gained in the channel, the STA shares this TXOP with a preset number of STAs for a preset duration of time.

In the example multiple TXOP are seen 294, 304 and 314, each showing a Stage 2 TXOP sharing announcement phase 296, 306 and 316, each followed by the TXOP portion used by the TXOP holder STA 3 298, 308 and 318. As a result recurrent sharing of the TXOP held by STA 3 is performed seen with STA2 sharing 300, 310 and 320, and STA1 sharing 302, 312 and 322.

Figure 13A:
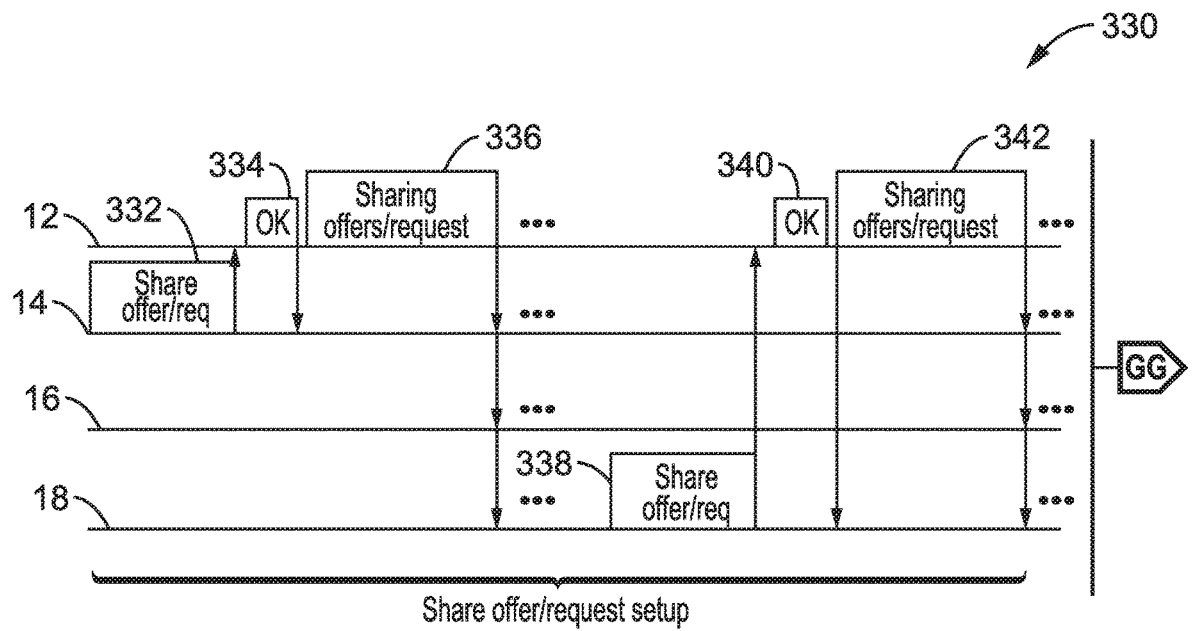
FIG. 13A through FIG. 13C is a communication sequence diagram of a more in depth example of a semi-static scenario in the time domain according to at least one embodiment of the present disclosure.
Figure 13B:
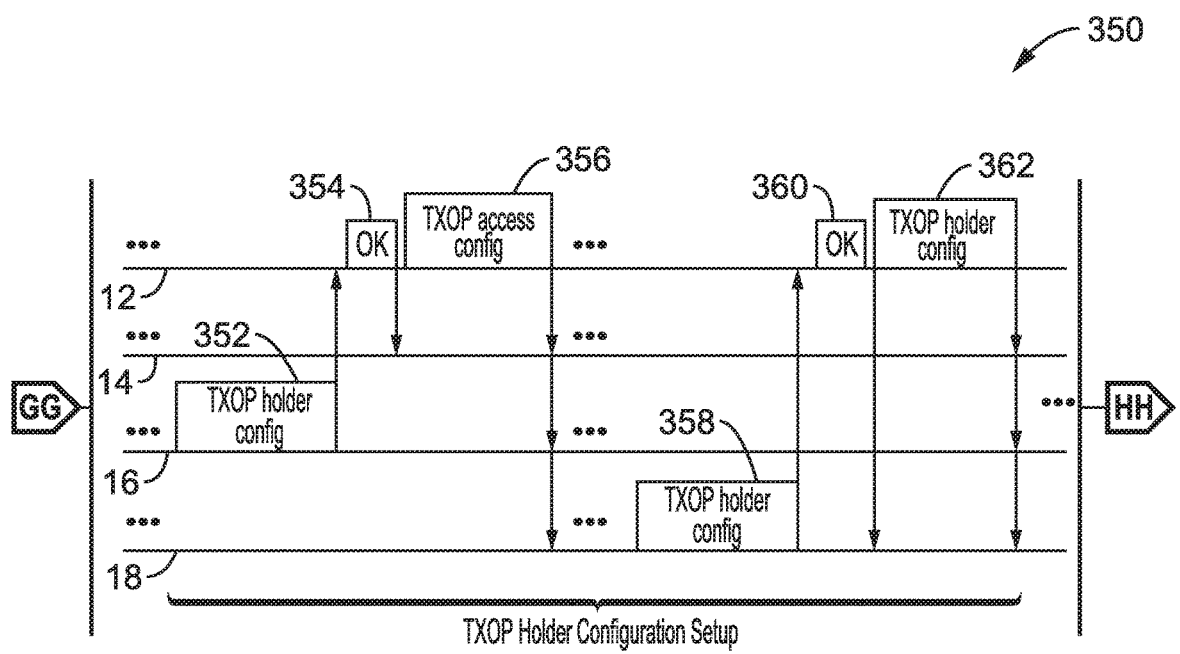
Figure 13C:
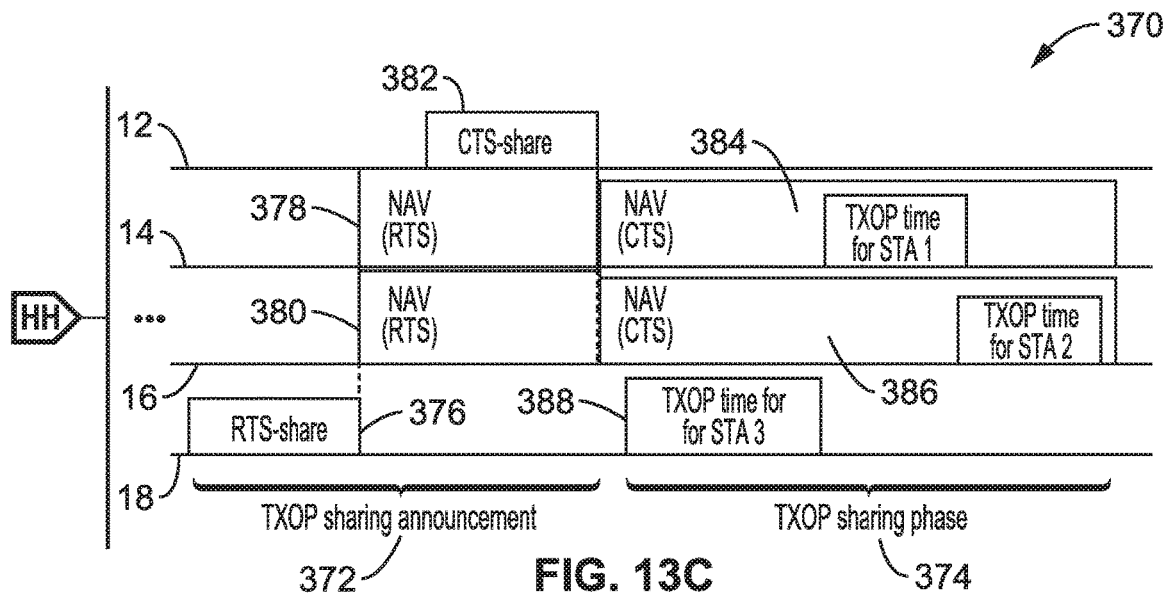

FIG. 13A through FIG. 13C illustrate an example embodiment 330, 350, 370 showing communications according to the protocol for the semi-static scenario having four stages, which was previously summarized in FIG. 12. As in the previous examples interactions are shown by way of example and not limitation between AP 12, STA1 14, STA2 16 and STA3 18.

FIG. 13A shows an embodiment 330 of a stage performing a share offer/request setup in which non-AP STAs exchange the share offer/request information with each other. In this example STA 1 sends a share offer/request 332 to the AP, which the AP acknowledges 334 and the AP then shares 336 this information with the other STAs. Similarly, STA 3 can be seen sending a share offer/request 338 to the AP, which the AP acknowledges 340 and the AP then shares 342 this information with the other STAs.

FIG. 13B shows an embodiment 350 of a stage performing a TXOP holder configuration setup stage in which a potential TXOP holder STA exchanges the configuration, semi-static TXOP sharing schedule with all STAs. In this example, STA 2 sends TXOP holder configuration information 352 to the AP, which acknowledges (OK) receipt 354, and then sends a TXOP access configuration 356 to the other STAs. Similarly, STA 3 sends TXOP holder configuration information 358 to the AP, which acknowledges (OK) receipt 360, and then sends a TXOP access configuration 362 to the other STAs.

In FIG. 13C shows an embodiment 370 of a stage performing TXOP sharing announcements and TXOP sharing. In the TXOP sharing announcement stage 372 the TXOP holder STA announces that the coming TXOP is allowed to be shared according to the agreed on configuration.

In the TXOP sharing phase 374 non-AP STAs access the shared TXOP according to the agreed on configuration. STA3 can be seen sending an RTS-share 376 to the AP, which indicates the NAV 378, 380 of the RTS-share. The AP responds to STA3 with a CTS-share 382, STA1 and STA2 receive the CTS-share and thus are made aware of the NAV value 384, 386 set in the CTS-share. In response to the CTS-share, the TXOP holder of STA 3 uses its portion 388 of the shared TXOP interval, after which the other stations share the TXOP, exemplified with STA 1 and STA 2 both sharing the TXOP.

5. Non-AP STA Hardware Setup

Figure 14:
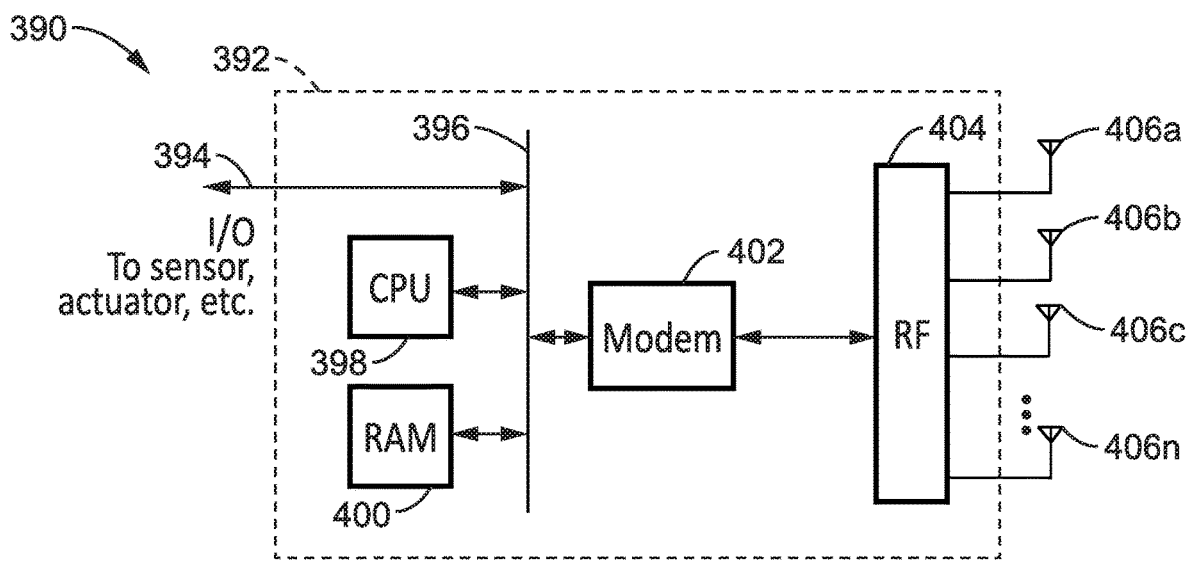
FIG. 14 is a hardware block diagram of wireless station hardware according to at least one embodiment of the present disclosure.

FIG. 14 illustrates an example embodiment 390 of a non-AP STA hardware setup, with external I/O 394 into circuitry 392 having a CPU 398 and RAM 400 for executing a program(s) which implement the communication protocol. The host machine accommodates at least one modem to support communications coupled to an RF module connected to multiple antennas for performing beamforming for transmission and reception. In this way, the STA can transmit signals using multiple sets of beam patterns.

Specifically, a WLAN station according to the present disclosure is shown with an I/O path 394 is shown into circuit block 392 which has a bus 396 connected to at least one computer processor (CPU) 398, memory (RAM) 400, and at least one modem 402. Bus 394 allows connecting various devices to the CPU, such as to sensors, actuators and so forth. Instructions from memory 400 are executed on processor 398 to execute a program which implements the communication protocol, which are executed to allow the STA to perform the functions of an access point (AP) station or a regular station (STA). It should also be appreciated that the programming is configured to operate in different modes (source, intermediate, destination, first AP, other AP, stations associated with the first AP, stations associated with other AP, coordinator, coordinatee and so forth), depending on what role it is playing in the current communication context.

This host machine is shown configured with at least one modem and RF circuit. By way of example and not limitation, a mmW modem 402 is coupled to at least one radiofrequency (RF) circuit 404 which connects to a plurality of antennas 406a, 406b, 406c through 406n (e.g., antenna array) to transmit and receive frames with neighboring STAs. The combination of processor, modem and RF circuits, allow beamformed (directional) communications to be supported, as well as for supporting quasi-omni (referred to herein simply as omni) mode transmissions from the antenna array. In addition, in at least one preferred embodiment nulls can be generated in directional patterns created by the antenna array to shield select directions (sectors) and thus reduce interference between stations.

Thus, the STA HW is shown configured with at least one modem, and associated RF circuitry for providing communication on at least one band. By way of example and not limitation the intended directional communication band is implemented with a mmW band modem and its associated RF circuitries for transmitting and receiving data in the mmW band. In some implementations another band can be supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 402, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

6. Topology and Scenario Description

6.1. Topology Under Study

Figure 15:
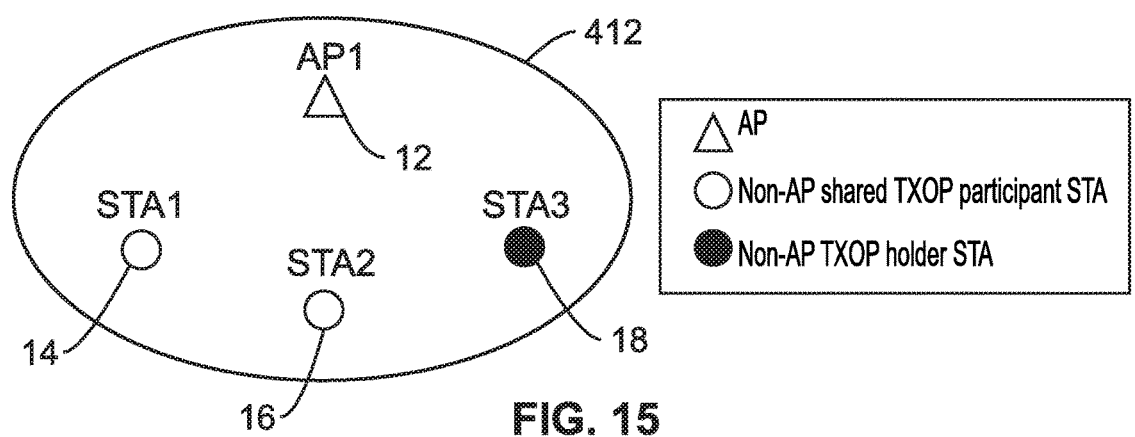
FIG. 15 is a network topology diagram shown by way of example and not limitation as a single BSS scenario, which consists of one AP and three STAs.

FIG. 15 illustrates an example topology 410 of a single Basic Service Set (BSS) scenario, which consists of one AP 12 and three STAs 14, 16 and 18, which are shown by way of example and not limitation, as the present disclosure can support any topology arising between a number of stations which may comprise APs, non-AP shared TXOP participants, and non-AP TXOP holder STAs.

However, for the sake of fostering understanding the examples given herein for illustrative purposes of interactions between only a few stations each described with their specific roles for the example. For the sake of simplifying the illustrations STA3 will be generally considered the non-AP TXOP holder STA, and the other two STAs are non-AP shared TXOP participant STAs. It will be noted that a holder STA obtains (grabs) the channel and is willing to share the TXOP with other non-AP STAs. A TXOP participant STA doesn't itself obtain (grab) the channel but is willing to join a TXOP shared by the TXOP holder STA.

6.2. Scenario Description

The example scenario being studied has a BSS containing one AP and multiple non-AP STAs which are considered to be periodically generating packets that need to be transmitted to the AP. Although the present disclosure is amenable for use in any wireless communication scenario, the study focuses on the UpLink (UL) Orthogonal Frequency Division Multiple Access (OFDMA) transmission, since latency is always a critical issue in this case due to the more complex scheduling that must take place between each non-AP STA and the AP.

In 802.11ax technology multiple-STAs can send UL DATA sequences simultaneously within a shared TXOP, which improves the TXOP utilization efficiency.

However, in 802.11ax, the AP is the only device that can initiate the UL data transmission. The AP usually sends a trigger frame (e.g., Buffer Status Report Poll (BSRP)) to the non-AP STAs to inquire on their buffer status and their traffic priorities. Upon receiving a response frame (e.g., Buffer Status Report (BSR)) from those non-AP STAs. The AP sends another trigger frame (e.g., Basic Trigger) with the resource allocation information to those non-AP STAs for them to use for sending the UL data sequence.

The AP initiated TXOP cannot capture the dynamic needs from the non-AP STAs side, especially for those non-AP STAs who have RTA (Real Time Application) packets to be transmitted. Although these RTA packets are typically of a small size (small number of bytes), however, the requests require rapid transmission as they are latency sensitive.

In this study, a new solution is described from the perspective of the non-AP STAs. Specifically the disclosure addresses situations in which non-AP STAs sense that the channel is available and they have packets to be sent to the AP immediately. The shared TXOP scheme is enabled by the STA which obtains the channel for access and is willing to share the channel access in the following TXOP with other STAs. The shared TXOP scheme efficiently decreases packet latency by reducing backoff delay and providing more efficient channel utilizations to the STAs contending for channel access.

More specifically, the present disclosure has the following general attributes. (a) Once any non-AP STA obtains the channel for access, it can initiate sharing of the TXOP immediately. This non-AP STA is referred to herein as a non-AP TXOP holder STA. (b) The non-AP STAs that are willing to participate in the following shared TXOP, are referred to herein as non-AP shared TXOP participant STAs. (c) The non-AP TXOP holder STA shares the TXOP duration in the time domain with other non-AP shared TXOP participant STAs that are either in the same BSS or in another BSS. (d) The non-AP TXOP holder STA does not need to wait for the AP to initiate the shared TXOP access. (e) The non-AP TXOP holder STAs are capable of scheduling and distributing the available channel access time resources to other non-AP shared TXOP participant STAs. (f) The non-AP TXOP holder STA can provide scheduling information to the AP once the TXOP is reserved. (g) The potential non-AP TXOP holder STAs can use a predetermined scheduling to allocate channel access resources.

The teachings of the present disclosure can aid in reducing channel access latency and also increase channel utilization efficiency.

Figure 16:
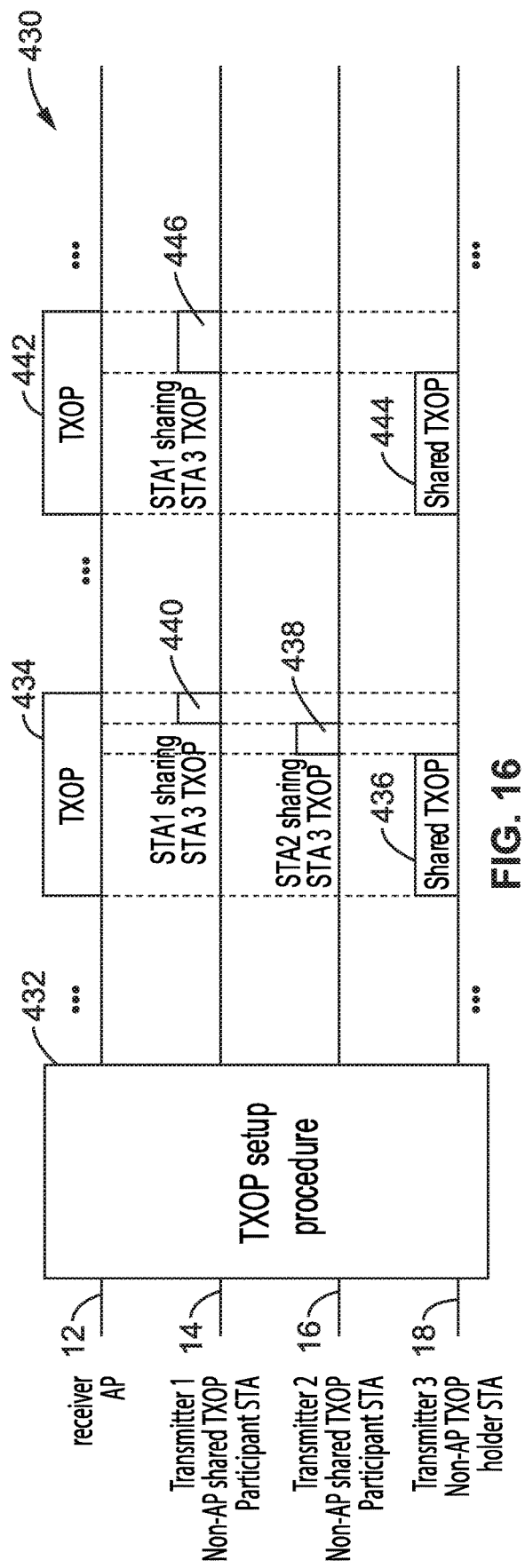
FIG. 16 is a communication sequence diagram of a shared TXOP initiated by the non-AP TXOP holder STA, according to at least one embodiment of the present disclosure.

FIG. 16 illustrates an example embodiment 430 of a shared TXOP initiated by the non-AP TXOP holder STA, exemplified as between AP 12, STA1 14, STA2 16 and STA3 18. The figure shows a high-level example of the shared TXOP protocol initiated by the non-AP TXOP holder STA.

In the TXOP setup procedure 432, non-AP STAs including the non-AP TXOP holder STA and the non-AP shared TXOP participant STAs, exchange the TXOP shareability information through the coordination of AP.

There are two TXOPs 434, 442 shown in this figure. When a non-AP TXOP holder STA obtains the channel, it initiates the UL shared TXOP. The TXOP holder STA may need to confirm which non-AP STA(s) is willing to participate in the following shared TXOP. Then, the share TXOP access starts, the TXOP holder STA transmits UL DATA 436, 444 on the reserved channel access time slot. The non-AP shared TXOP participant STAs then transmits UL DATA 438, 440 and 446 on the time slots assigned by the non-AP TXOP holder STA.

6.3. Scenario Classification

In this section of the disclosure different solutions are described regarding two different scenarios, which include the dynamic scenario and the semi-static scenario. For both scenarios solutions are discussed in regard to whether or not the AP participates as a coordinator. Section 7 analyzes the solution in the single BSS scenario, Section 8 describes the frame format design, and Section 9 summarizes the proposed solution.

7. Protocol Design

Following is a detailed introduction of the present disclosure for the dynamic scenario, with or without AP coordination, and the semi-static scenario in this section.

7.1. Overview of the Protocol Design

Figure 17:
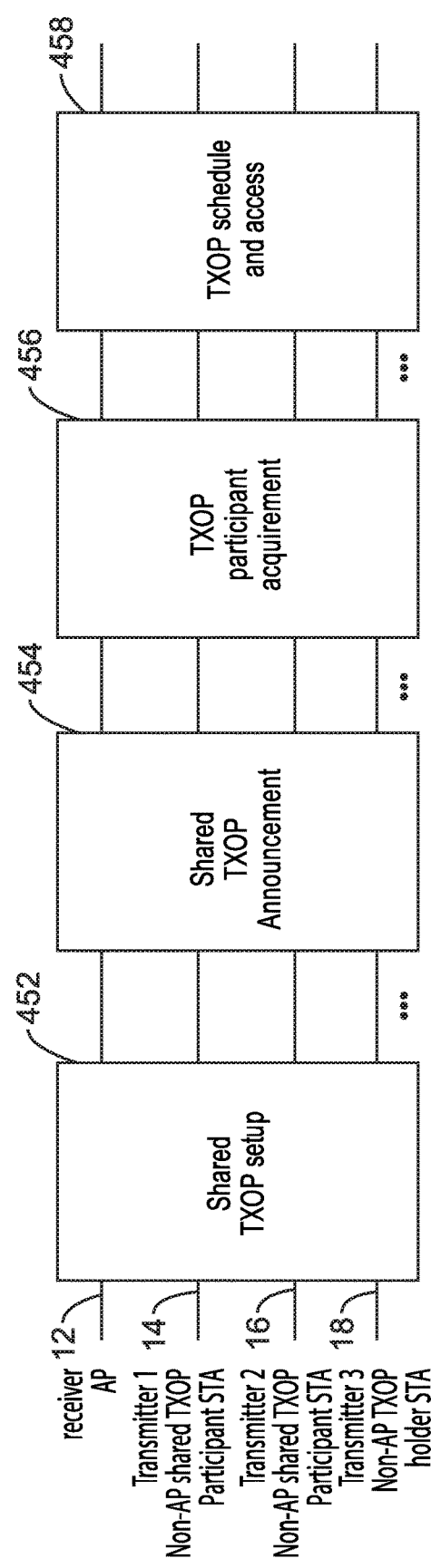
FIG. 17 is a communication sequence/protocol diagram of an overview of general steps performed in the TXOP sharing protocol according to at least one embodiment of the present disclosure.

FIG. 17 illustrates an example embodiment 450 which overviews the general flow of the protocol with interactions exemplified for illustrative purposes between AP 12, STA1 14, STA2 16 and STA3 18. In this example a non-AP STA senses the channel is available and obtains the channel and shares its channel access in the time domain with other STAs in the following TXOP. If other STAs also have UL DATA to transmit, they will access the channel following the scheduling as determined by the shared TXOP holder STA or based on the predetermined semi-static scheduling scheme.

The disclosed protocol can be generally considered to utilize four stages and can be applied to different channel access designs such as random access and scheduled access. It should be appreciated that the number of stages herein is determined by the functions being performed during each stage, wherein depending on the how these are organized one could define a different number of stages without departing from the teachings of the present disclosure.

In the first stage 452 is shown a shared TXOP setup, in which the non-AP STAs, including the TXOP holder STA and the shared TXOP participant STAs, exchange the TXOP shareability information which provides the information necessary to indicate that the STA is willing to share its offer/request of the TXOP by embedding this information in the authentication frame, or association frame, or any other frames that are exchanged through the coordination of the AP.

In the second stage of shared TXOP announcement 454 a shared TXOP initialization is performed in which the non-AP TXOP holder STA gains channel access and announces it is willing to share the TXOP with other non-AP STAs. This sharing process is achieved by, for example, sending an RTS-share frame to the associated AP to indicate that the TXOP is shareable. Then, the AP responds to the TXOP holder STA to confirm successful reception, such as by responding back by sending a CTS-share frame.

In the TXOP participant acquirement stage 456, the non-AP TXOP holder STA inquires of the other non-AP STAs, such as for example unicasting or broadcasting a TXOP offer frame, to identify the non-AP shared TXOP participant STAs in the following shared TXOP, and then receiving an access request frame from the non-AP shared TXOP participant STAs.

In the fourth stage of TXOP schedule and access 458, the non-AP TXOP holder STA and the non-AP shared TXOP participant STAs access the channel at the reserved and scheduled time, respectively. The non-AP TXOP holder STA transmits UL DATA using the reserved time slot. The non-AP shared TXOP participant STAs transmit UL DATA using the assigned timeslots or randomly accessing the remaining RUs, depending on which channel access protocol is used.

7.2. Dynamic Scenario without AP as Coordinator

In this case the non-AP TXOP holder STA obtains the channel instead of waiting for the AP to send trigger frames. The non-AP TXOP holder STA is able to initiate the MU UL transmission with other non-AP STAs. The non-AP TXOP holder STA can directly coordinate with other non-AP STAs who are willing to participate in the following shared TXOP.

7.2.1. Shared TXOP Setup Stage

Figure 18:
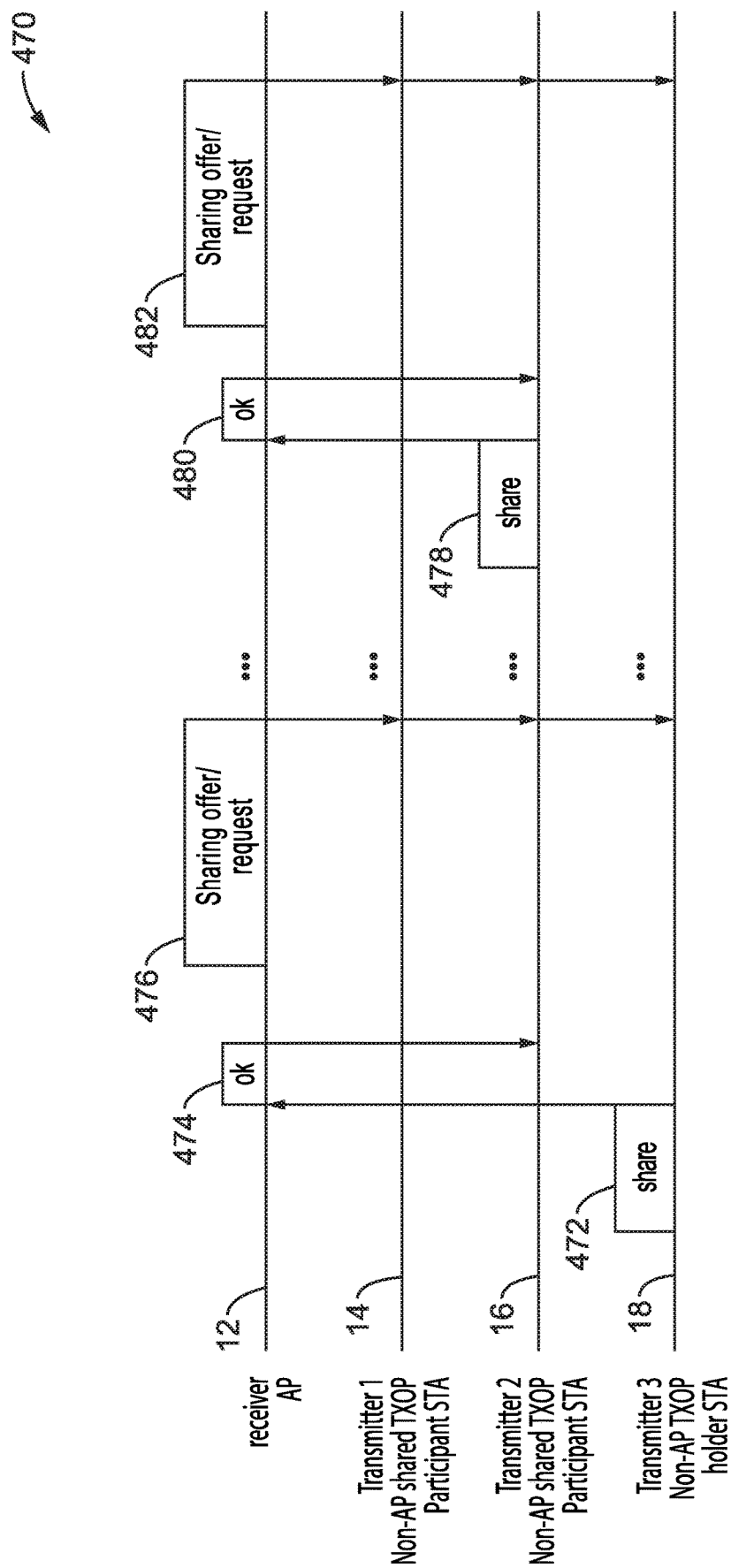
FIG. 18 is a communication sequence diagram of a shared TXOP setup stage, according to at least one embodiment of the present disclosure.

FIG. 18 illustrates an example embodiment 470 of a shared TXOP setup stage with interactions depicted between AP 12, STA1 14, STA2 16 and STA3 18. In the figure the procedure is shown of a shared information exchange in the shared TXOP setup stage. The non-AP STAs indicate their shareability 472 in a frame exchanged with the AP, such as for example an element can be attached to the authentication frame, association frame or any other frame exchanged with the AP, which are sent to the associated AP. Once the AP receives the authentication or the association frame, it checks the share information and responds 474 with a frame to confirm (ACK) successful reception. Then the AP broadcasts the shareability 476 of all the associated non-AP STAs with a sharing offer/request frame. In this case, once a non-AP STA receives a sharing offer/request frame, it is then aware of the shareability, that is to say it can determine which STAs are willing to share and which station is requesting TXOP time of other non-AP STAs. Another share 478 is also seen from non-AP STA 2 to the AP, which acknowledges 480 and broadcasts shareability 482.

The new elements embedded in the authentication, association or the beacon frames include at least the following: (a) a STA TXOP Shareability Element, which is designed for exchanging sharing information; and (b) an Access Request Information Element, which is designed for exchanging access time slot information and transmission request information.

The shared TXOP setup stage is a common stage for the dynamic scenarios with or without using the AP as coordinator. The shareability information is implemented in management frames using a new element designed as STA TXOP Shareability Element.

Figure 19:
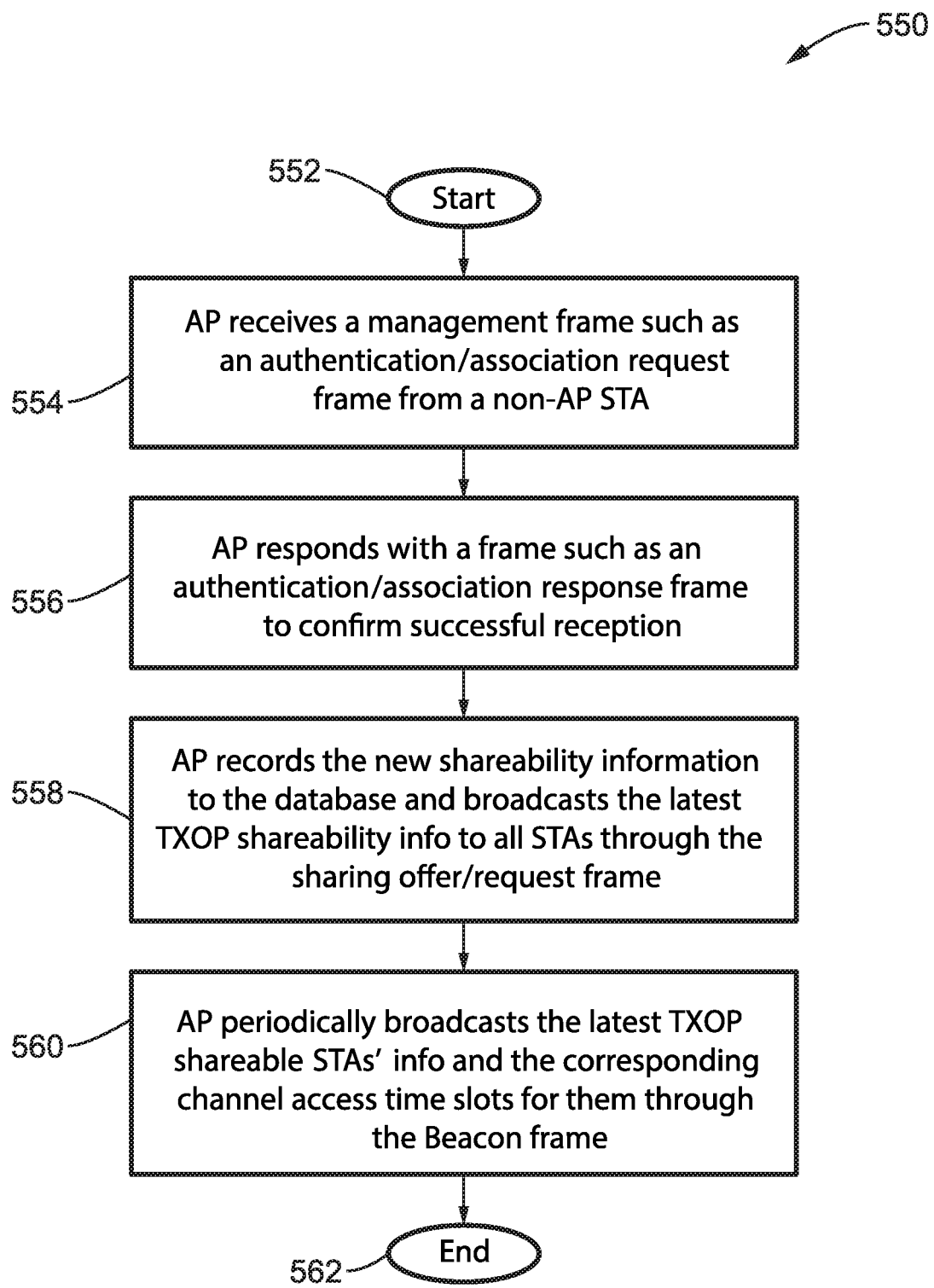
FIG. 19 is a flow diagram of a shared TXOP setup stage performed on the AP level, according to at least one embodiment of the present disclosure.

FIG. 19 illustrates an example embodiment 550 of a shared TXOP setup stage at the AP level. After the shared TXOP Setup stage starts 552, the AP receives 554 a management frame such as an authentication request frame or association request frame from a non-AP STA that indicates if it is willing to offer/request a shared TXOP with other non-AP STAs. The AP retains information on this non-AP STA's shareability and sends back 556 an authentication/association response frame to confirm successful reception. Then the AP preferably first records 558 the latest shareability information to its database and then rebroadcasts the latest shareability information to all the associated non-AP STAs with a sharing offer/request frame. The AP also periodically broadcasts 560 the latest TXOP shareable STAs' information and the channel access time slot assignment through the Beacon frame before ending 562.

Figure 20:
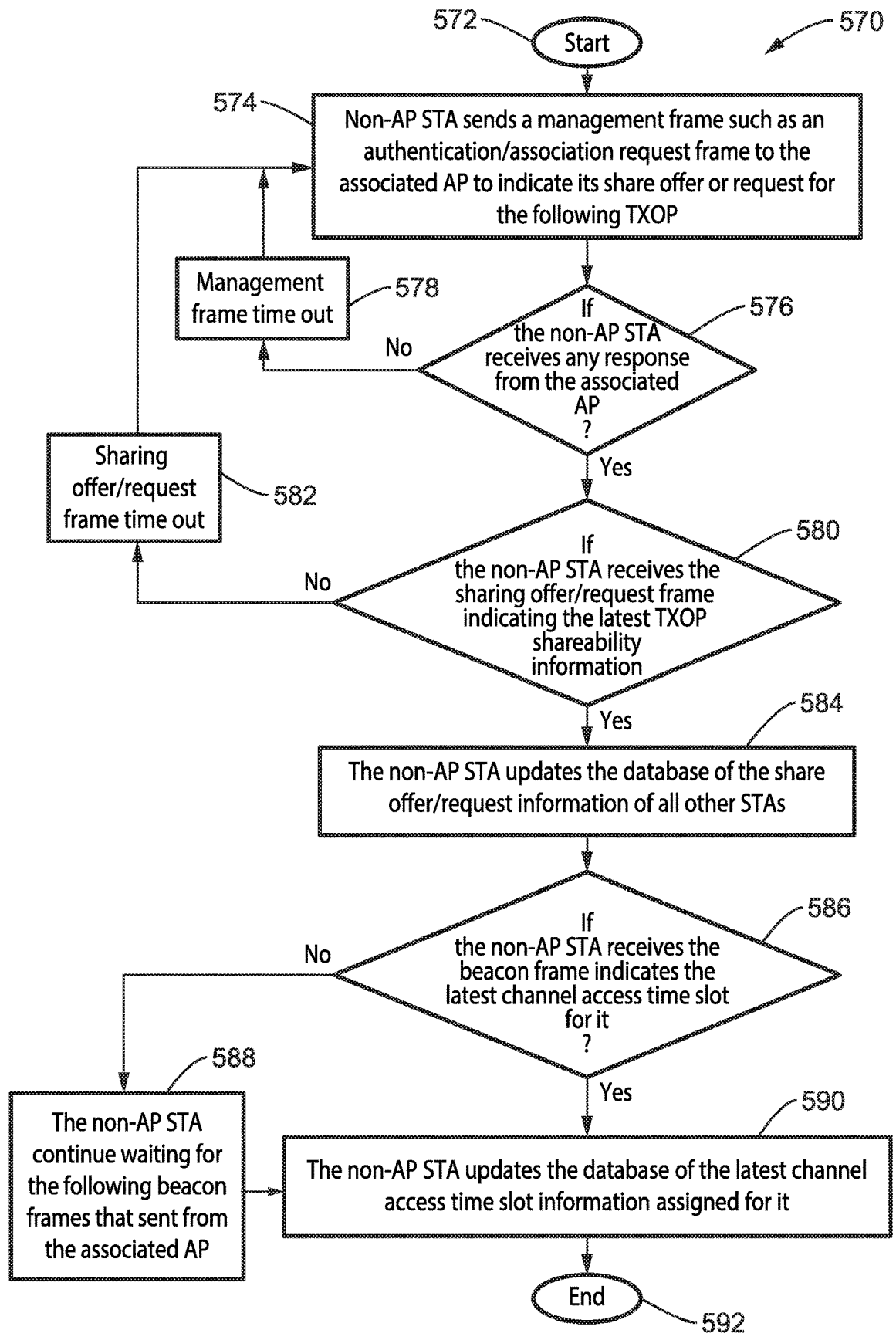
FIG. 20 is a flow diagram of a shared TXOP setup stage performed on the non-AP STAs level according to at least one embodiment of the present disclosure.

FIG. 20 illustrates an example embodiment 570 of the shared TXOP setup stage that is handled on a non-AP STAs level. After the shared TXOP Setup stage starts 572 the non-AP STA sends 574 a management frame, such as an authentication/association request frame to the associated AP to indicate its share offer/request information of the shared TXOP. A check 576 determines if the non-AP STA receives feedback from the associated AP before the management frame timeout, after it has sent an authentication frame or the association frame that contains the share offer/request information. If no response is received, then a management frame time out 578 has occurred, and the non-AP STA should retransmit 574 the management frame to the associated AP to indicate its shareability.

If at block 576 it is determined that the non-AP STA receives a response then block 580 is reached which determines if the response is a sharing offer/request frame from the associated AP indicating the latest TXOP shareability information of all associated non-AP STAs. If the response is not this shareability information, then block 582 is reached as the sharing offer/request has timed out, and the non-AP STA should send another frame 574.

Otherwise, if the shareability information is received, then block 584 is reached and the non-AP STA updates its database of the share offer/request information for all other STAs.

A decision is then made at block 586 to determine if the non-AP STA received the beacon frame indicating the latest channel access time slot for it. If it receives this beacon frame, then at block 590, the non-AP STA updates the database of its latest channel access time slot. Otherwise, if it did not receive this beacon frame at block 586, then the non-AP STA should keep waiting 588 for the following beacon frames sent from the associated AP, and keep updating the database based on the latest channel access time slot information assigned for it before the process ends 592.

7.2.2. Shared TXOP Announcement Stage

Figure 21:
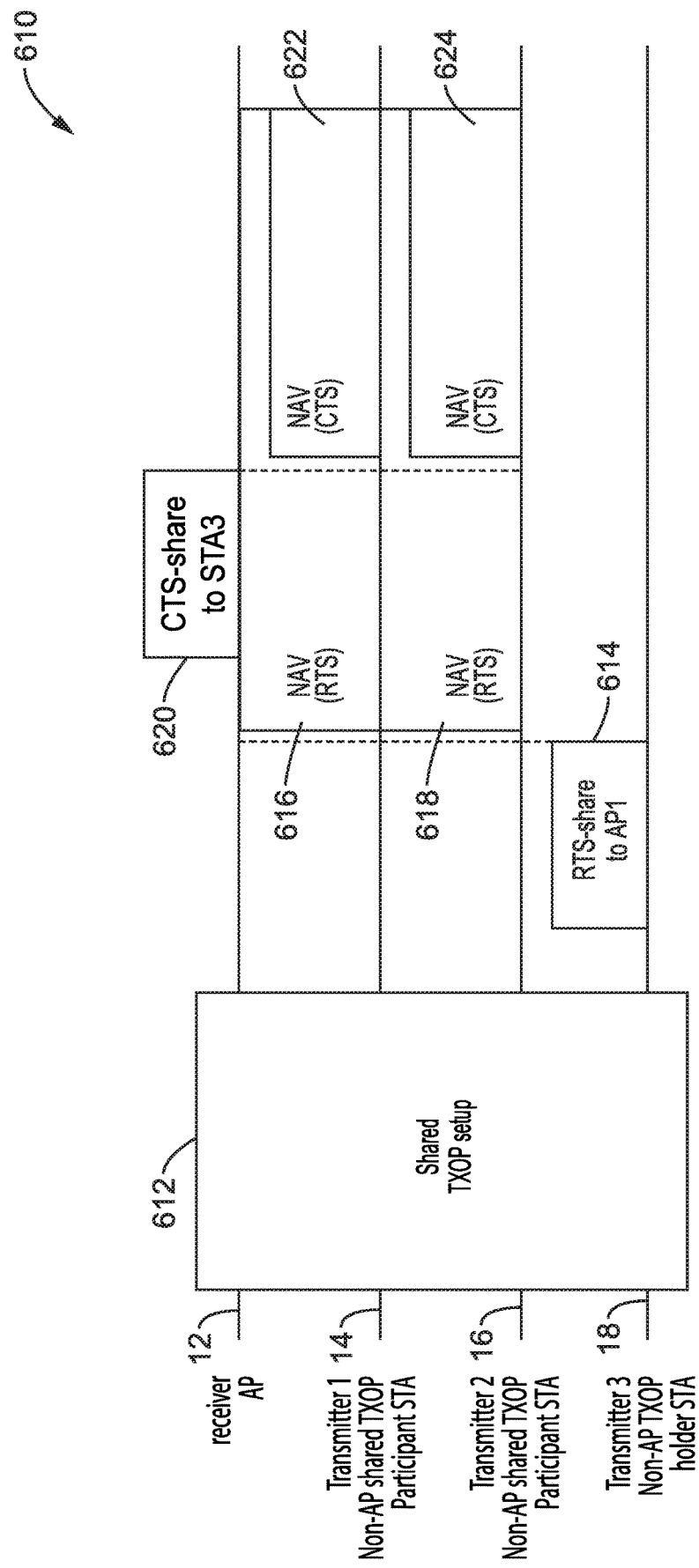
FIG. 21 is a communication sequence diagram of a shared TXOP announcement stage according to at least one embodiment of the present disclosure.

FIG. 21 illustrates an example embodiment 610 of a shared TXOP announcement stage being performed after the shared TXOP setup stage 612 with interactions depicted between AP 12, STA1 14, STA2 16 and STA3 18. The non-AP TXOP holder STA senses that the channel is free (available) and it obtains the channel, and announces its willingness to share the TXOP by sending an RTS-share frame 614 to the AP, the other non-AP stations receive the RTS-share frame and are made aware of the NAV 616, 618 (set in RTS-share). After the AP receives the RTS-share frame 614 from a non-AP TXOP holder STA, it responds with a CTS-share frame 620 to indicate the successful reception and is aware that the TXOP is a shard TXOP. The other non-AP stations receive the CTS-share then check the NAV 622, 624 (set in CTS-share).

Figure 22:
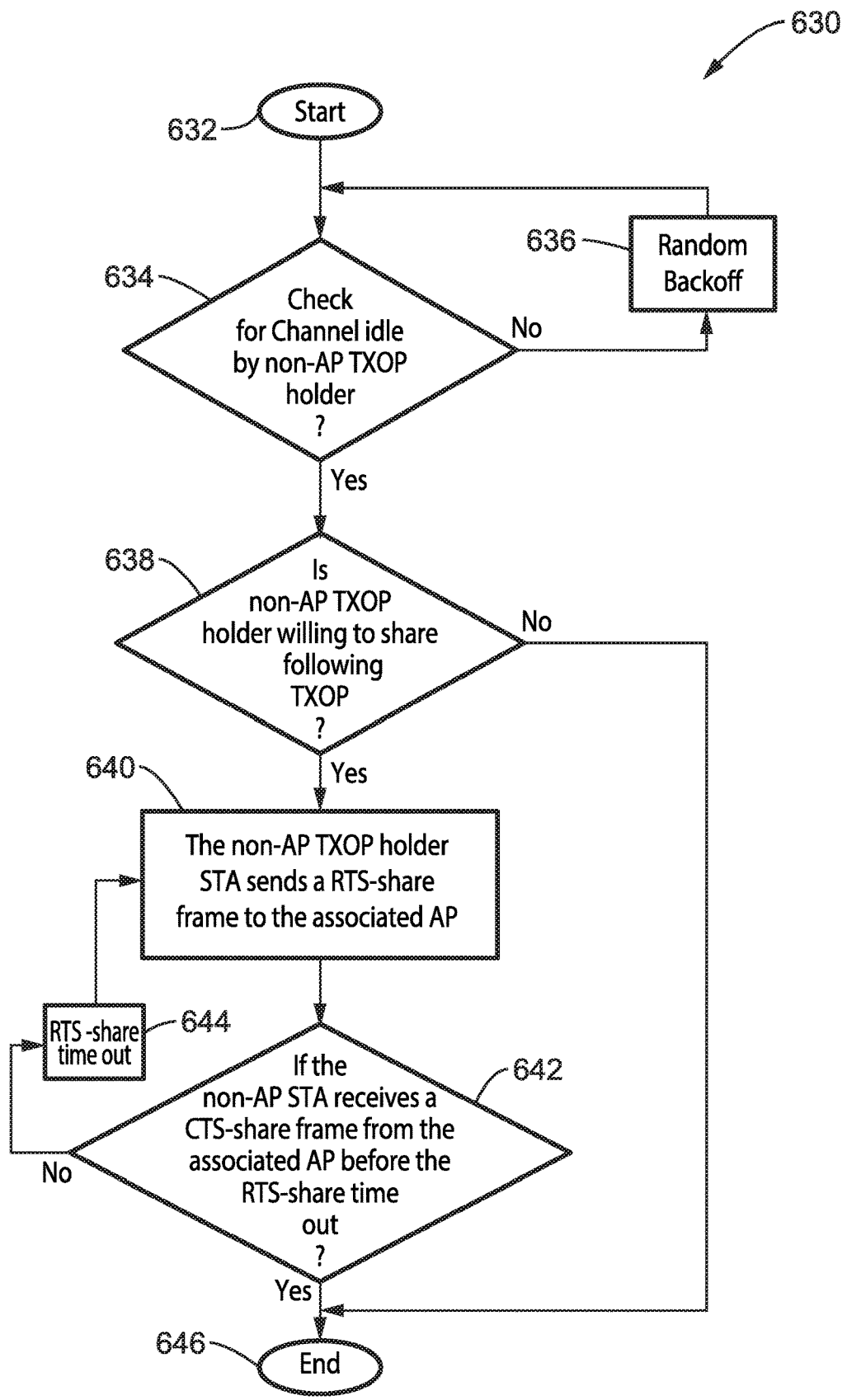
FIG. 22 is a flow diagram of a shared TXOP announcement stage, processed at a non-AP TXOP holder STA according to at least one embodiment of the present disclosure.

FIG. 22 illustrates an example embodiment 630 of a shared TXOP announcement stage, processed at non-AP TXOP holder STA. The process starts 632 and a check 634 is made by the non-AP TXOP holder if the channel is idle. If the channel is not idle the non-AP TXOP holder STA takes a random backoff 636 and returns to block 634 to sense the channel again.

If the channel is idle, then at block 638 a check is made to determine if the non-AP TXOP holder is willing to share the TXOP. If the non-AP TXOP holder is not willing to share the channel then no shared TXOP scheme will be used for the TXOP, and the process ends 646. Otherwise, if it is willing to share the TXOP, then at block 640 the non-AP TXOP holder sends an RTS-share frame to the associated AP.

After this, a check is made 642 to determine if the non-AP STA receives a CTS-share frame from the associated AP before the RTS-share time out. If the CTS-share is not received, then at block 644 an RTS-share timeout occurs and execution returns to block 640 to send another RTS-share. Otherwise, if the CTS-share is received, then the process ends 646.

Figure 23:
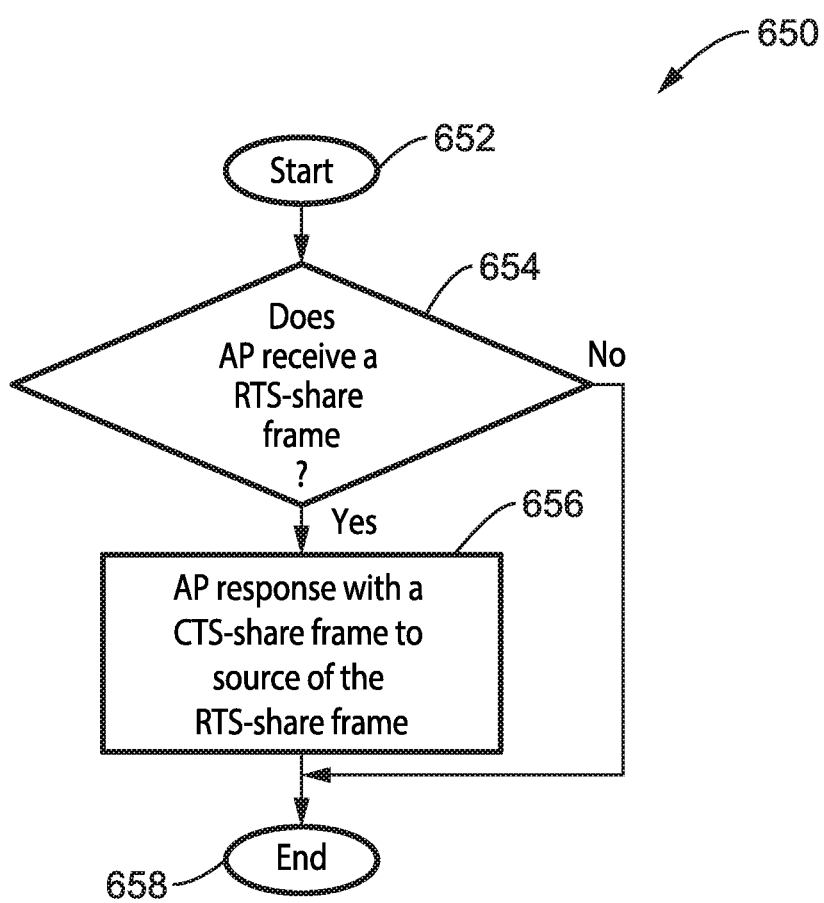
FIG. 23 is a flow diagram of a shared TXOP announcement stage, processed at the AP level according to at least one embodiment of the present disclosure.

FIG. 23 illustrates an example embodiment 650 of the Shared TXOP announcement stage, processed at the AP level. The process starts 652 with a check made 654 to determine if the AP received an RTS-share frame. If the RTS share frame is received, then block 656 is executed with the AP being aware that the TXOP is a shared TXOP and it responds with a CTS-share frame to indicate successful reception, and the process ends 658. Otherwise if a share frame was not received in block 654, then the process ends 658.

7.2.3. TXOP Participant Acquirement (PA) Stage.

7.2.3.1. TXOP PA w/Response after TXOP Offer

Figure 24:
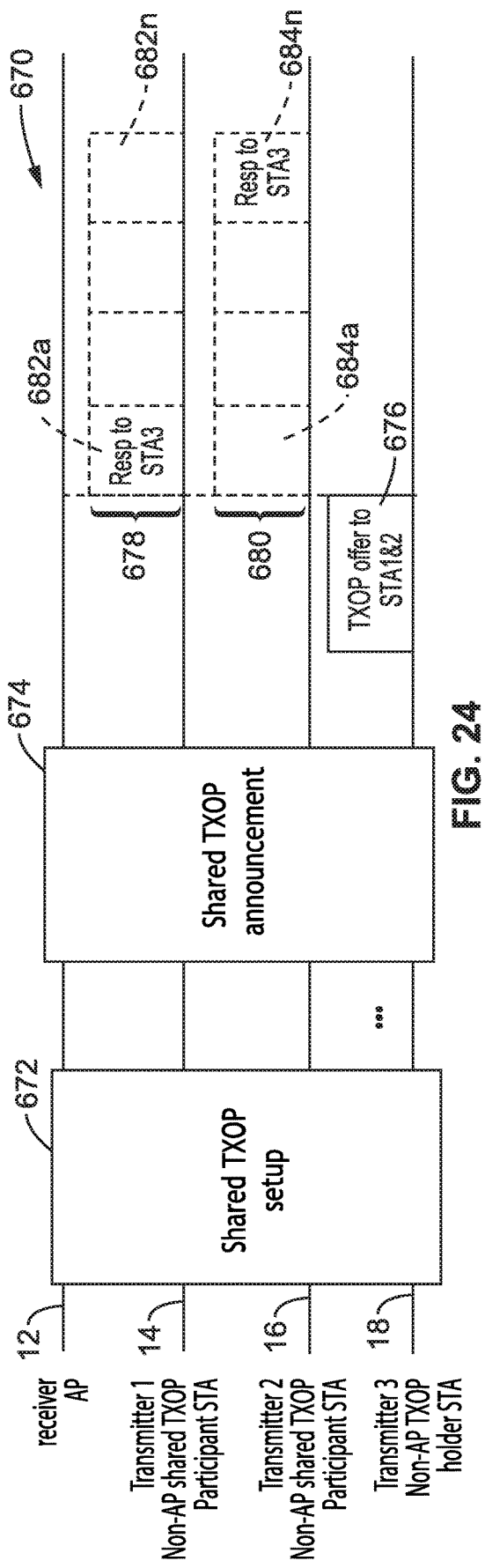
FIG. 24 is a communication sequence diagram of a TXOP participant acquirement (acquisition) stage with response after receiving a TXOP offer, according to at least one embodiment of the present disclosure.

FIG. 24 illustrates an example embodiment 670 of a TXOP participant acquirement stage with response after receiving a TXOP offer with interactions depicted between AP 12, STA1 14, STA2 16 and STA3 18. A shared TXOP setup is performed 672 followed by shared TXOP announcement 674. Then the non-AP TXOP holder STA broadcasts 676 a new frame TXOP Offer frame, indicating that it is willing to share its TXOP, and inquiring if other STAs are willing to join the shared TXOP.

Once STA1 and STA2 received this TXOP Offer frame, they respond 678, 680 with a new Access Request frame to indicate they are willing to join the following shared TXOP with the non-AP TXOP holder STA.

In order to avoid collision of the Access request frames, slot design is implemented for Random access or Dedicated access, which is implemented in the shared TXOP setup stage. Slots are seen 682a-682n, 684a-684n which includes responses sent in specific slot to STA 3 about the sharing offer.

7.2.3.2. TXOP PA with Response after Receiving CTS

Figure 25:
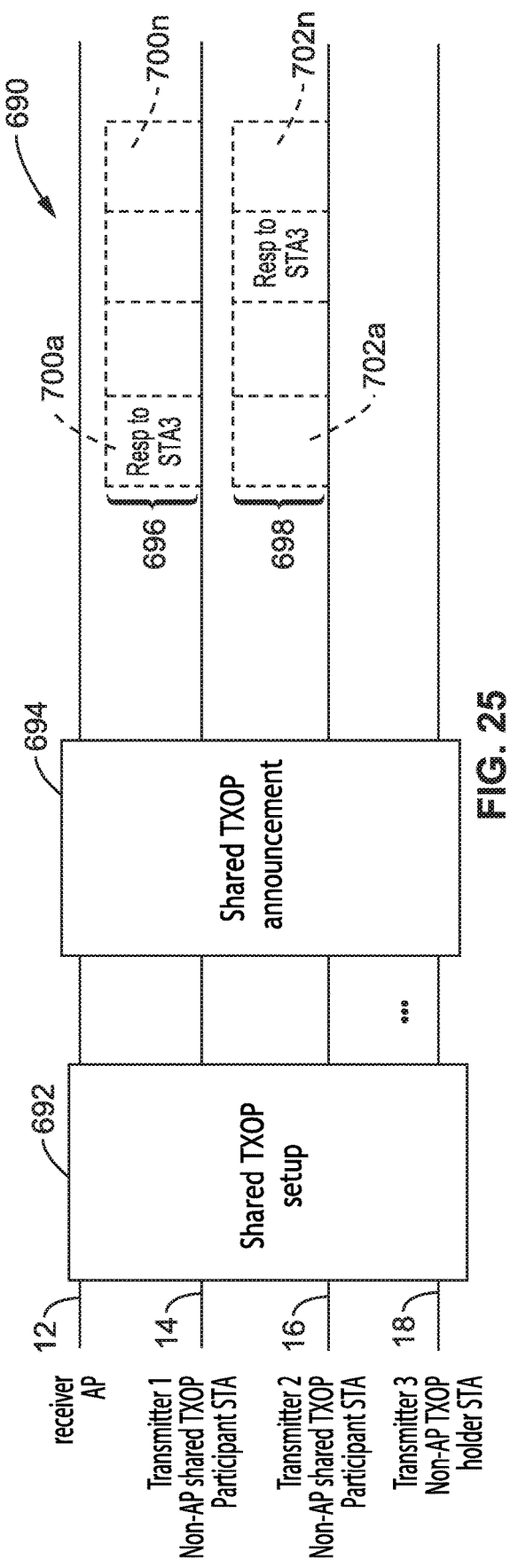
FIG. 25 is a communication sequence diagram of a TXOP participant acquirement (acquisition) stage with response after receiving a Clear To Send (CTS), according to at least one embodiment of the present disclosure.

FIG. 25 illustrates an example embodiment 690 of a TXOP Participant Acquirement (PA) stage with response after receiving CTS-share with interactions depicted between AP 12, STA1 14, STA2 16 and STA3 18. A shared TXOP setup 692 can be seen followed by a shared TXOP announcement 694. Then when STA1 and STA2, which are non-AP shared TXOP participant STAs, receive the CTS-share from AP to STA3 which is a non-AP TXOP holder STA, then STA1 and STA2 send 696, 698 an Access Request frame to STA3 through random access or dedicated access to indicate they are willing to join the following shared TXOP by the non-AP TXOP holder STA. The responses to STA 3 are seen in select time slots within the slots 700*a*-700*n* and 702*a*-702*n*.

7.2.3.3. TXOP PA w/Response after Dedicated TXOP Offer

Figure 26:
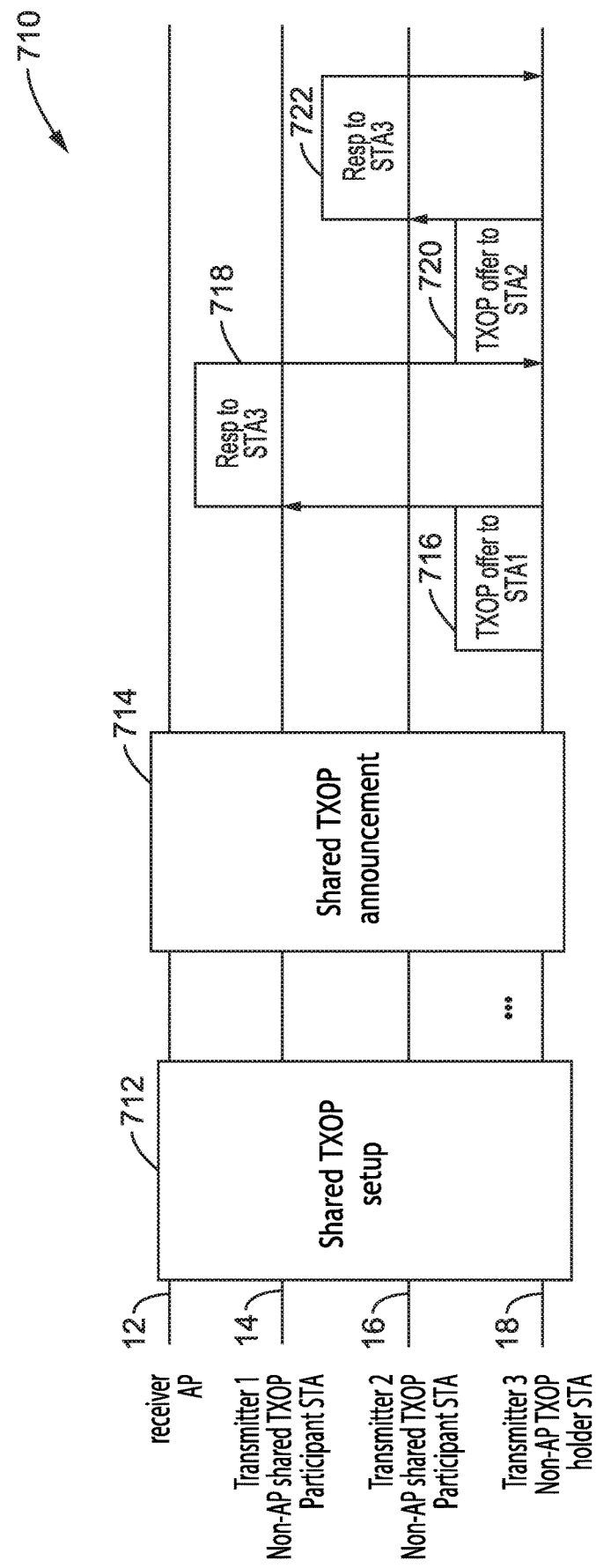
FIG. 26 is a communication sequence diagram of a TXOP participant acquirement (acquisition) stage with response after receiving a dedicated TXOP offer, according to at least one embodiment of the present disclosure.

FIG. 26 illustrates an example embodiment 710 TXOP Participant Acquirement (PA) stage with response after receiving a dedicated TXOP offer. Interactions are depicted between AP 12, STA1 14, STA2 16 and STA3 18. A shared TXOP setup phase 712 is performed followed by a shared TXOP announcement phase 714. Then instead of broadcasting the TXOP Offer frame, STA3 unicasts the offer frame to inquire on potential shared TXOP participant STAs one by one. First the offer 716 is sent from STA 3 to STA 1, which responds 718, then the offer is made 720 to STA 2 and a response 722 is sent back.

Thus, once STA1 or STA2, which are the non-AP shared TXOP participant STAs, receive the TXOP Offer frame, then if they are willing to join the following shared TXOP, they need to respond with an Access Request frame to the non-AP TXOP holder STA within a given time period (offset).

Figure 27:
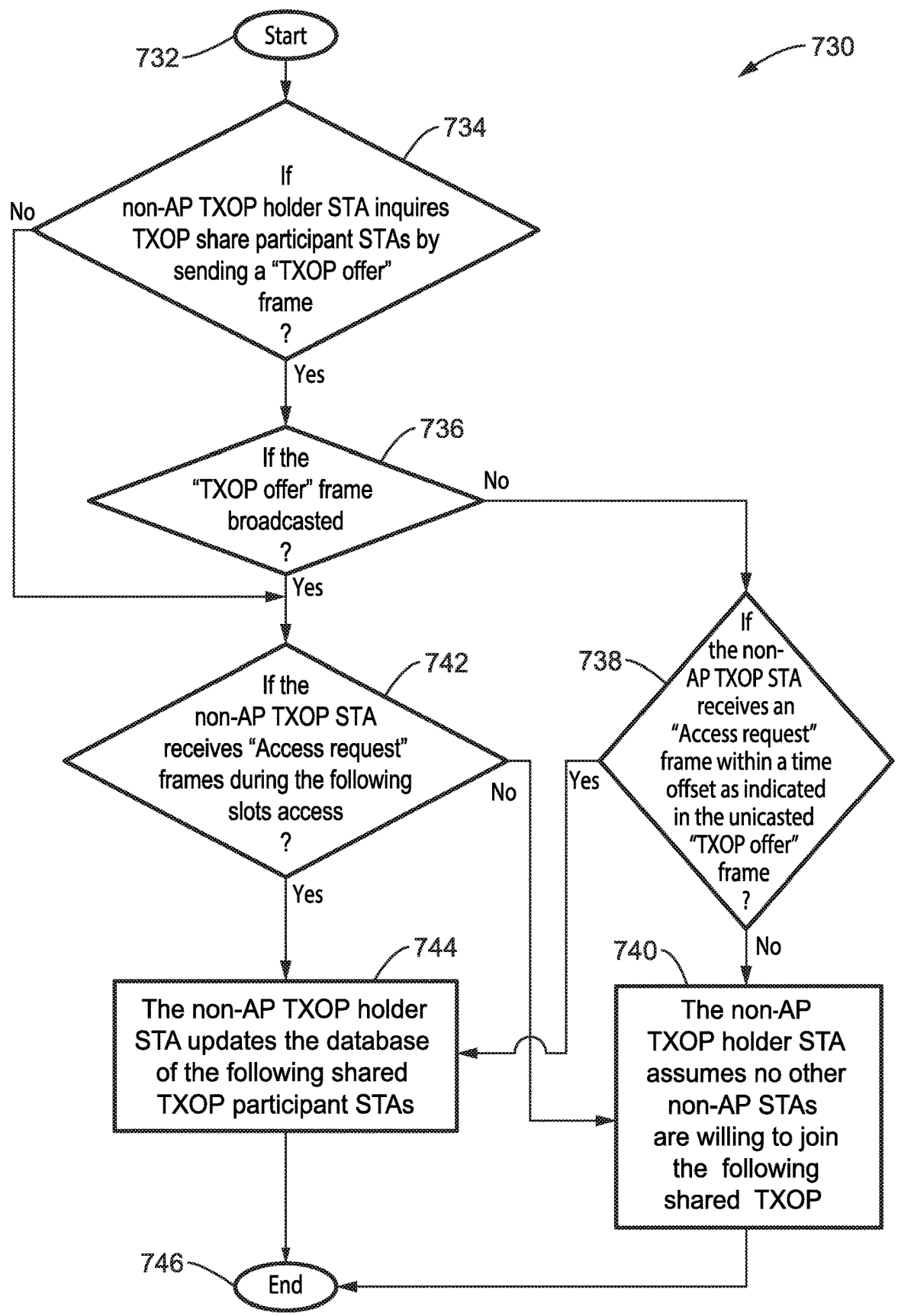
FIG. 27 is a flow diagram of a TXOP participant acquirement (acquisition) stage, processed at the non-AP TXOP holder STA, according to at least one embodiment of the present disclosure.

FIG. 27 illustrates an example embodiment 730 of a TXOP participant acquirement stage, processed at the non-AP TXOP holder STA. The process starts 732 and a check is made 734 if a non-AP TXOP holder has inquired for TXOP share participants. If no inquiry is detected in block 734 then execution moves to block 742. However, if inquiry is detected at block 734, then at block 736 a check is made if the TXOP Offer frame has been broadcast. If the TXOP offer has been broadcast then execution reaches block 742, otherwise execution moves to block 738.

It should be noted that once STA1 or STA2 (the non-AP shared TXOP participant STAs) receive the TXOP offer frame, if they are willing to join the following shared TXOP, they need to respond an Access Request frame to the non-AP TXOP holder STA within a time offset.

In block 738 a check is made if an Access Request frame has been received within a time and offset as indicated in the unicasted TXOP Offer frame. If a proper request frame has not been received, then execution reaches block 740 and the non-AP TXOP holder assumes that no other non-AP STAs are willing to join the following shared TXOP, with the process ending 746. Otherwise, if a proper request frame was received at block 738, then execution moves to block 744 and the non-AP TXOP holder STA updates the database of the following shared TXOP participant STAs, and the process ends 746.

If instead block 742 is reached from check 736, then a check is made to determine if an Access Request frame has been received during the following slot accesses. If the request was not received, then execution moves to block 740, otherwise to block 744, after which the process ends 746.

Figure 28:
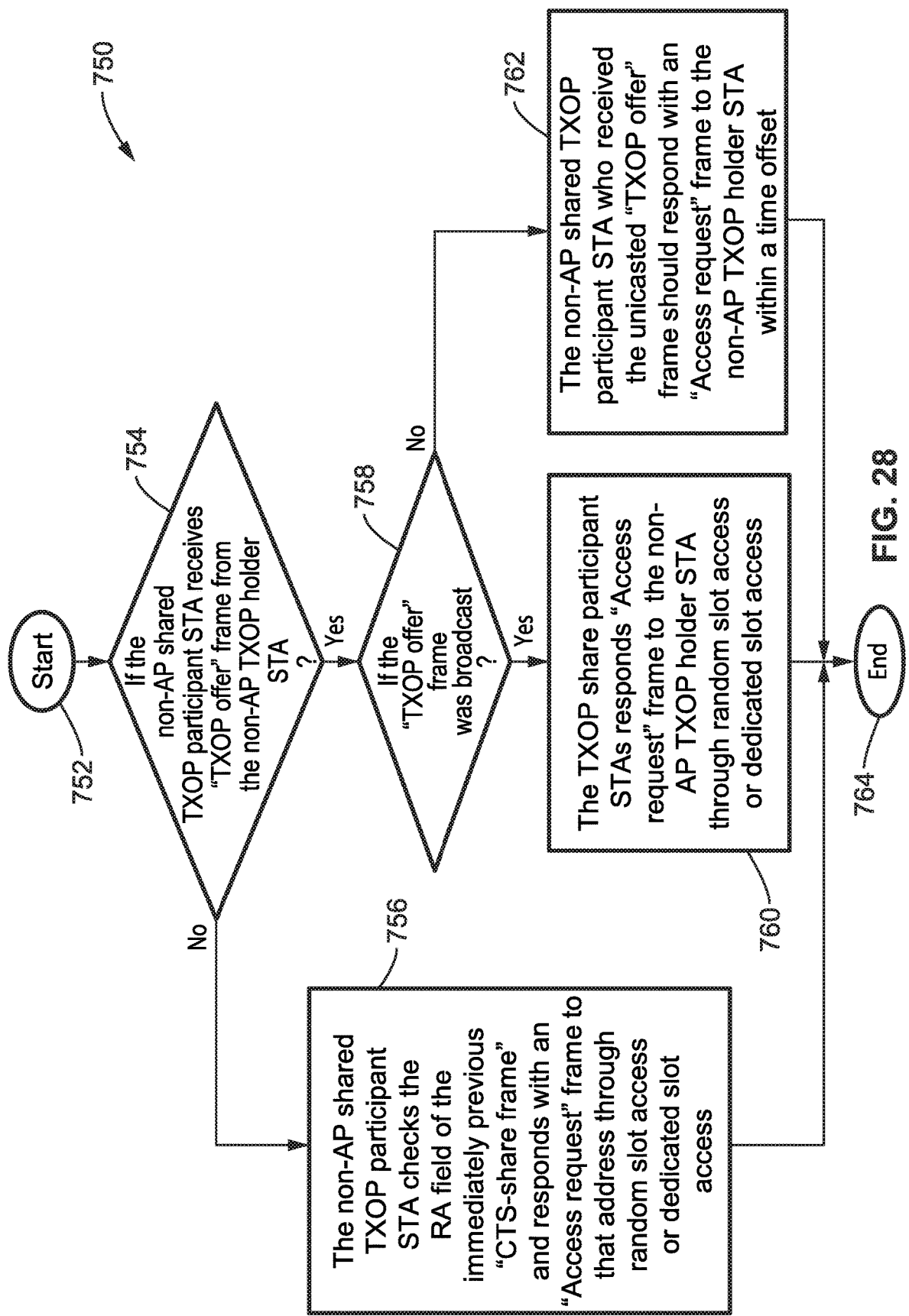
FIG. 28 is a flow diagram of a TXOP participant acquirement (acquisition) stage, processed at the non-AP shared TXOP participant STA, according to at least one embodiment of the present disclosure.

FIG. 28 illustrates an example embodiment 750 of a TXOP participant acquirement stage, processed at the non-AP shared TXOP participant STA. Processing starts 752, then a check is made 754 if the non-AP shared TXOP participant STA has received a TXOP Offer frame from the non-AP TXOP holder STA.

If the non-AP shared TXOP participant STA does not receive a TXOP Offer frame from the non-AP TXOP holder STA, then at block 756 the STA checks the RA field of the immediately previous CTS-Share frame and responds with an Access Request frame to that address through random slot access or dedicated slot access, before the process ends 764.

If the TXOP offer was received at block 754, then a check is made at block 758 to determine if the TXOP Offer frame was broadcast. If the frame was broadcast, then at block 760 the non-AP shared TXOP participant STA responds with an Access Request frame to the non-AP TXOP holder STA through random slot access or dedicated slot access, before the process ends 764.

Otherwise, if the TXOP offer was not broadcast at block 758, then block 762 is reached and the non-AP shared TXOP participant STA which received the unicasted TXOP Offer frame responds with an Access Request frame to the non-AP TXOP holder STA within a time offset, before the process ends.

7.2.4. TXOP Schedule and Access
7.2.4.1. TXOP Schedule and Access w/Unicast TXOP Offer FIG. 29 illustrates an example embodiment 770 of TXOP schedule and access with unicast TXOP offer frame. Interactions are exemplified between AP 12, STA1 14, STA2 16 and STA3 18.

A shared TXOP setup phase 772, shared TXOP announcement phase 774, and TXOP participant acquirement 776 stages are first performed. Then afterward the non-AP TXOP holder STA sends 778 Data to the associated AP (AP1), it also then unicasts 780 a TXOP Offer frame to the next TXOP share participant STA, indicating the transmission duration for the next TXOP share participant STA. In response to the TXOP offer 780 to STA1, STA1 sends Data 782 to the AP. After this STA 3 unicasts the TXOP offer to STA 2, in response to which STA 2 sends Data 786 to the AP.

7.2.4.2. TXOP Schedule and Access w/Unicast TXOP Scheduler

FIG. 30 illustrates an example embodiment 790 of TXOP schedule and access with unicast TXOP access scheduler. Interactions are shown in this process by way of example and not limitation as is the case for all these examples between AP 12, STA1 14, STA2 16 and STA3 18.

A shared TXOP setup stage 792, shared TXOP announcement stage 794, and TXOP participant acquirement 796 stage are first performed.

Then the non-AP TXOP holder STA unicasts 798, 800 a TXOP Access Schedule frame to the non-AP shared TXOP participant STAs (STA 1 and STA 2) indicating the TX Duration for each of the STAs. STA 3 then sends its Data 802 to AP1 followed by STA 2 sending Data 804 to AP1, and then STA 1 sending Data 806 to AP1.

7.2.4.3. TXOP Schedule and Access w/Broadcast TXOP Scheduler

Figure 31:
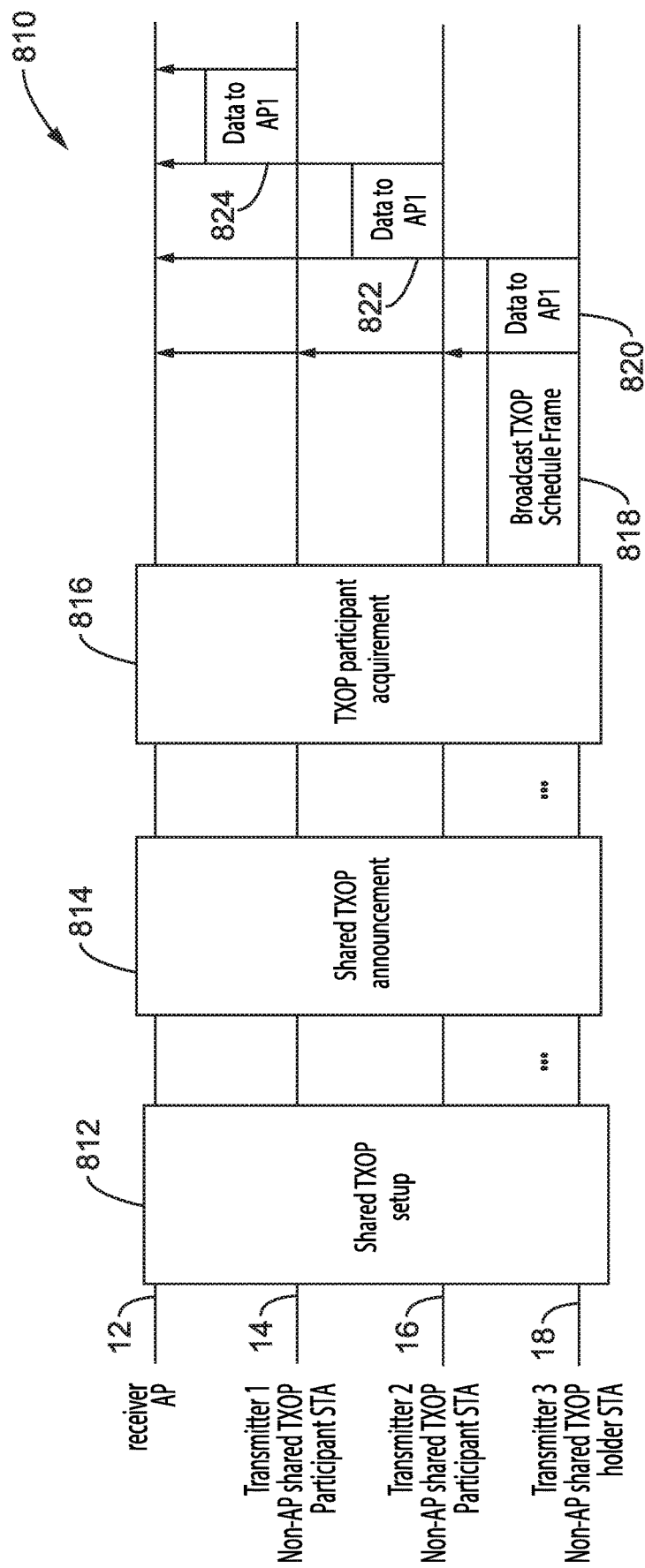
FIG. 31 is a communication sequence/protocol diagram of a TXOP schedule and access with broadcast TXOP scheduler frame, according to at least one embodiment of the present disclosure.

FIG. 31 illustrates an example embodiment 810 of TXOP schedule and access with a broadcast TXOP scheduler frame. Interactions are shown between AP 12, STA1 14, STA2 16 and STA3 18.

A shared TXOP setup phase 812, shared TXOP announcement phase 814, and TXOP participant acquirement 816 stages are first performed.

Then the non-AP TXOP holder STA broadcasts 818 a Broadcast TXOP Schedule frame to the TXOP share participant STAs, indicating the transmit (TX) Duration for each of the STAs. Thereafter STA 3 can be seen sending 820 Data to the associated AP.

Once the STAs receive the Broadcast TXOP Scheduler frame, they also send Data 822, 824 to the associated AP in different time slots as indicated in the Broadcast TXOP Scheduler frame.

Figure 32A:
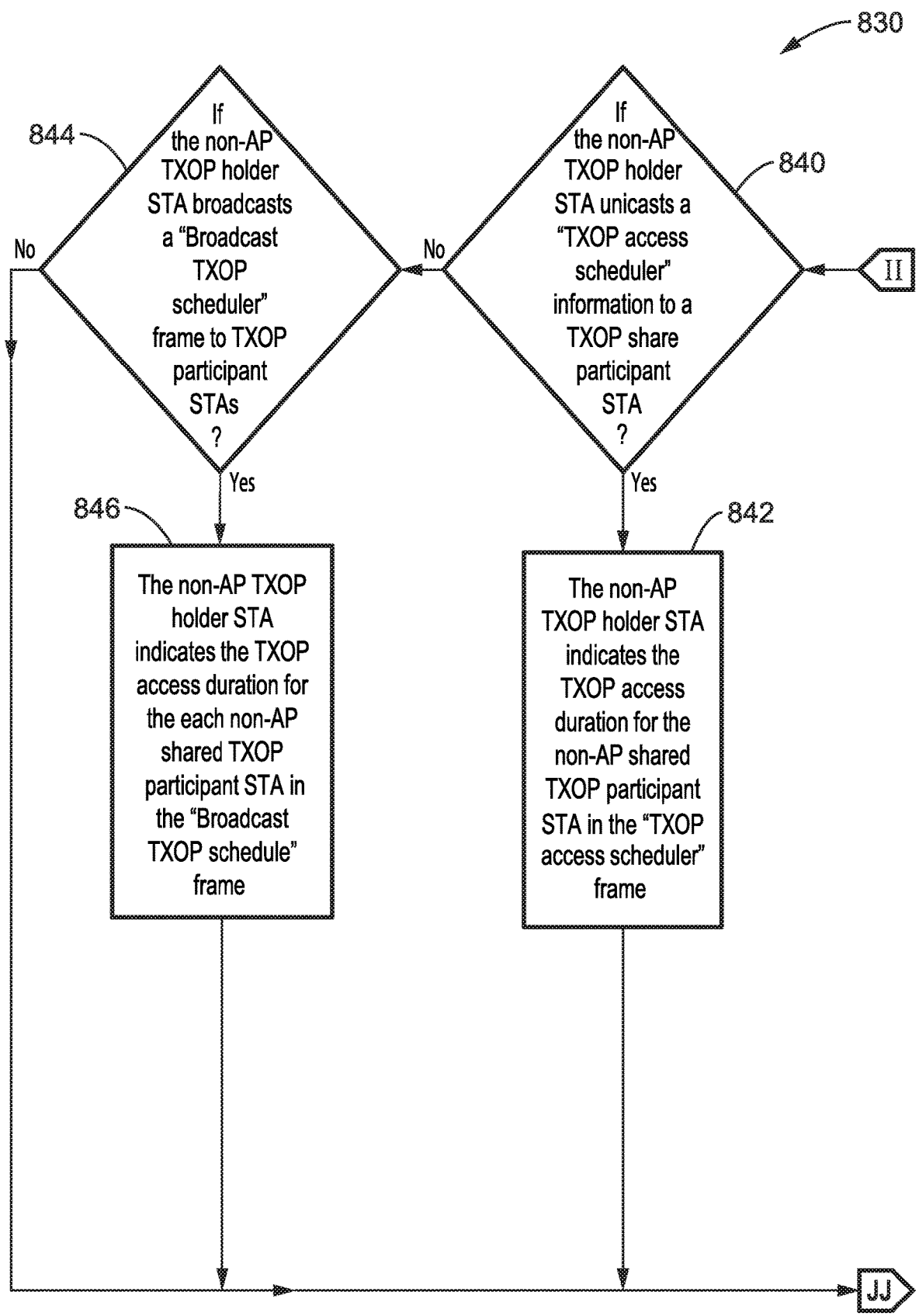
FIG. 32A and FIG. 32B is a flow diagram of performing a TXOP schedule and access stage, processed at the non-AP TXOP holder STA level, according to at least one embodiment of the present disclosure.
Figure 32B:
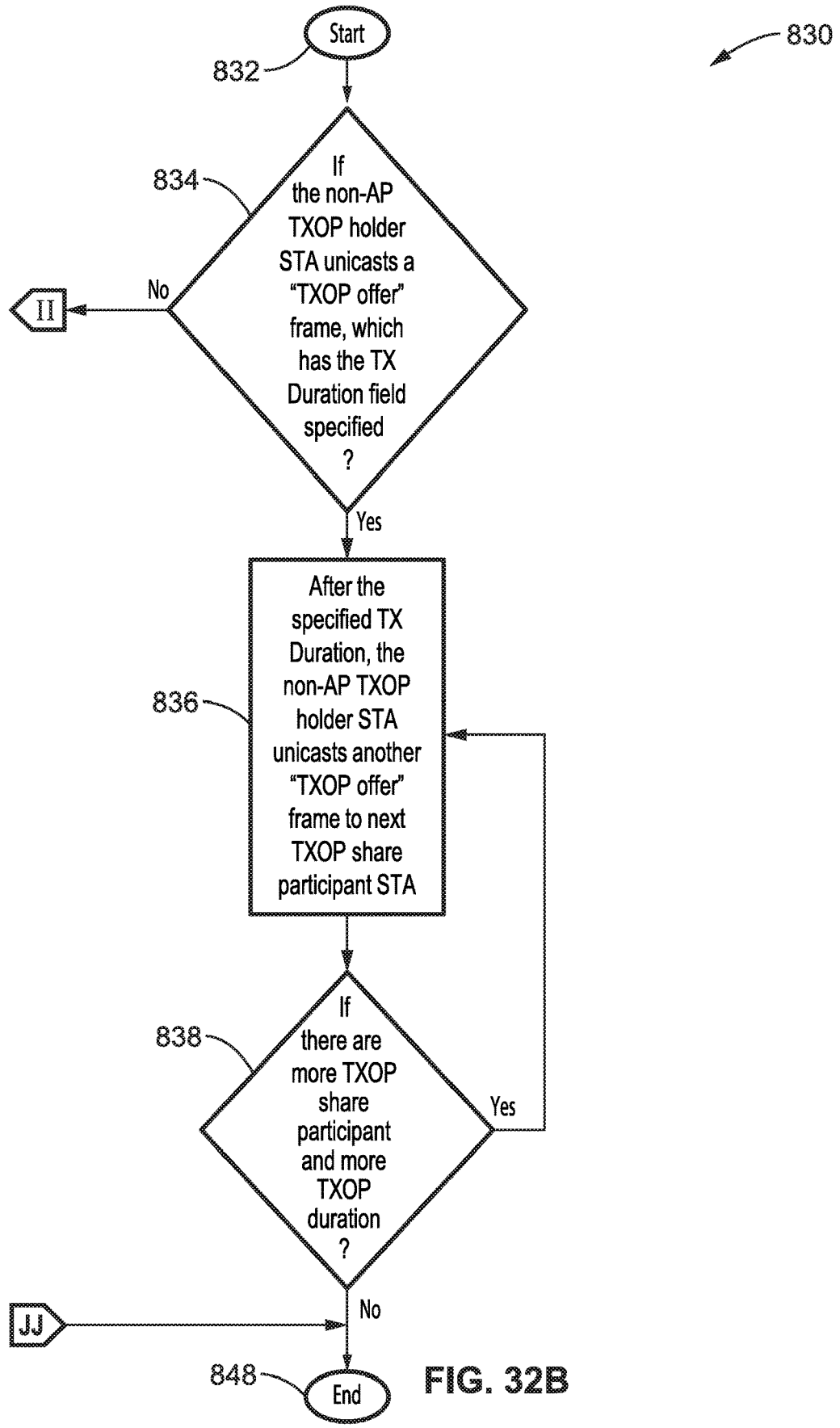

FIG. 32A and FIG. 32B illustrates an example embodiment 830 of a TXOP schedule and access stage, processed at the non-AP TXOP holder STA level. The process starts 832 in FIG. 32B and a check is made 834 if the non-AP TXOP holder STA has unicast a TXOP Offer frame with the TX Duration field specified.

If it has unicast the TXOP Offer frame, then execution reaches block 836 wherein after a specified TX Duration, the non-AP TXOP holder STA unicasts another TXOP Offer frame to the next TXOP share participant STA.

Then in block 838 a check is made if there are more TXOP share participants and more TXOP duration. If there are more then execution returns to block 836 to continue processing, otherwise the process ends 848.

If however, it was determined at block 834 that the test for unicasting a TXOP Offer was not unicast, then execution moves to block 840 in FIG. 32A.

At block 840 a check is made to determine if the non-AP TXOP holder STA has unicast TXOP Access Scheduler information to a TXOP share participant STA. If it is determined that the scheduler information was unicast, then at block 842 the non-AP TXOP holder STA indicates the TXOP access duration for the non-AP shared TXOP participant STA in the TXOP Access Scheduler frame before processing ends 848.

However, if at block 840 the STA did not unicast a TXOP Access Scheduler, then block 844 is reached which checks if the non-AP TXOP holder STA has broadcast a Broadcast TXOP Scheduler frame to TXOP participant STAs. If it was determined that the broadcast was performed, then block 846 is performed in which the non-AP TXOP holder STA indicates the TXOP access duration for each non-AP shared TXOP participant STA in the Broadcast TXOP schedule frame, prior to the process ending 848.

Figure 33A:
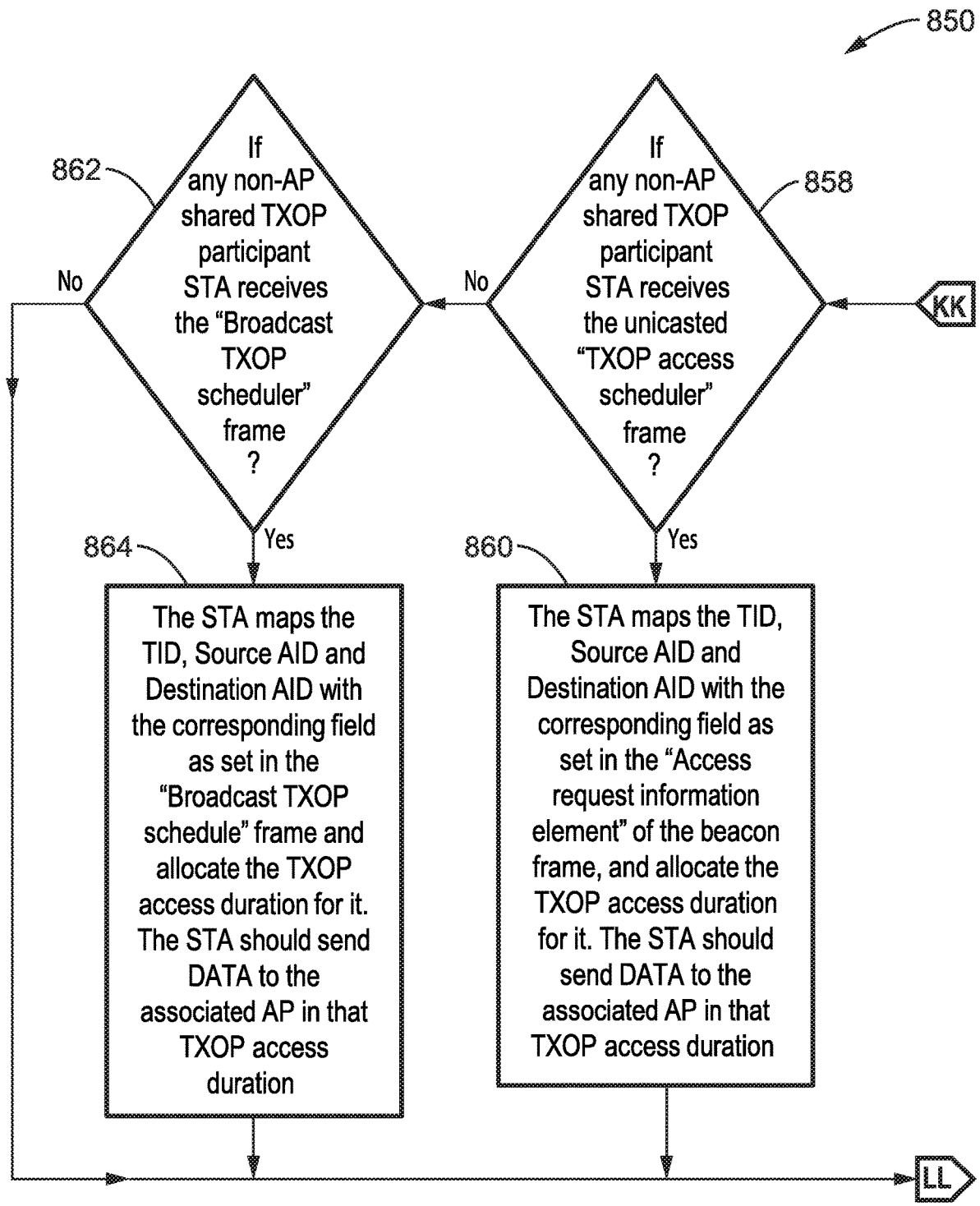
FIG. 33A and FIG. 33B is a flow diagram of TXOP schedule and access stage, processed at the non-AP shared TXOP participant STA level, according to at least one embodiment of the present disclosure.
Figure 33B:
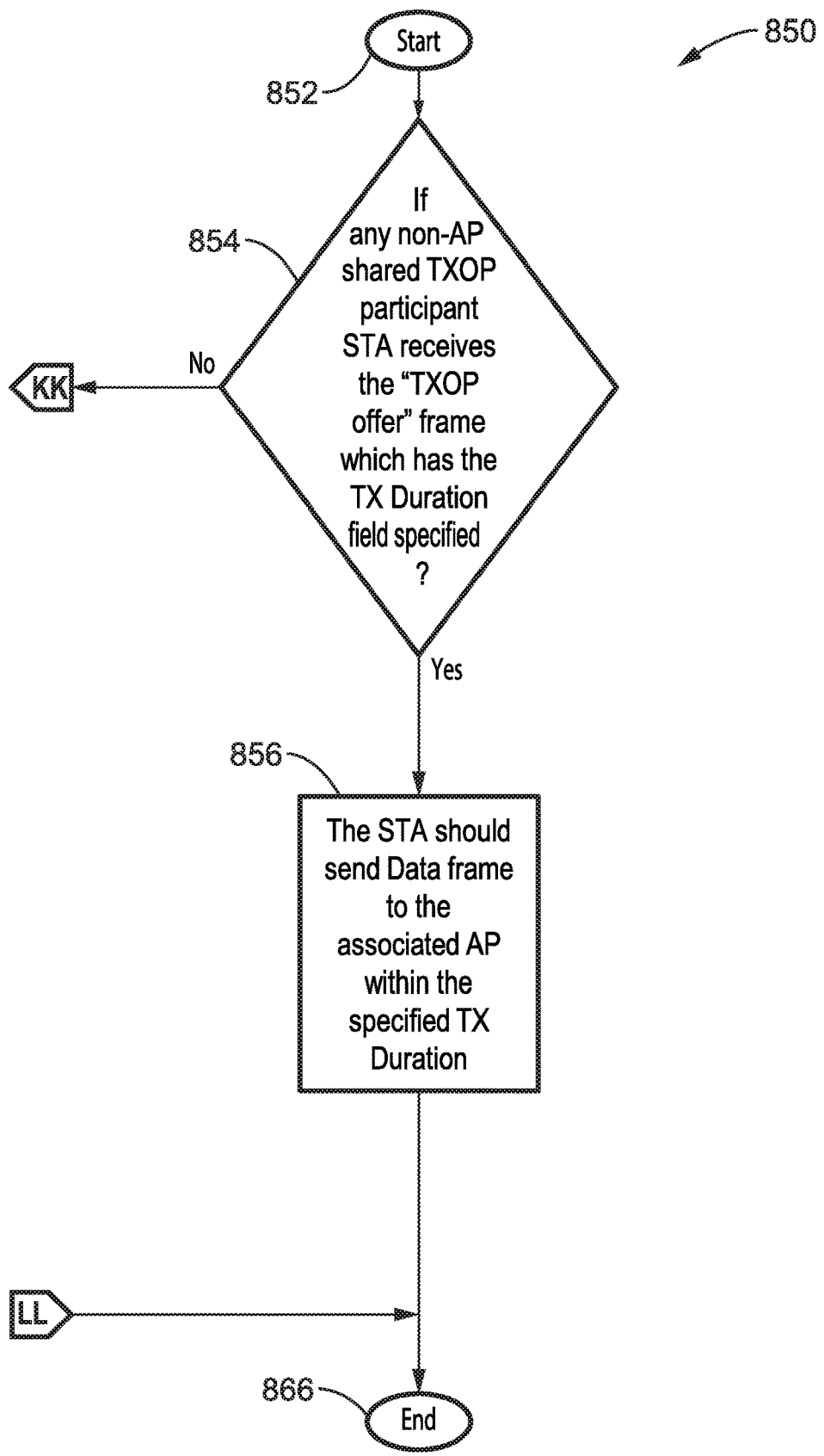

FIG. 33A and FIG. 33B illustrates an example embodiment 850 of a TXOP schedule and access stage, processed at the non-AP shared TXOP participant STA level. Processing starts at 852 in FIG. 33B and a check is made 854 to determine if any non-AP shared TXOP participant STA received the TXOP Offer frame which has the TX Duration field specified. If this was received, then at block 856, a Data frame is sent to the associated AP within the specified TX Duration, and the process ends 866

Otherwise, if at block 854 it was found that the TXOP Offer frame was not received, then execution moves to block 858 in FIG. 33A which checks if any non-AP shared TXOP participant STA receives the unicasted TXOP Access Scheduler frame. If it was received, then at block 860 the STA maps the TID, Source Association ID (AID) and Destination AID with the corresponding field as set in the Access Request Information element of the beacon frame, and allocates the TXOP access duration for it. The STA then sends Data to the associated AP in that TXOP access duration, before processing ends 866.

However, if at block 858 there was no unicasted TXOP access scheduler frame, then execution moves to block 862 which checks if any non-AP shared TXOP participant STA received the Broadcast TXOP Scheduler frame. If that was not received then the process ends. If it was received, then at block 864 the STA maps the TID, Source AID and Destination AID with the corresponding field as set in the Broadcast TXOP schedule frame and allocates the TXOP access duration for it. The STA then sends Data to the associated AP in that TXOP access duration, before the process ends 866.

7.3. Dynamic Scenario w/AP as Coordinator

In this case, after the non-AP TXOP holder STA grabs the channel, instead of waiting for AP sending trigger frames. The non-AP TXOP holder STA is able to initiate the MU UL transmission with other non-AP STAs. The non-AP TXOP holder STA cannot directly communication with other non-AP STAs who are willing to participate in the following shared TXOP. In this case, AP needs to be involved to coordinate between the non-AP TXOP holder STA and the other non-AP shared TXOP participant STAs.

7.3.1. TXOP PA Stage (with AP as Coordinator)

7.3.1.1. TXOP PA Stage w/Response after Receiving TXOP Offer

FIG. 34 illustrates an example embodiment 870 protocol diagram of the TXOP Participant Acquirement (PA) stage with response after receiving TXOP offer, with AP coordination. Interactions are depicted between AP 12, STA1 14, STA2 16 and STA3 18.

A shared TXOP setup phase 872 and shared TXOP announcement phase 874 are first performed. Then the AP broadcasts 876 a TXOP Offer frame which indicates that the non-AP TXOP holder STA is willing to share its TXOP, and inquires if there are other non-AP STAs who are willing to join the shared TXOP.

Once other non-AP STAs receive this TXOP Offer frame, if they are willing to participate in the following shared TXOP, they respond to AP1 with a new Access Request frame as seen in time slots 878$a$-878$n$ and 880$a$-880$n$, having slots that incorporate the response to the AP. It should be noted that in order to avoid collision of the Access Request frames, slot design also needs to be implemented for Random access or Dedicated access.

The AP then unicasts 882 a Shared TXOP Participant Announcement frame to the non-AP TXOP holder STA to announce the TXOP share participant information.

7.3.1.2. TXOP PA Stage w/Response after CTS (with AP)

FIG. 35 illustrates an example embodiment 890 of a protocol diagram of the TXOP Participant Acquirement (PA) stage with response after receiving CTS (with AP). Interactions are depicted between AP 12, STA1 14, STA2 16 and STA3 18.

A shared TXOP setup phase 892 and shared TXOP announcement phase 894 are first performed. Then in the participant acquirement stage, once the non-AP STA receives the CTS-share frame sent from the AP to the non-AP TXOP holder STA, if the non-AP STA is willing to join the following shared TXOP, and it doesn't receives the TXOP Offer frame, then in this case it sends an Access Request frame to the AP through random access or dedicated access, within slots 896$a$-896$n$ and 898$a$-898$n$.

The AP then unicasts 900 a Shared TXOP Participant Announcement frame to the non-AP TXOP holder STA to announce the TXOP share participant information.

7.3.1.3. TXOP PA Stage w/Response after Dedicated TXOP Offer

Figure 36:
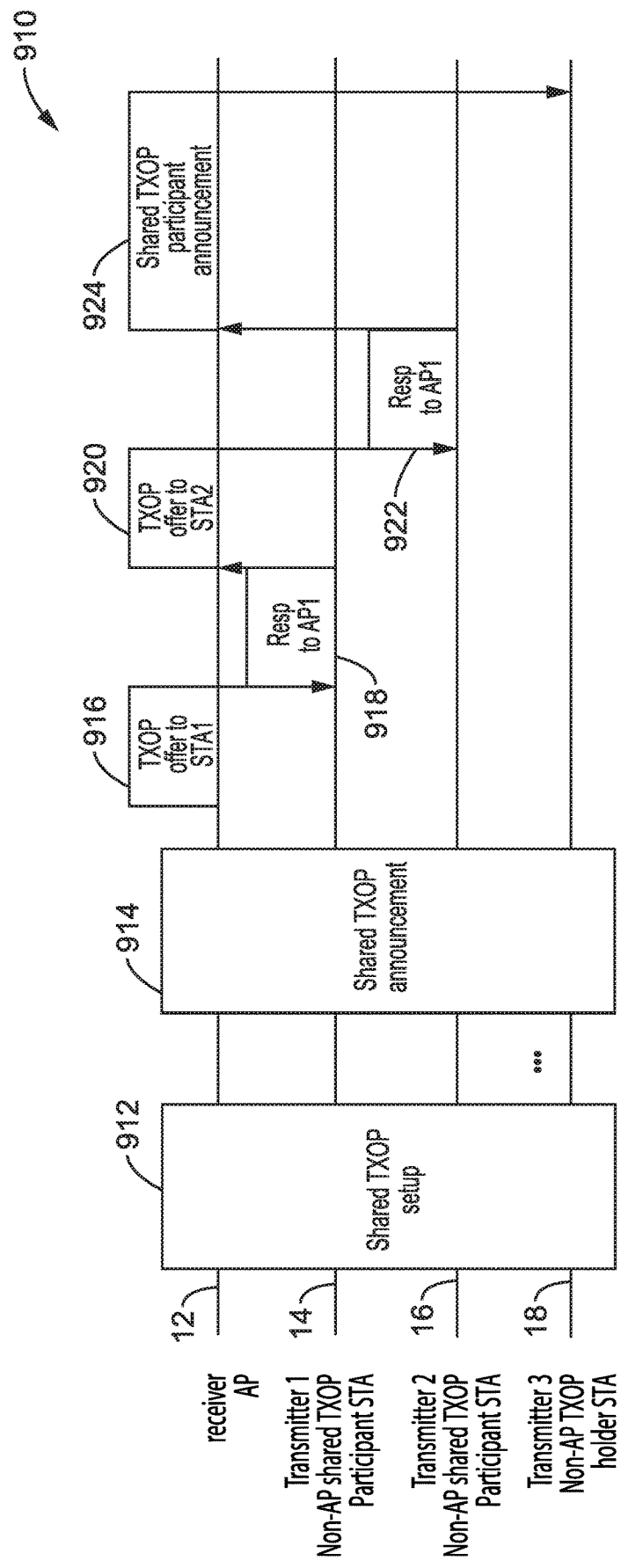
FIG. 36 is a communication sequence diagram of a TXOP participant acquirement stage with response after receiving a dedicated TXOP offer, with AP, according to at least one embodiment of the present disclosure.

FIG. 36 illustrates an example embodiment 910 of a protocol diagram of the TXOP participant acquirement stage with response after receiving dedicated TXOP offer, with AP coordination. Interactions are depicted between AP 12, STA1 14, STA2 16 and STA3 18.

A shared TXOP setup stage 912 and shared TXOP announcement stage 914 are first performed. Instead of broadcasting the TXOP Offer frame, the AP unicasts it 916 to inquire on other non-AP STAs one by one. Once the non-AP STAs, e.g., STA1 or STA2 receive the TXOP Offer frame, if they are willing to join the following shared TXOP, they respond with an Access Request frame to the associated AP within a time offset. STA1 can be seen responding 918 to the AP. Similarly, the AP unicasts 920 the TXOP offer to STA2, which responds 922 to the AP. The AP unicasts 924 a Shared TXOP Participant Announcement frame to the non-AP TXOP holder STA to announce the TXOP share participant information.

Figure 37:
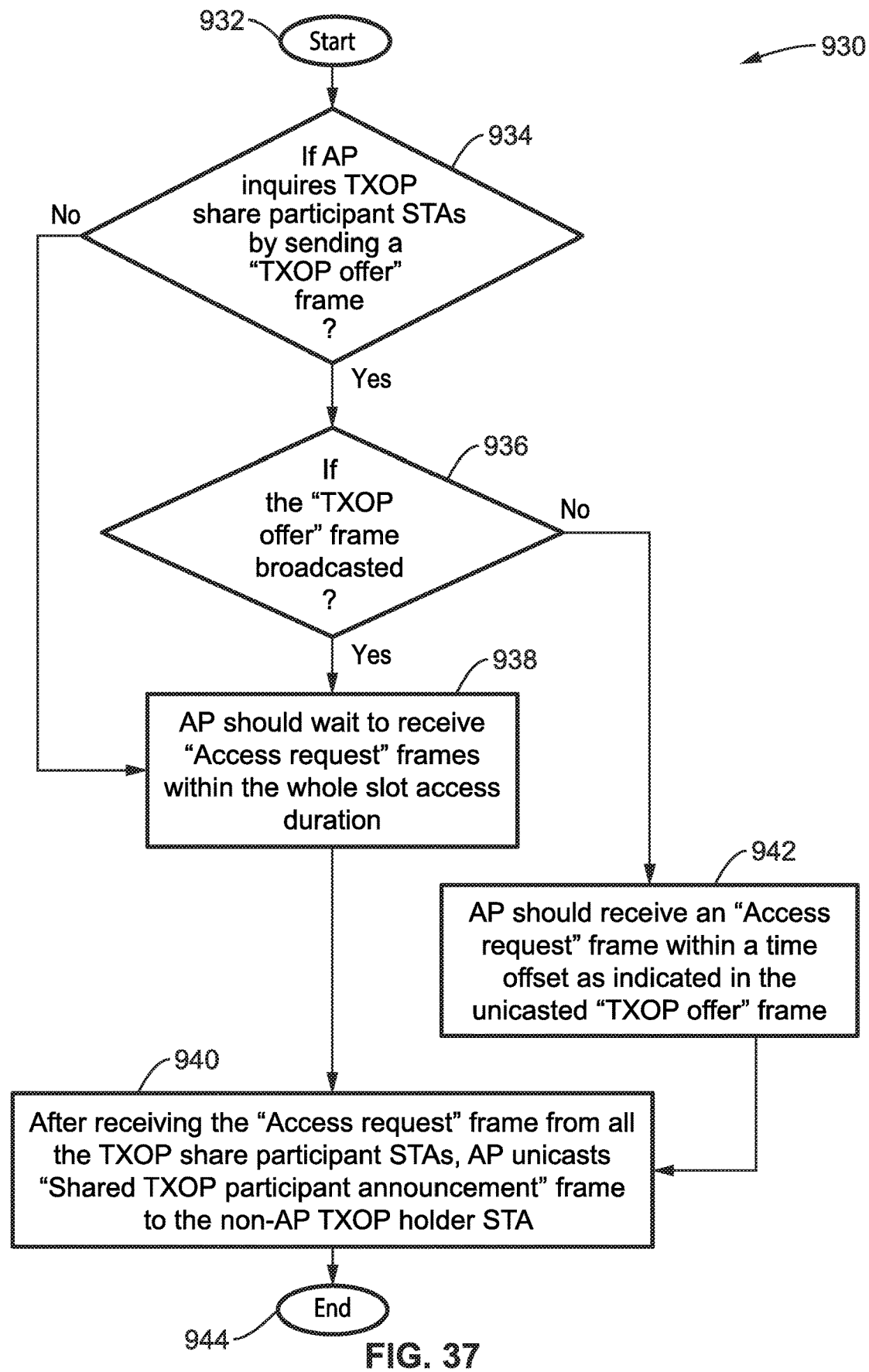
FIG. 37 is a flow diagram of a TXOP participant acquirement stage performed at the AP level according to at least one embodiment of the present disclosure.

FIG. 37 illustrates an example embodiment 930 of a TXOP participant acquirement stage process performed at the AP level. The process starts 932 and check 934 determines if the AP has inquired of TXOP share participant STAs by sending a TXOP Offer frame. If a TXOP Offer frame has not been sent, then execution moves forward to block 938. Otherwise, a check is made 936 if this TXOP Offer frame was broadcast. If it was broadcast, then at block 938 the AP waits to receive one or more Access Request frames within the period of slot accesses.

If the TXOP Offer was not broadcast then at block 942 the AP should receive an Access Request frame within a time offset as indicated in the unicasted TXOP Offer frame.

Execution from either block 938 or 942 reaches block 940, which after the AP receives the Access Request frame from all the TXOP share participant STAs, it unicasts a Shared TXOP Participant Announcement frame to the non-AP TXOP holder STA before the process ends 944.

Figure 38:
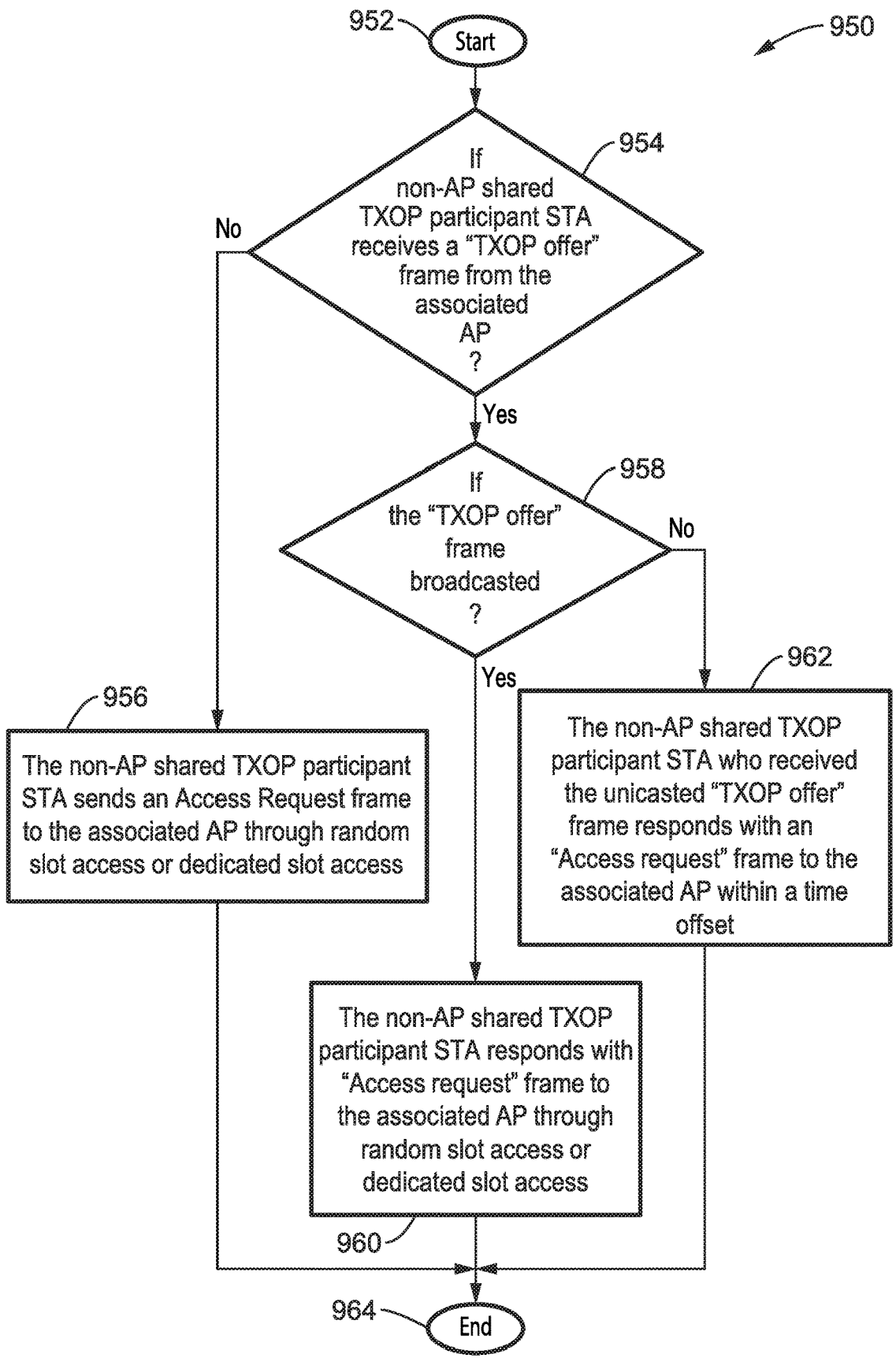
FIG. 38 is a flow diagram of a TXOP participant acquirement stage performed at a non-AP shared TXOP participant STA level according to at least one embodiment of the present disclosure.

FIG. 38 illustrates an example embodiment 950 of a TXOP participant acquirement stage process as performed at a non-AP shared TXOP participant STA level. Processing starts 952 and check 954 determines if the non-AP shared TXOP participant STA has received a broadcast TXOP Offer frame from the associated AP. If the participant STA has received the offer, it checks 958 if the offer was broadcast. If the offer was found to be broadcast, then at block 960 the STA responds with an Access Request frame to the associated AP through random slot access or dedicated slot access, and the process ends 964.

If at block 958 it is determined that the TXOP offer was not broadcast, then block 962 is reached and the non-AP shared TXOP participant STA responds with an Access Request frame to the associated AP within a time offset, before processing ends 964.

If at block 954, it is determined that a TXOP Offer was not received, then block 956 is reached and the non-AP shared TXOP participant STA sends an Access Request frame to the associated AP through random slot access or dedicated slot access before ending 964 the process.

7.3.2. TXOP Schedule and Access (with AP as Coordinator)

7.3.2.1. TXOP Schedule and Access w/Unicast TXOP Offer Frame

FIG. 39 illustrates an example embodiment 970 of a TXOP schedule and access stage with unicast TXOP offer frame, with AP cooperation. Interactions are depicted between AP 12, STA1 14, STA2 16 and STA3 18.

A shared TXOP setup stage 972, shared TXOP announcement stage 974, and TXOP participant acquirement 976 stage are first performed.

After the non-AP TXOP holder STA sends Data 978 to the associated AP, it also sends a Request TXOP Offer frame 980 to the associated AP, which indicates the start of the shared TXOP access for the next TXOP share participant STA.

After receiving the Request TXOP Offer frame, the AP unicasts 982 a TXOP Offer frame to the next TXOP share participant STA, including an indication of the TX Duration for the next STA. Once receiving this TXOP Offer frame, the non-AP shared TXOP participant STA sends 984 UL Data to the associated AP during the TX Duration. Similarly, a TXOP Offer to STA2 986 is sent to the AP, the AP sends the TXOP offer to STA 2 988. In response to receiving the information from the AP, STA 2 sends Data 990 to the AP.

7.3.2.2. TXOP Schedule & Access w/Unicast Access Scheduler

FIG. 40 illustrates an example embodiment 1010 of a TXOP schedule and access stage with unicast TXOP access scheduler frame, with AP coordination. Interactions are depicted between AP 12, STA1 14, STA2 16 and STA3 18.

A shared TXOP setup stage 1012, shared TXOP announcement stage 1014, and TXOP participant acquirement 1016 stage are first performed.

Before the non-AP TXOP holder STA sends Data to the associated AP, it first sends 1018 a Request TXOP Access Schedule frame to the associated AP, which indicates shared TXOP access for all other non-AP shared TXOP participant STAs.

In this example, after receiving the Request TXOP Access Scheduler frame, the AP unicasts a TXOP Access Scheduler frame 1020, 1022 to the non-AP shared TXOP participant STAs (STA 1 and STA 2), including indications of the TX Duration for each of them.

After the AP sends the access schedules, then the TXOP holder sends its Data 1024 to the AP. By this time the other non-AP shared TXOP participant STAs have received the TXOP Access Scheduler frames, and they send Data 1026 and 1028 to the associated AP in the time slots as indicated in the Allocation Control field of the Access request information element as embedded in the beacon frame.

7.3.2.3. TXOP Schedule and Access w/Broadcast Scheduler

Figure 41:
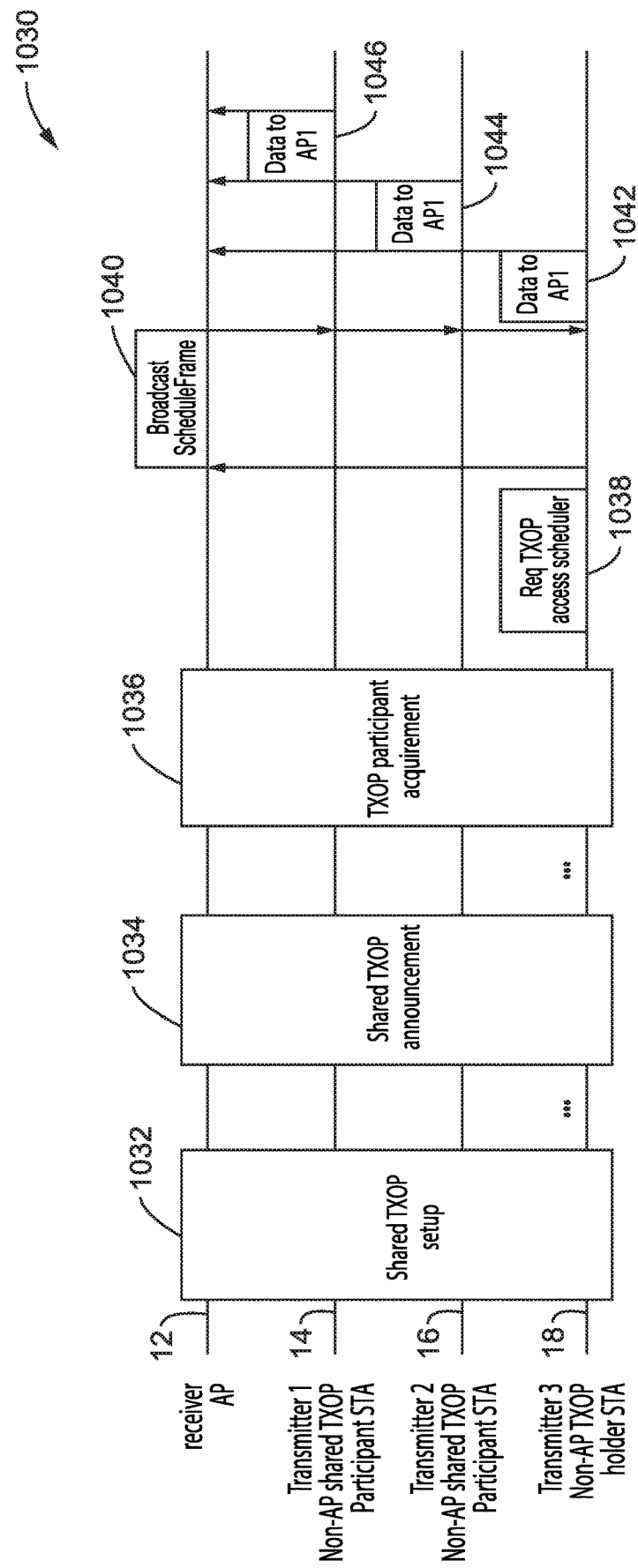
FIG. 41 is a communication sequence diagram of a TXOP schedule and access stage with broadcast TXOP scheduler frame, using AP coordination, according to at least one embodiment of the present disclosure.

FIG. 41 illustrates an example embodiment 1030 of a TXOP schedule and access stage with broadcast TXOP scheduler frame, with AP coordination. Interactions are depicted between AP 12, STA1 14, STA2 16 and STA3 18.

A shared TXOP setup stage 1032, shared TXOP announcement stage 1034, and TXOP participant acquirement stage 1036 are first performed.

Before the non-AP TXOP holder sends Data to the associated AP, it first sends 1038 a Request TXOP Access Schedule frame to the AP, which indicates shared TXOP access for all other non-AP shared TXOP participant STAs.

After receiving the Request TXOP Access Scheduler frame, the AP broadcasts a TXOP Schedule frame to the non-AP shared TXOP participant STAs, and indicates TX Duration for each of them. After this broadcast the TXOP holder, in this case STA 3, sends its Data 1042 to the AP. After the TXOP holder completes sending its Data, then the other non-AP shared TXOP participant STAs which have received the broadcast TXOP Scheduler frame, sends their UL Data 1044 and 1046 to the associated AP in the scheduled time slot as indicated in the broadcast TXOP Schedule frame.

Figure 42:
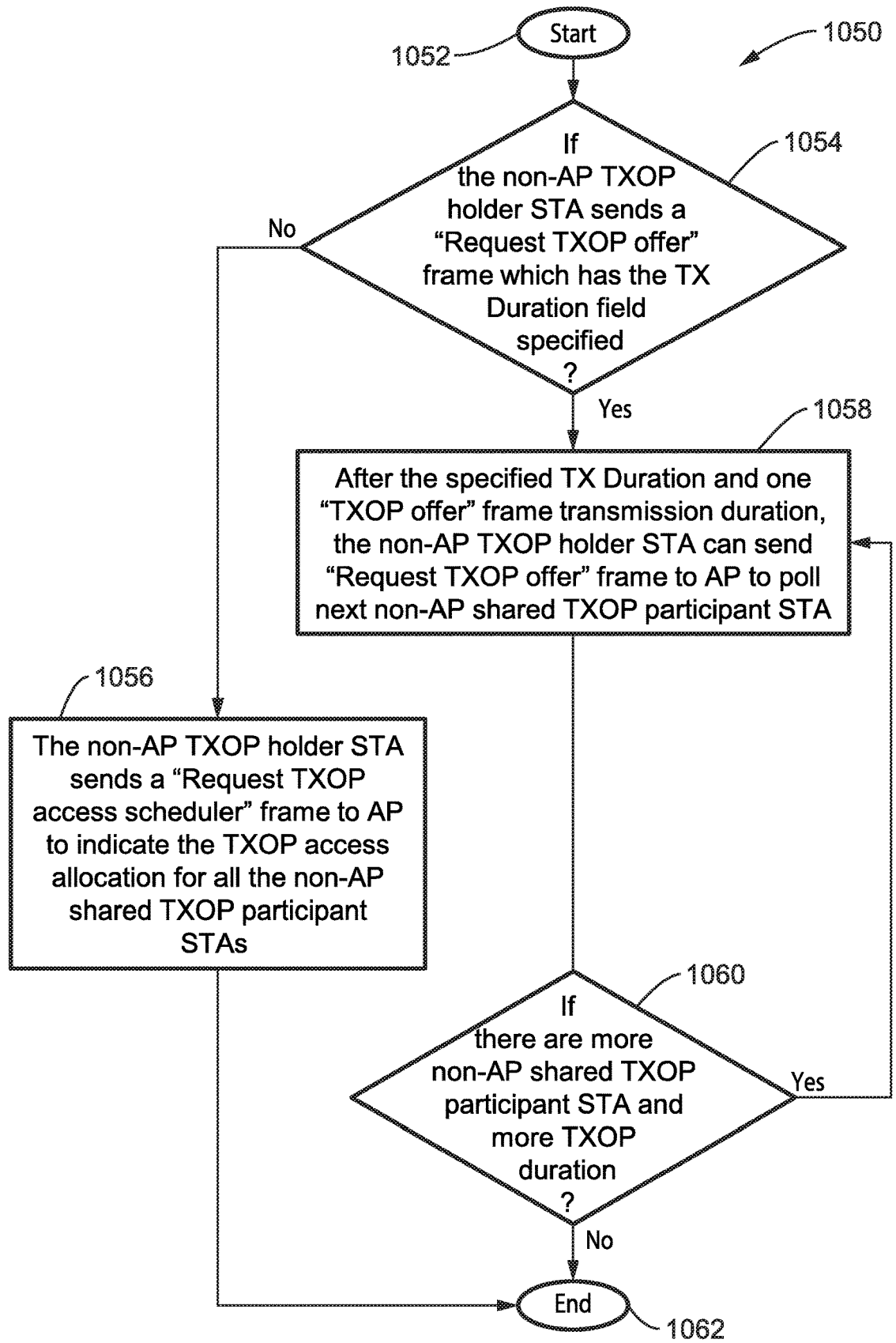
FIG. 42 is a flow diagram of a TXOP schedule and access stage, processed at the non-AP TXOP holder STA, according to at least one embodiment of the present disclosure.

FIG. 42 illustrates an example embodiment 1050 of a TXOP schedule and access stage, which is processed at the non-AP TXOP holder STA. The process starts 1052 and a check 1054 is made to determine if the non-AP TXOP holder STA has sent a Request TXOP Offer frame which has the TX Duration field specified.

If the Request TXOP Offer was sent, then at block 1058 after the specified TX duration and one TXOP Offer frame transmission duration, the non-AP TXOP holder STA can send a Request TXOP Offer frame to the AP to poll the next non-AP shared TXOP participant STA.

If it is determined at block 1060 that there are more TXOP participant STAs and more TXOP durations available, then execution returns to block 1058 so that the non-AP TXOP holder STA keeps sending Request TXOP Offer frames to the AP. Once all the TXOP participant STAs and TXOP durations available have been processed, then processing ends 1062.

Otherwise, if at block 1054 it was found that the non-AP TXOP has not sent a Request TXOP Offer, then at block 1056 the non-AP TXOP holder STA sends a Request TXOP Access Schedule frame to the AP to indicate the TXOP access allocation for all the non-AP shared TXOP participant STAs before processing ends 1062.

Figure 43A:
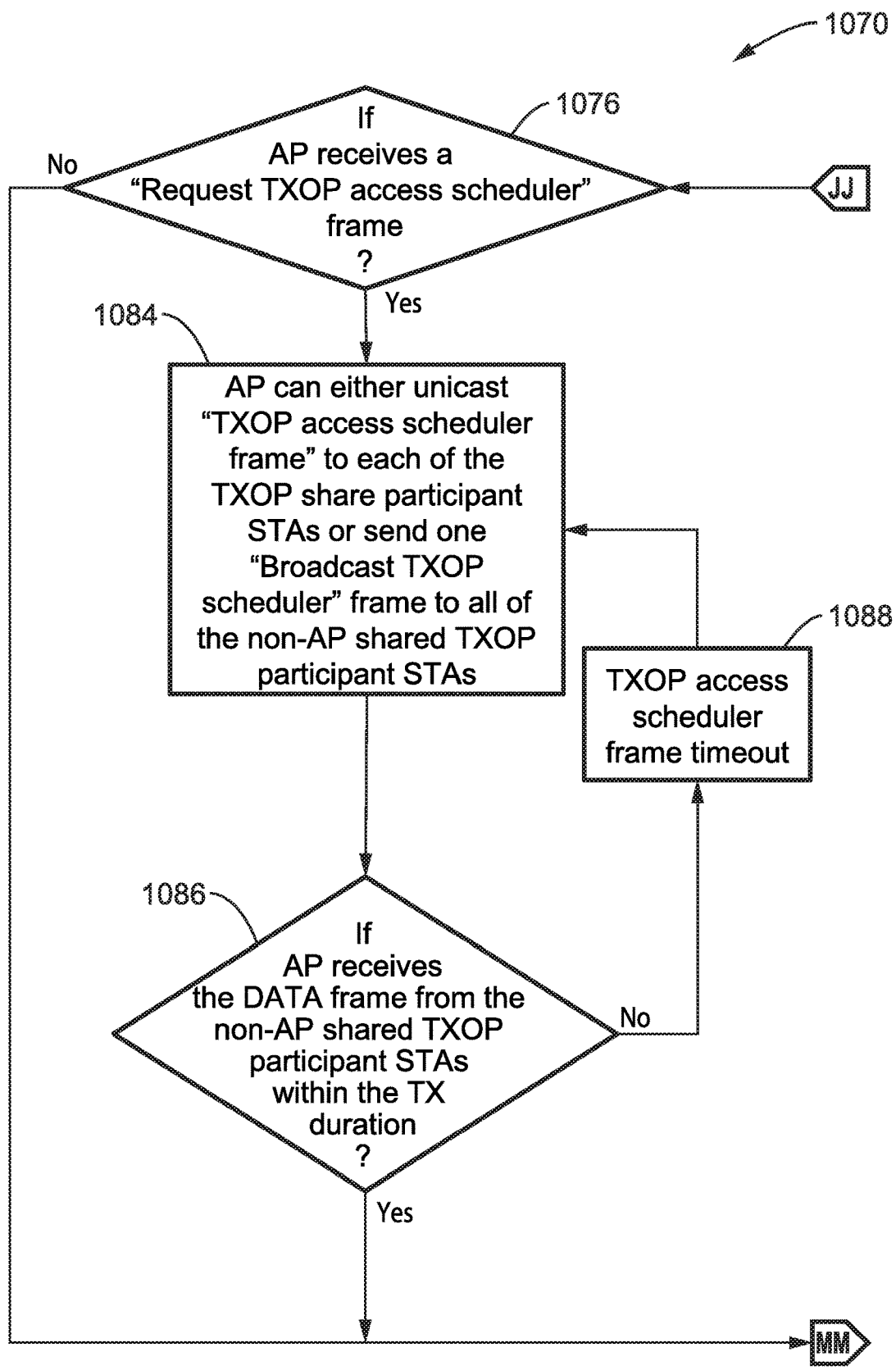
FIG. 43A and FIG. 43B is a flow diagram of a TXOP schedule and access stage, processed at the AP according to at least one embodiment of the present disclosure.
Figure 43B:
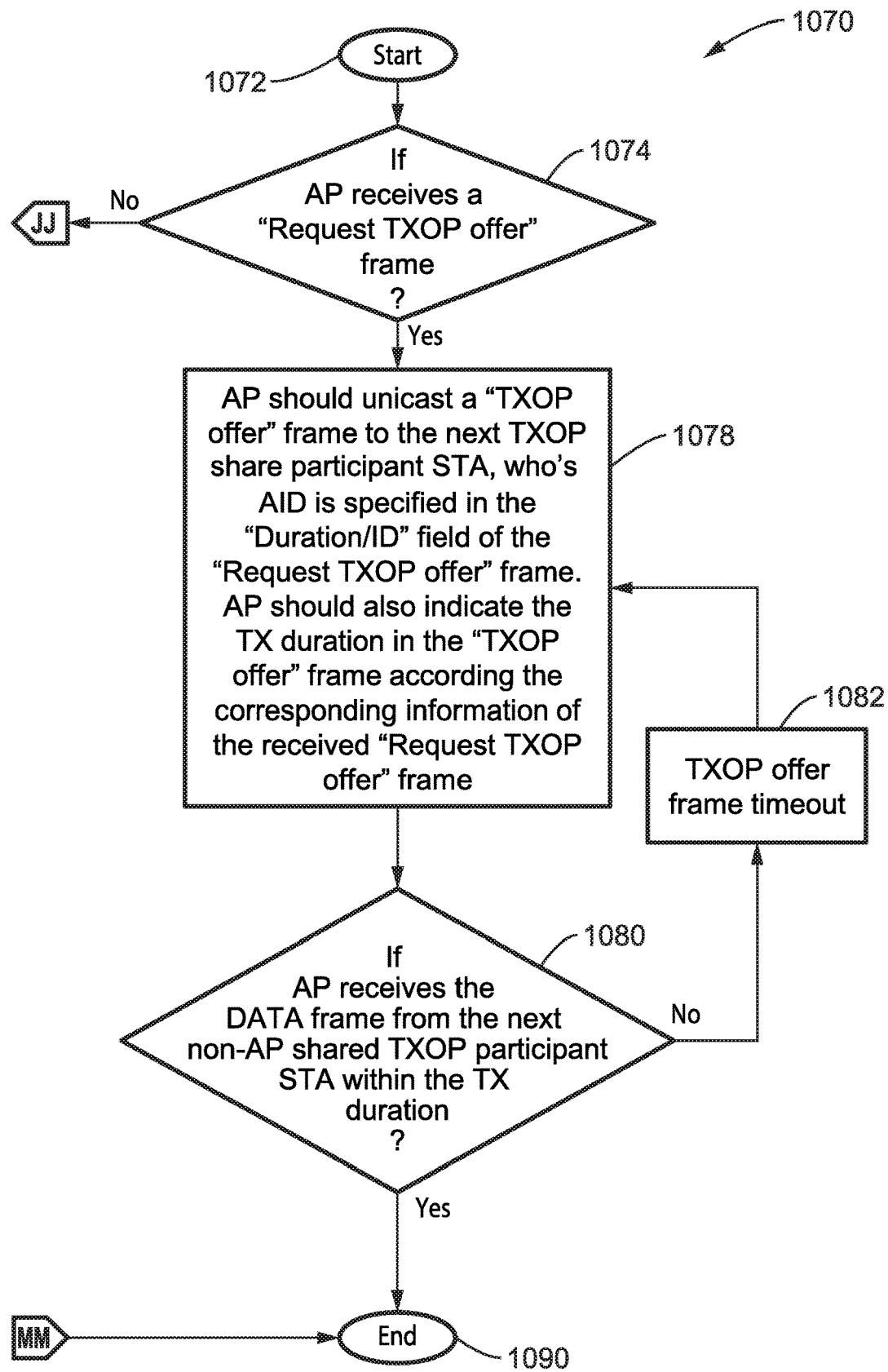

FIG. 43A and FIG. 43B illustrates an example embodiment 1070 of a TXOP schedule and access stage, which is processed at the AP level. Processing starts 1072 in FIG. 43B and a check is made 1074 to determine if an AP receives a Request TXOP Offer frame.

If the Request TXOP Offer is received, then at block 1078 the AP unicasts a TXOP Offer frame to the next TXOP share participant STA, having an AID specified in the Duration/ID field of the Request TXOP Offer frame. The AP should also indicate the TX duration in the TXOP Offer frame according the corresponding information of the received Request TXOP Offer frame. A check 1080 determines if the AP received the Data frame from the next non-AP shared TXOP participant STA within the TX duration.

If it does not receive the Data frame within the time limit, then the TXOP offer frame times out 1082, and the AP should retransmit 1078 the TXOP Offer frame.

However, if at block 1080 it has received the Data frame from the next non-AP shared TXOP participant STA, then processing ends 1090.

It at block 1074 it is determined that the AP did not receive a Request TXOP Offer frame, then block 1076 is reached in FIG. 43A which checks if the AP received a Request TXOP Access Scheduler frame. If it did not receive this Request TXOP Access Scheduler frame, then the process ends 1090. Otherwise, block 1084 is reached in which the AP can either unicast a TXOP Access Scheduler frame to each of the TXOP share participant STAs or send one Broadcast TXOP Scheduler frame to all of the non-AP shared TXOP participant STAs.

After this a check 1086 determines if the AP has received the Data frame from the non-AP shared TXOP participant STAs within the transmit duration. If it has received the data frame then processing ends 1090. Otherwise, if the frame was not received then execution reaches block 1088 with a TXOP access scheduler frame timeout with return made to block 1084.

Figure 44:
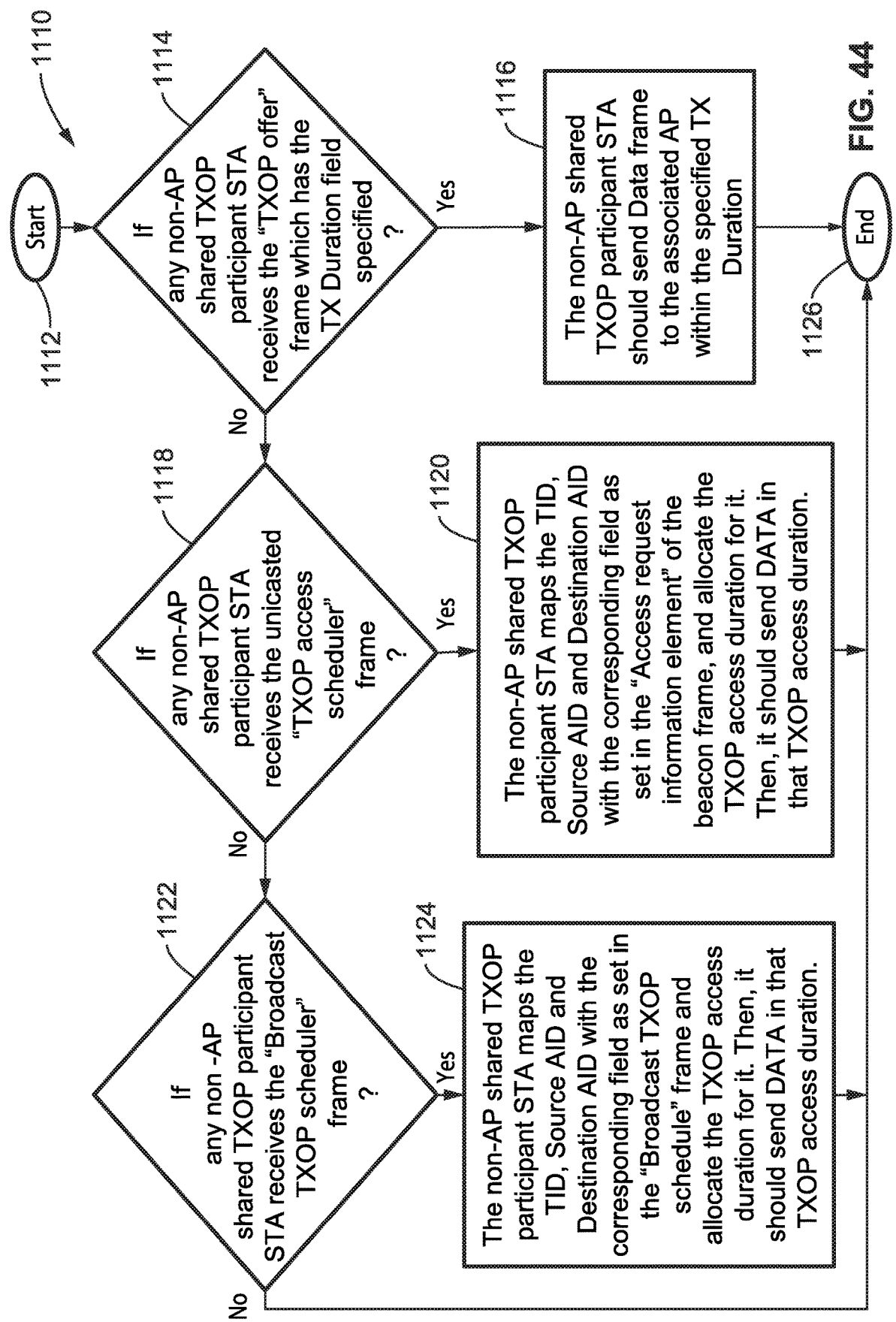
FIG. 44 is a flow diagram of a TXOP schedule and access stage, processed at the non-AP shared TXOP participant STA according to at least one embodiment of the present disclosure.

FIG. 44 illustrates an example embodiment 1110 of processing performed at the non-AP shared TXOP participant STA level.

Processing starts 1112 and a check is made 1114 to determine if any non-AP shared TXOP participant STA receives a TXOP Offer frame which has the TX Duration field specified. If the TXOP Offer frame is received, then at block 1116 the non-AP shared TXOP participant STA sends a Data frame to the associated AP within the specified TX Duration, and processing ends 1126.

Otherwise, if the conditions are not met at block 1114, then execution moves to check 1118 which determines if any non-AP shared TXOP participant STA received the unicasted TXOP Access Scheduler frame. If the condition is met with the frame received, then at block 1120 the non-AP shared TXOP participant STA maps the TID, Source AID and Destination AID with the corresponding field as set in the Access Request Information element of the beacon frame, and allocates the TXOP access duration for it. Then, it preferably sends Data in that TXOP access duration, before processing ends 1126.

Otherwise, if the condition is not met at block 1118, then a check is performed 1122 to determine if any non-AP shared TXOP participant STA received the Broadcast TXOP Scheduler frame. If the frame was not received, processing ends 1126. If the condition of block 1122 was met, then at block 1124 the non-AP shared TXOP participant STA maps the TID, Source AID and Destination AID with the corresponding field as set in the Broadcast TXOP Schedule frame and allocates the TXOP access duration for it, after which it should send Data in that TXOP access duration, and processing ends 1126.

7.4. Overview of the Semi-Static Scenario

In this scenario, two stages are disclosed including a shared TXOP setup stage and the TXOP schedule and access stage.

In the shared TXOP setup stage, each non-AP STA exchanges the share offer/request information for the shared TXOP with the AP. In addition to this, each non-AP TXOP holder STA also announces the time allocation for other non-AP shared TXOP participant STAs and exchanges this allocation configuration information with other non-AP STAs through the coordination of the associated AP.

The semi-static configuration is performed at the beginning stages of the setup. In this case, the complex scheduling process in the TXOP schedule and access stage are bypassed, as the non-AP STAs directly access the TXOP channel with assigned time slot as configured in the shared TXOP setup stage. Both semi-static scenarios, with or without AP coordination, are described in this portion of the disclosure.

The STA can set a configuration for TXOP sharing at some point through a setup procedure, either with STAs or with the AP, and every time a TXOP is obtained for the channel, the STA shares this TXOP with a preset number of STAs for a preset duration of time. The STA can end this TXOP sharing configuration setup at some point through repeating the setup procedure with STAs or with the AP. Once the TXOP sharing setup is completed, each time the STA sharing its TXOP accesses the channel, the STAs sharing the TXOP is informed through the STA or AP and access the channel according to the preset access rules The STA sharing its TXOP can decide whether each TXOP it is gaining will be offered for sharing according to the preset rules or not, or whether it will keep the channel all to itself.

7.4.1. Semi-Static TXOP Sharing Setup Procedure

Figure 45:
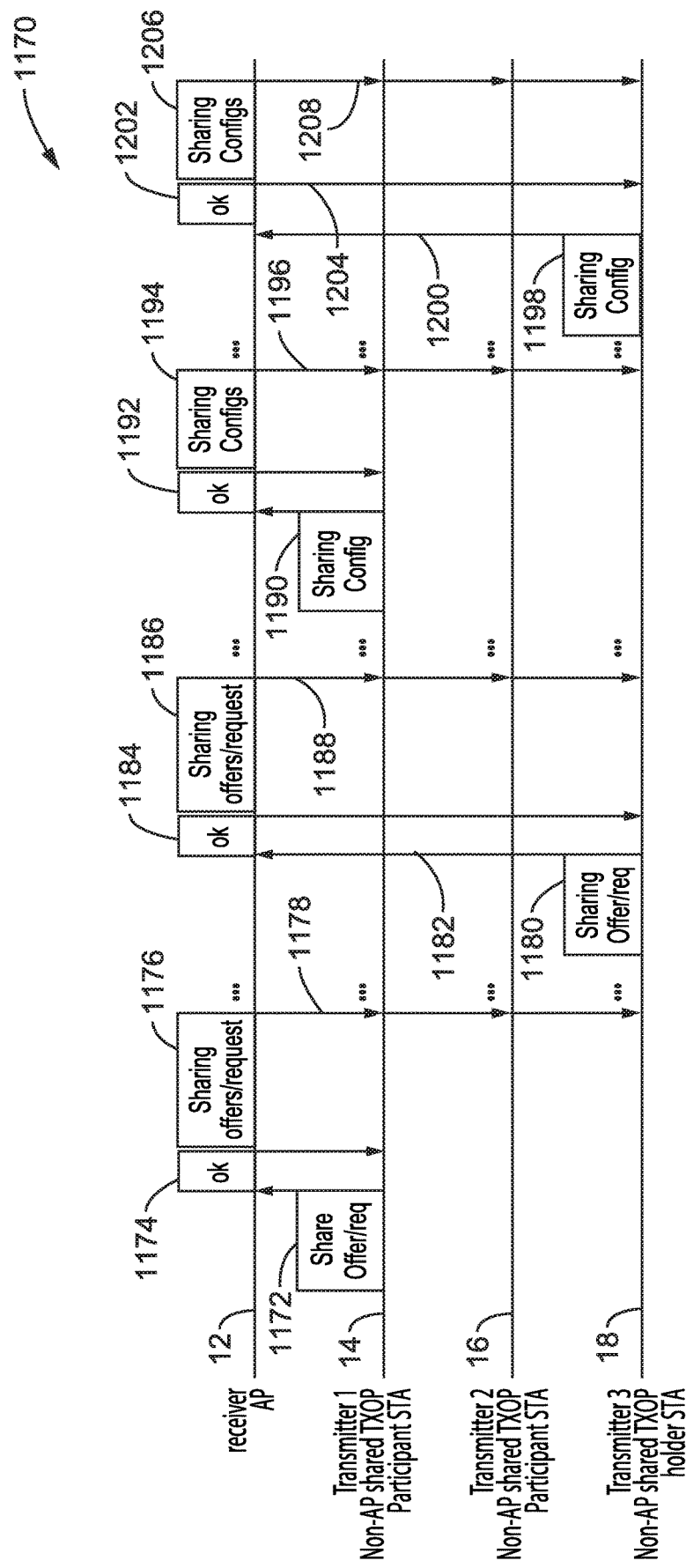
FIG. 45 is a communication sequence diagram of a semi static TXOP sharing setup stage, according to at least one embodiment of the present disclosure.

FIG. 45 illustrates an example embodiment 1170 of a protocol diagram of the semi-static TXOP sharing setup stage with interactions depicted between AP 12, STA1 14, STA2 16 and STA3 18. Each STA can determine if it is willing to share its TXOP and for how long and/or receive shared TXOP time from other STAs for the amount of time requested. The AP forwards information to the STAs. STAs decide on the configuration of their TXOP sharing and exchange it with other STAs through the AP.

In particular the figure exemplifies STA 1 generating a Share Offer/Request 1172 which is acknowledged 1174 by the AP, that takes the share offers/requests 1176 and sends 1178 these to the non-AP stations: STA1, STA2, and STA3. Similarly, STA3 is later shown as the TXOP holder generating a Sharing Offer/Request 1180 that is sent 1182 to the AP. The AP generates an acknowledgement 1184 and then the offers/requests 1186 are shared 1188 to the non-AP STAs.

In response to receiving the offers/requests 1186, the potential TXOP holder STA, STA 1 in this example, sends a Sharing Configuration frame 1190 to indicate the distribution of the shared TXOP access schedule for each TXOP participant STA which is assigned by this TXOP holder STA. The AP receives and acknowledges 1192 the sharing configuration, and then the AP broadcasts 1196 the sharing configurations 1194 by the AP. This process is repeated, with STA3 sending 1200 a sharing configuration. 1198 to the AP which acknowledges 1202 it, and then the AP shares the configurations 1206 by broadcasting 1208 to the other STAs. The sharing configurations contain the distribution of shared TXOP access time information for all non-AP STAs, which is assigned by each potential TXOP holder STA.

7.4.2. Semi-Static TXOP Sharing

Referring back to FIG. 13C an example was shown of semi-static TXOP sharing in which the exchange of RTS CTS between the sharing STA and the AP announcing that the coming TXOP is allowed, is shared according to the agreed upon configuration. Once other STAs sharing the TXOP receive the RTS or CTS showing that the TXOP is to be shared and knowing that they are included in the sharing configuration, STAs can determine when to access the channel. The RTS/CTS used are the modified RTS CTS described herein having added information about how the TXOP is shared. It should be appreciated that one can use different forms of message exchange between the STA sharing its TXOP and the AP so that other STAs can receive this information.

7.5. Simplified TXOP Sharing Scheme

Figure 46:
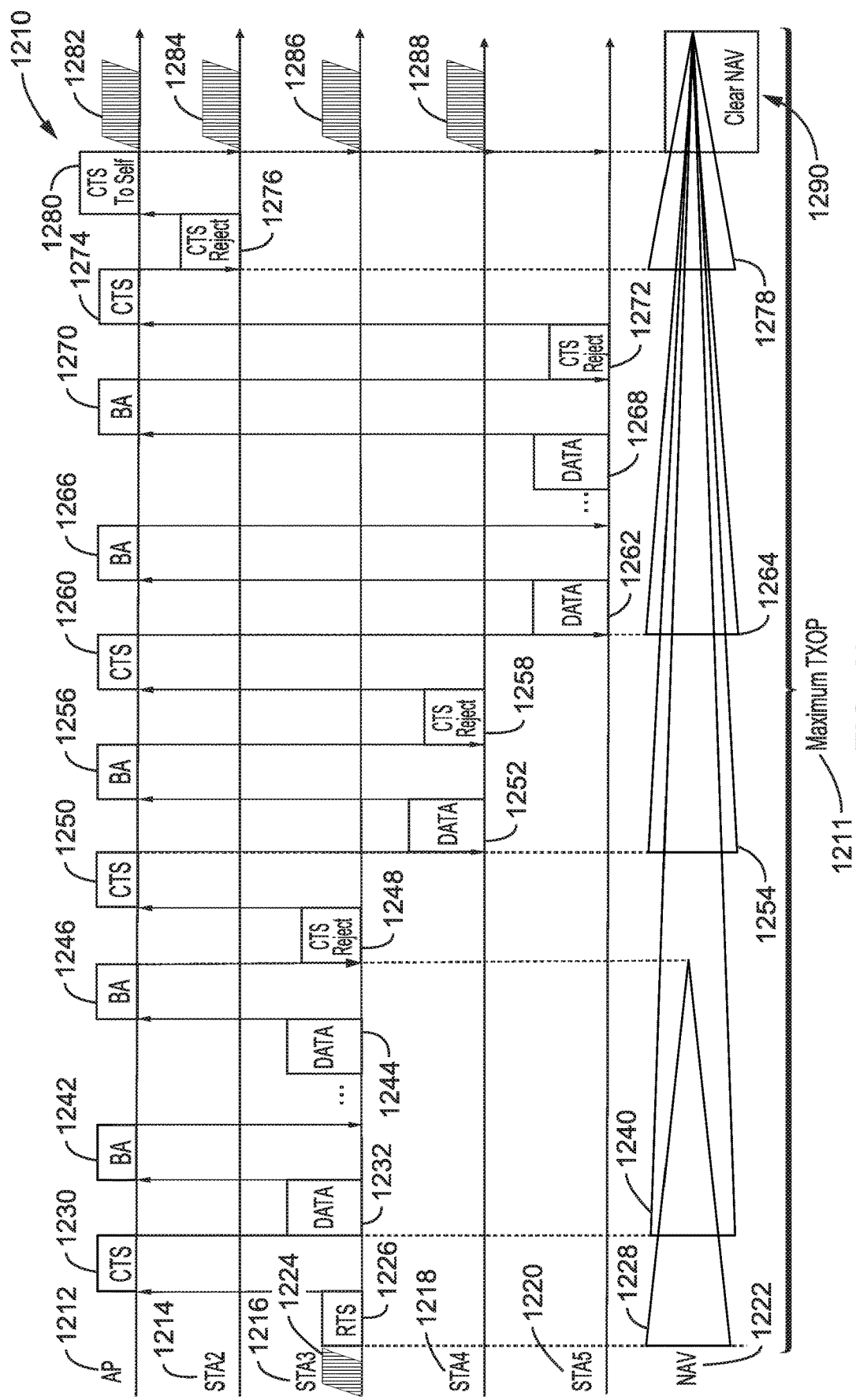
FIG. 46 is a communication sequence diagram of a simplified TXOP sharing method which shares the TXOP by directly looping through all non-AP STAs giving them the opportunity to share the TXOP according to at least one embodiment of the present disclosure.

FIG. 46 illustrates an example embodiment 1210 of a simplified TXOP sharing method within a maximum TXOP interval 1211. The simplified TXOP sharing scheme shares the TXOP duration by directly looping through all non-AP STAs. This scheme is simple to achieve since it skips the steps for identifying the shared TXOP participant STAs and of assigning the corresponding time resources to each of them.

The figure depicts interactions between an AP 1212, STA2 1214, STA3 1216, STA4 1218 and STA5 1220 as well as depicting carrier sensing in the Network Allocation Vector (NAV) 1222.

STA 3 in this example is the shared TXOP holder STA which can be seen contending for 1224 and gaining channel access, upon which it sends an RTS 1226 to the AP, the associated NAV 1228 can be seen. STA3 receives a CTS 1230 from the AP. As the shared TXOP holder STA 3 can use the shared TXOP time as much as needed, and it should be noted that the maximum TXOP duration is a configuration setting. The figure depicts STA3 setting NAV 1240 and communicating Data 1232 through 1244, each receiving a Block Acknowledge (BA) 1242 through 1246 from the AP. After finishing its Data transmission, STA 3 sends a CTS-Reject 1248 to the AP.

If time allows, the AP then loops through the next STA which is a shared TXOP participant STA, sending a CTS 1250 to it which in this case is shown as STA 4. It will be noted that STA 4 does not send an RTS, since it is not the shared TXOP holder, but receives the CTS from the AP unilaterally (not based on anything sent from the STA to the AP) with associated NAV 1254. The AP assigns a limited shared TXOP time to each shared TXOP participant STA in turn. In the figure STA 4 sends Data 1252. In this example STA 4 finishes its transmission earlier than the assigned shared TXOP limitation. After its data block STA 4 receives a BA 1256, and since it has completed its Data it sends a CTS reject 1258 to the AP.

The AP then moves on to the next station, which is depicted as STA 5, and sends it a CTS 1260 and starts a new NAV 1264. STA5 starts sending Data 1262, a series of these can be performed. STA 5 receives a BA 1266, 1270 at the end of each of its Data transmissions 1262, 1268, after which it sends a CTS Reject 1272 to the AP. STA 5 can be seen approaching the end of the assigned shared TXOP limitation.

The AP sends a CTS 1274 to STA2 with associated NAV 1278, but since this station does not have Data to send, it responds with a CTS Reject 1276.

Then after looping through one round of the non-AP STAs, the AP broadcasts a CTS-to-Self 1280 to clear NAV 1290 for all STAs 1282, 1284, 1286, 1288 if the current TXOP duration is not expired (i.e., current TXOP duration<maximum TXOP limitation).

Figure 47:
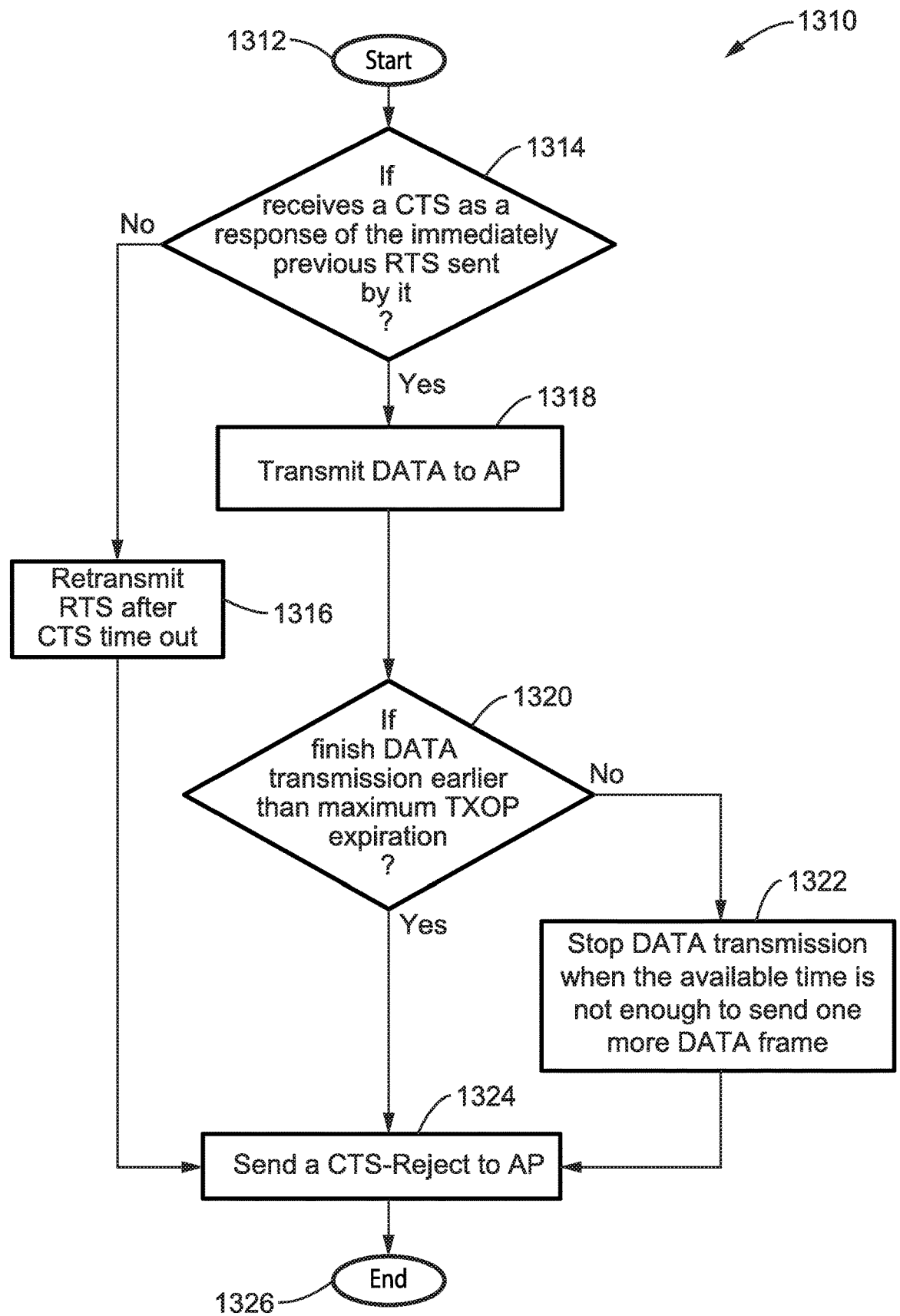
FIG. 47 is a flow diagram of a simplified shared TXOP schedule processed at the non-AP TXOP holder STA according to at least one embodiment of the present disclosure.

FIG. 47 illustrates an example embodiment 1310 of a simplified shared TXOP schedule, processed at the non-AP TXOP holder STA. The process starts 1312 and a check 1314 is made if the non-AP STA receives a CTS response to the immediately previous RTS frame which is sent to the AP. If the STA received the CTS then it is the shared TXOP holder STA, and having obtained the channel successfully it starts transmitting data 1318 to the AP. Otherwise, if at block 1314 no CTS was received then at block 1316 another RTS is transmitted after CTS timeout and the process ends 1326.

The shared TXOP holder STA can use the available TXOP duration (i.e., from 0 to maximum TXOP limitation) to any extent required. A check is made 1320 on whether the shared TXOP holder STA has finished transmitting all its Data before the maximum TXOP limitation expires. If the STA has finished its Data transmissions before the end of TXOP, then it sends 1324 a CTS-Reject to the AP before the process ends. Otherwise, if the STA still has more Data to send, then execution moves from block 1320 to block 1322 and it stops its data transmission if it determines there is insufficient time for it to send one more Data frame transmission, and the shared TXOP holder STA also sends a CTS-Reject 1324 to indicate the end the its transmission before the process ends 1326.

Figure 48:
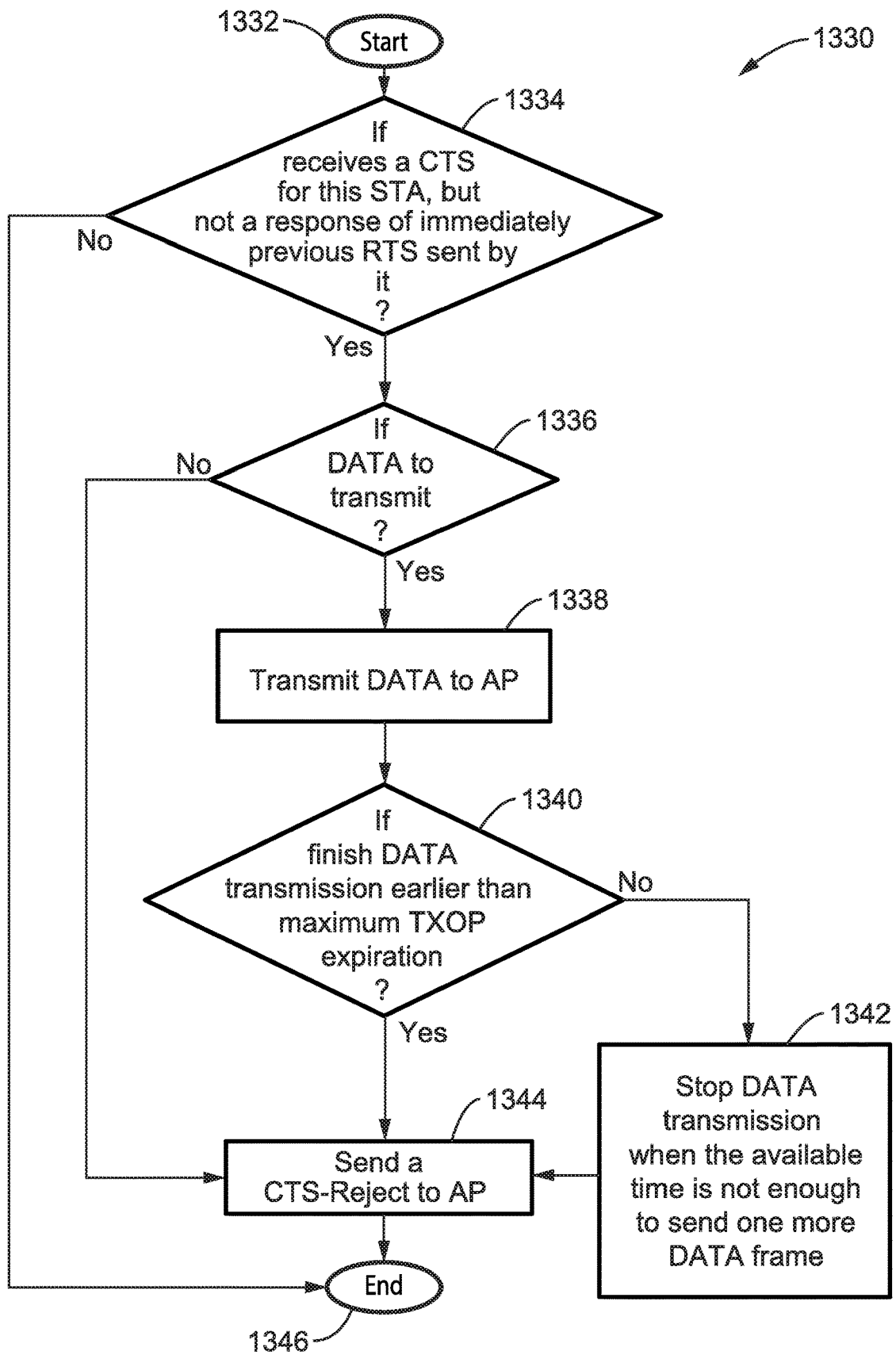
FIG. 48 is a flow diagram of a simplified shared TXOP schedule processed at the non-AP TXOP participant STA according to at least one embodiment of the present disclosure.

FIG. 48 illustrates an example embodiment 1330 of a simplified shared TXOP schedule, processed at the non-AP TXOP participant STA. The process starts 1332, and a check is made 1334 to determine if the STA received a CTS which is not in response to an immediately prior RTS frame being sent from the STA. If the STA has not received the CTS, then processing ends 1346.

Otherwise, having received a CTS as a shared TXOP participant STA, it gains channel access shared by the TXOP holder STA. A check is made 1336 to determine if the STA has Data to be sent. If there is no data to send, then execution moves to block 1344 and the STA sends a CTS-Reject to the AP and the process ends 1346.

Otherwise, if there is Data to send then the shared TXOP participant STA starts sending 1338 Data to the AP and can use the available TXOP duration as assigned in the configuration. A check is made 1340 if the STA will finish its Data transmission earlier than the Maximum TXOP expiration time. If it will complete its data transmission before the TXOP ending, then at block 1344 a CTS-Reject is sent to the AP and the process ends. Otherwise, if there is not sufficient time to complete its next Data frame transmission, it reaches block 1342 where it stops Data transmission and moves to block 1344 to send a CTS-Reject to the AP before the process ends 1346.

Figure 49:
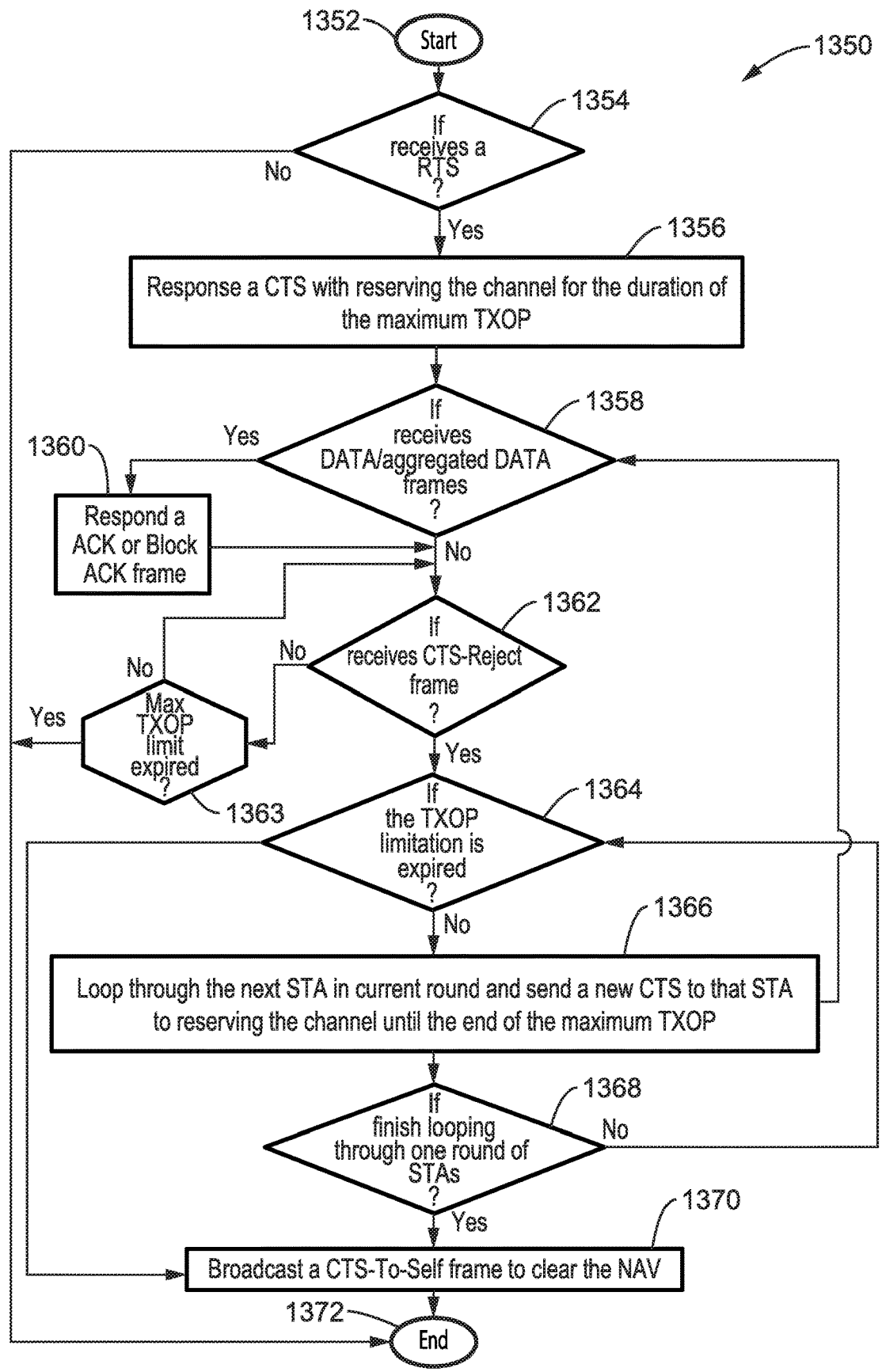
FIG. 49 is a flow diagram of a simplified shared TXOP schedule processed at the AP side according to at least one embodiment of the present disclosure.

FIG. 49 illustrates an example embodiment 1350 of a simplified shared TXOP schedule which is processed at the AP side. After starting 1352, a check is made 1354, if the AP has received an RTS from a STA. If no RTS was received, then this processing ends 1372.

Having received an RTS, the AP responds at block 1356 by sending a CTS frame to that STA, which reserves the channel for the duration of the maximum TXOP. A check is made 1358 if the AP received a Data/aggregated Data frame. If Data/aggregated Data was received, then the AP responds with an acknowledgement 1360, such as an ACK or Block ACK (BA), before it reaches block 1362. So regardless of whether the AP received Data/aggregated Data, execution reaches block 1362 which checks if the AP has received a CTS-Reject frame.

If the CTS-Reject frame has not been received, then a check is made at block 1363 to determine if the maximum TXOP limitation has expired. If it has not expired then execution returns to block 1362 and it continues waiting for the CTS-Reject. Otherwise, with the maximum TXOP limit having expired, execution ends 1372.

If in block 1362, a CTS-Reject frame is received, then this indicates that the TXOP holder has completed sending data, and execution reaches block 1364 which checks if the TXOP limitation has expired. If it has not expired, then at block 1366 the AP loops through the next STA in the current round and sends a new CTS to the next STA, which reserves the channel until the end of the current maximum TXOP limitation.

Then at block 1368 it is determined if the AP has finished looping through one round of all the STAs in one round; if it has not gone through one round then execution returns to block 1364 to determine again if the TXOP limitation is expired. If however it is determined at block 1368 that the AP has finished looping through a round of stations, then execution reaches block 1370 which broadcasts a CTS-To-Self frame to reset the NAV to 0 for all the STAs, before processing ends 1372.

8. Frame Format Design

8.1. STA TXOP Shareability Element

Figure 50:
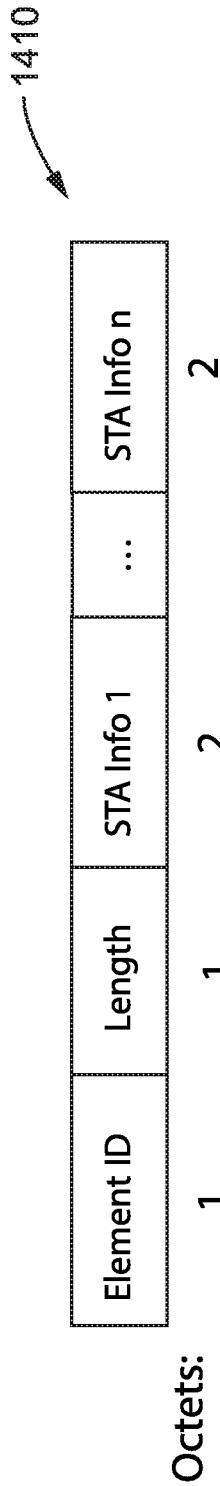
FIG. 50 is a data field diagram of a STA TXOP shareability element according to at least one embodiment of the present disclosure.

FIG. 50 illustrates an example embodiment 1410 of a STA TXOP shareability element format. The STA TXOP shareability element is contained in the management frames, such as an authentication frame or association request frame, and is used by each non-AP STA to inform the associated AP about its TXOP shareability. An Element ID field identifies the element and in this instance indicates this is a STA TXOP shareability element. If an AP receives an authentication or association request frame with an Element ID field set to the STA TXOP Shareability element, then the AP records all the share offer/request information of each STA, as indicated in the STA Info field, and sends back an authentication or association response frame to indicate a successful reception. A Length field indicates the number of octets in the element excluding the Element ID and Length fields. STA Information fields (e.g., 1-n) provide information about the STAs.

Figure 51:
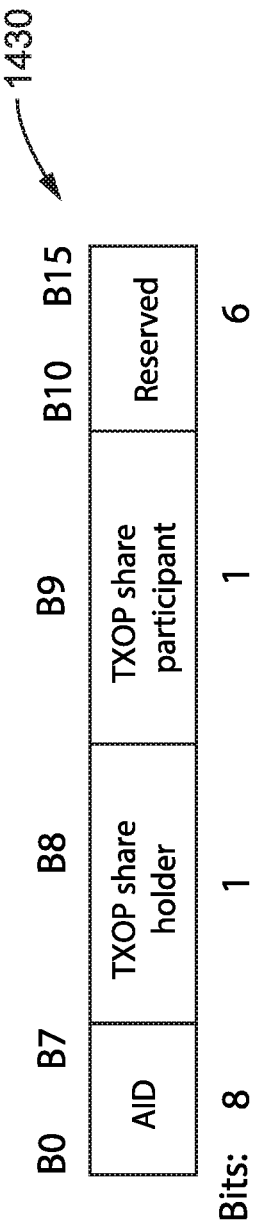
FIG. 51 is a data field diagram of a STA Info field according to at least one embodiment of the present disclosure.

FIG. 51 illustrates an example embodiment 1430 of a STA information field having the following subfields. An AID subfield contains the AID of the STA for which TXOP shareability is indicated. A TXOP share holder subfield indicates the shareability of this STA as the TXOP holder. The TXOP share holder subfield is set to a first state (e.g., 1) to indicate that this STA, operating as the TXOP holder is willing to share its TXOP with other STAs. The TXOP share holder subfield is set to a second state (e.g., 0) to indicate that this STA, operating as the TXOP holder, is not willing to share its TXOP with other STAs. A TXOP share participant subfield indicates the shareability of this STA as the TXOP participant. The TXOP share participant subfield is set to a first state (e.g., 1) to indicate that this STA, operating as the shared TXOP participant STA, is willing to join the TXOP being shared by the TXOP holder STA. Otherwise, if the TXOP share participant subfield is set to a second state (e.g., 0), then it indicates that this STA, operating as the shared TXOP participant STA, is not willing to join the TXOP that is shared by the TXOP holder STA.

8.2. Access Request Information Element

Figure 52:
FIG. 52 is a data field diagram of an Access Request Information element according to at least one embodiment of the present disclosure.

FIG. 52 illustrates an example embodiment 1450 of an access request information element format. The fields include an Element ID field which identifies the element, and in this example it indicates that this is an Access Request information element. A Length field indicates the number of octets in the element excluding the Element ID and Length fields. Allocation control fields are shown (1-n), with the subfields for one of these being illustrated in FIG. 53.

Figure 53:
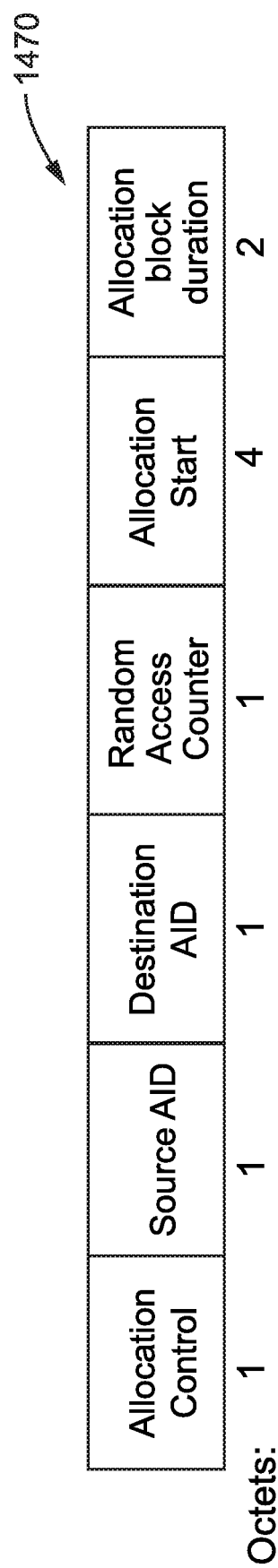
FIG. 53 is a data field diagram of an Allocation Control subfield according to at least one embodiment of the present disclosure.
Figure 54:
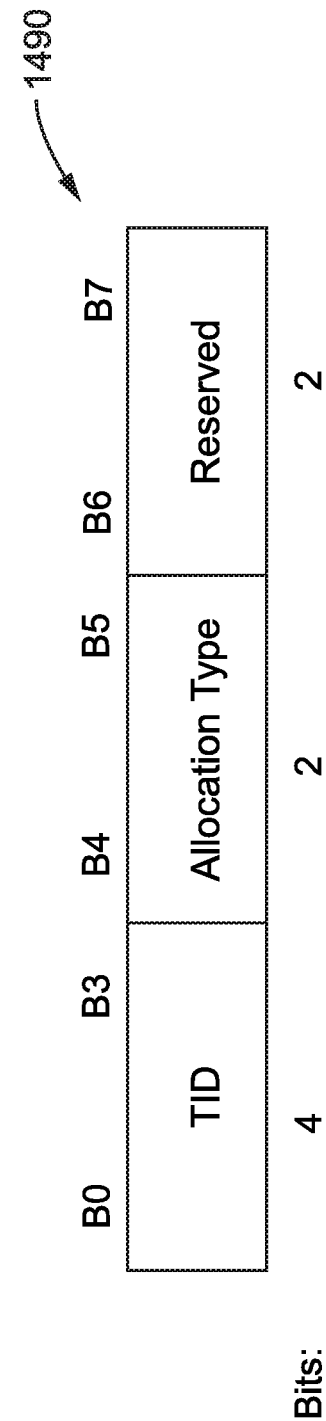
FIG. 54 is a data field diagram of an Allocation Control subfield according to at least one embodiment of the present disclosure.

FIG. 53 illustrates an example embodiment 1470 of an allocation control subfield has the following subfields. An Allocation Control subfield indicates the TID and the Allocation Type, whose format is depicted in FIG. 54. A Source AID subfield is set to the AID of the STA that initiates channel access during access allocation. A Destination AID subfield is set to the AID of the STA that the source STA targets during the allocation. A Random Access Counter subfield indicates a range of time, in microseconds, that can be selected to perform a random access count down. In the example embodiment, possible values range from 1 to 32,767. If a STA receives a frame with the AccessRequestType subfield set as Random Access Slot Allocation and the Random Access Counter subfield is not zero, then the STA should randomly access the channel and send the Access Request frame. An Allocation Start subfield indicates the access start time of the STA, and for example contains the lower 4 octets of the TSF at the time the access starts. For Dedicated Access Slot Allocation type and Dedicated Transmission Access Allocation type the following holds.

Allocation Start$_n$=Allocation Start$_1$+($n$-1)*Allocation block duration.

Allocation Start$_1$: the Allocation start time for the 1st allocation.

Allocation Start$_n$: the Allocation start time for the nth allocation.

An Allocation Block Duration subfield indicates the duration, in microseconds, of a time block for which the access allocation is made. For a Dedicated Access Slot Allocation type, the block duration should be smaller, with a possible example value range of from 1 to 32,767.

For a Dedicated Transmission Access Allocation type, the block duration should be larger, with a possible example value range being from 1 to 65,535.

FIG. 54 illustrates an example embodiment 1490 of an Allocation Control subfield format having the following subfields. The Traffic Identifier (TID) subfield identifies the Traffic Class (TC) or Traffic Stream (TS) for the allocation request or grant. The Allocation Type subfield defines the access request type, with possible values listed in Table 1 titled AccessRequestType subfield Values. It should be appreciated that different values can be used to represent these states, and others exemplified herein, without departing from the present disclosure.

8.3. Sharing Offer/Request Frame

FIG. 55 illustrates an example embodiment 1530 of a Sharing Offer/Request frame format. A Frame Control field indicates the type of frame. A Duration field contains NAV information used for CSMA/CA channel access. An RA field contains a MAC address for the recipient of the frame. A TA field contains a MAC address of the STA that transmitted the frame. A BasicServiceSet ID (BSSID) subfield is the MAC address of the AP that the non-AP STA is associated to. If the BSSID indicates the same MAC address as the TA, it means the sharing offer/request frame is delivering shareability information for the non-AP STAs from the internal BSS; otherwise, it means the sharing offer/request frame is delivering shareability information for a non-AP STAs from an inter BSS which ID is indicated by BSSID. One or more STA Share Offer/Request info fields are shown (e.g., 1-$n$) which indicate the TXOP share offer/request information of the non-AP format and having subfields described in FIG. 56.

FIG. 56 illustrates an example embodiment 1550 of the STA Share offer/request information field format having the following subfields. A Priority field indicates the priority of the traffic that is stored in the buffer of the STA. This priority information can be used by the TXOP holder for the TXOP access scheduler. A STA AID is the AID of the non-AP TXOP participant STA. A TXOP Share Request subfield set to a first state (e.g., 1) to indicate that this STA is requesting a shared TXOP; otherwise it is set to a second state (e.g., 0) if there is no request. When the AP receives a Share Offer/Request frame that has the TXOP Share Request field set in a first state (e.g., 1), the AP is made aware that the STA which transmitted this frame is willing to participant in the shared TXOP. A TXOP Resource Request subfield indicates the number of continuous Resource Units (RUs) that this non-AP STA requests in the shared TXOP, such as in basic RU (26 tone). It should be appreciated that a Resource Unit (RU) is a unit in OFDMA terminology to denote a group of subcarriers (tones) used in both DownLink (DL) and UpLink (UL) transmissions. By way of example and not limitation this embodiment has a valid value of resource request range of from 1 to 37. The AP broadcasts this information in the sharing Offer/Request frame.

A TXOP Share Offered subfield is set to a first state (e.g., 1) to indicate that this STA is willing to be the non-AP TXOP holder STA and share its TXOP with other STAs; otherwise the subfield is set to a second state (e.g., 0). When an AP receives a Share Offer/Request frame that has the TXOP Share Offered field set to the first state, the AP is made aware that the STA who sent this frame is willing to share its TXOP with other STAs. A TXOP Resource Offered subfield indicates how many continuous RUs that the TXOP holder STA is willing to share with other STAs, such as in basic RU (26 tone). By way of example and not limitation this embodiment has a valid value range of from 1 to 37. The AP broadcasts this information in the sharing offer/request frame.

8.4. RTS-Share Frame and CTS-Share Frame

When the non-AP TXOP holder STA senses the channel is free (not busy) and obtains the channel, it announces its willingness to share the TXOP by sending an RTS-share frame to the AP. After the AP receives an RTS-share frame from a non-AP TXOP holder STA, it responds with a CTS-share frame to indicate the successful reception and is aware that the TXOP is a shard TXOP.

FIG. 57 illustrates an example embodiment 1570 of an RTS-share frame. A Frame Control field indicates the type of frame. A Duration field contains NAV information used for CSMA/CA channel access. By way of example and not limitation, the duration field is encoded with Bits 0-13 set up for a short NAV duration value, which cannot be equal to 0; Bits 14-15 are set as 01, which is a code indicating this as sharing information. If the sharing information is indicated in the duration value field in this RTS share frame then this indicates that the TXOP is shareable. Table 2 details this duration field encoding, with the present disclosure making use of the underlined reserve field.

An RA field contains an address for the recipient of the frame. A TA field contains an address for the STA transmitting the frame. These fields are in the MAC header.

FIG. 58 illustrates an example embodiment 1590 of a CTS-share frame. A Frame Control field indicates the type of frame. A Duration field contains NAV information used for CSMA/CA channel access. Table 2 also provides duration field encoding for the CTS-share frame. An RA field contains an address for the recipient of the frame. These fields are in the MAC header.

8.5. TXOP Offer Frame

In the TXOP participant acquirement stage, the non-AP TXOP holder STA, or the AP, broadcasts a TXOP Offer Frame to indicate that the non-AP TXOP holder STA is willing to share its TXOP, and inquires about other STAs who are willing to join the shared TXOP. Once non-AP shared TXOP participant STAs receive this TXOP Offer frame, they respond with a new frame referred to as an Access Request frame to indicate they are willing to join the next shared TXOP with the non-AP TXOP holder STA.

In the TXOP schedule and access stage, after the non-AP TXOP holder STA sends Data to the associated AP, it unicasts the TXOP Offer frame to the next TXOP share participant STA, indicating the transmission duration for the next TXOP share participant STA. Upon receiving the unicast TXOP Offer frame, the non-AP shared TXOP participant STA sends UL Data to the associated AP within the transmission duration.

Figure 59:
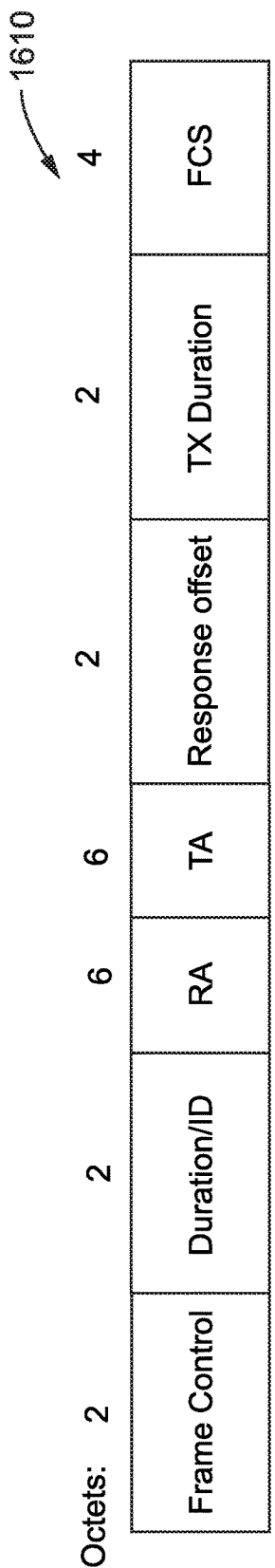
FIG. 59 is a data field diagram of a TXOP Offer frame according to at least one embodiment of the present disclosure.

FIG. 59 illustrates an example embodiment 1610 of a TXOP Offer frame format. A Duration/ID field contains the AID value assigned to the STA transmitting the frame. An RA field is set to an address for the STA receiving this frame. If this frame is broadcast, then the RA field should be set as a broadcasting address, which should be FF:FF:FF:FF:FF:FF. A TA field value contains the address of the STA transmitting this frame. A Response Offset field indicates that the STA should send an Access Request Frame to the non-AP TXOP holder STA/AP within this time offset once it has received the TXOP Offer Frame. A TX Duration field value indicates that the STAs should not exceed the TX duration when transmitting data after it receives the TXOP offer.

8.6. Access Request Frame

Figure 60:
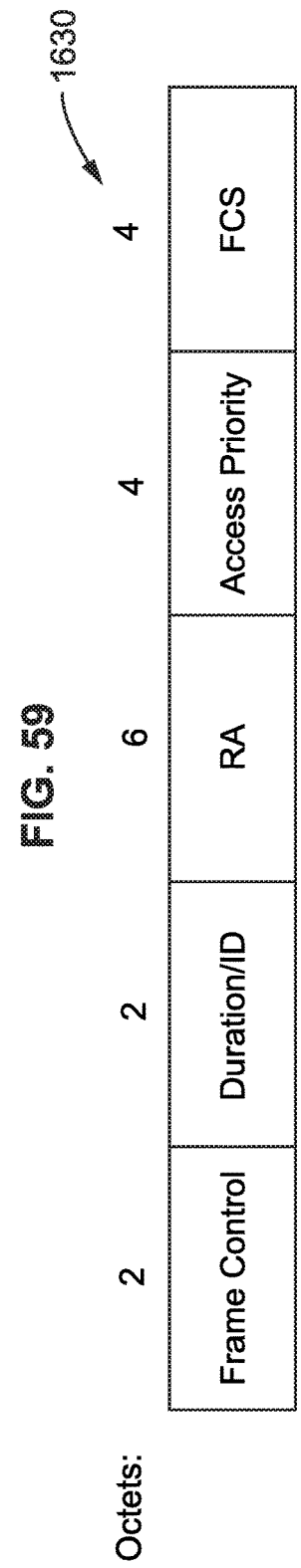
FIG. 60 is a data field diagram of an Access Request frame format according to at least one embodiment of the present disclosure.

FIG. 60 illustrates an example embodiment 1630 of an Access Request Frame. A Frame Control and Duration/ID field are shown as in previous message examples. An RA field of the Access Request frame is different when operating without AP coordination, than when it is operating with AP coordination. Without AP coordination the RA field of the Access Request frame is set as either of the following: (1) to the TA field of the immediately previous TXOP Offer frame, thus the non-AP TXOP holder STA is the destination of the Access Request frame sent by non-AP shared TXOP participant STAs; or (2) to the RA field of the immediately previous CTS-Share frame, thus the destination address of this Access Request frame is still the non-AP TXOP holder STA.

With AP coordination the RA field of the Access Request frame can be set as either of the following: (1) to the TA field of the immediately previous TXOP Offer frame, thus the AP is the destination of the Access Request frame sent by the non-AP shared TXOP participant STAs; or (2) to the MAC address of the associated AP if not receiving the TXOP Offer frame, thus the AP is the destination of the Access Request frame.

Figure 61:
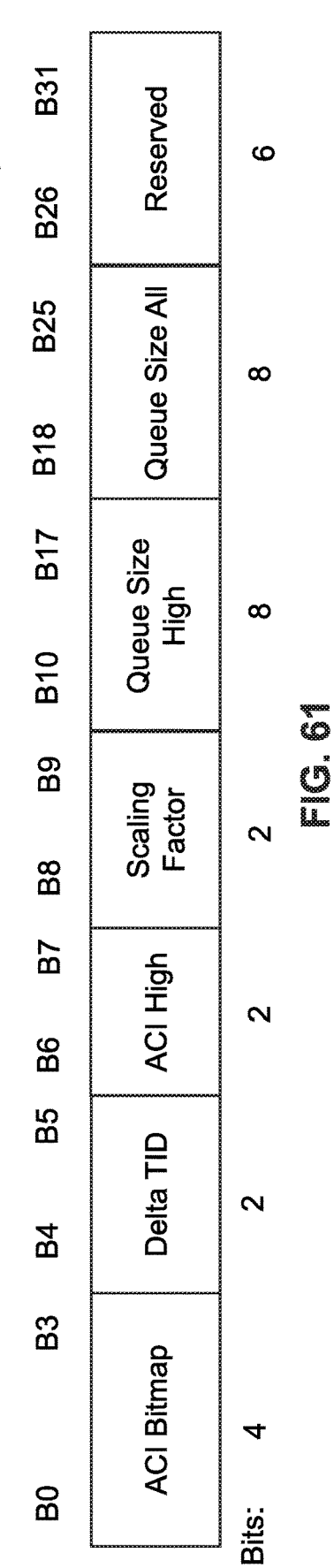
FIG. 61 is a data field diagram of an Access Priority subfield according to at least one embodiment of the present disclosure.

An Access Priority subfield provides information on the priority of the access and is described in FIG. 61.

FIG. 61 illustrates an example embodiment 1650 of an Access Priority format. An Access Category Information (ACI) Bitmap subfield indicates access categories for which the buffer status is reported. Each bit of the ACI Bitmap subfield is set to a first state (e.g., 1) to indicate that the buffer status of the corresponding AC is included in the Queue Size All subfield, and set to a second state (e.g., 0) otherwise (except if the ACI Bitmap subfield is 0 and the Delta TID subfield is 3) then it indicates the buffer status of all eight TIDs. A Delta TID subfield, used in combination with the values of the ACI Bitmap subfield, indicate the number of TIDs for which the STA is reporting the buffer status.

An Access Category Information (ACI) High subfield indicates the ACI of the Access Category (AC) for which the Access Request Frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.7. TXOP Access Scheduler Frame

The non-AP TXOP holder STA or the AP unicasts a TXOP Access Scheduler frame to the non-AP shared TXOP participant STAs, indicating the TX Duration for each of the STAs. Once a STA receives the TXOP Access Scheduler frame, it will send Data to the associated AP in different time slots as indicated in the Allocation Control field in the Access Request Information element as embedded in the beacon frame.

Figure 62:
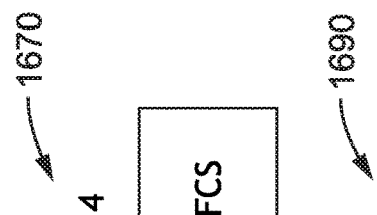
FIG. 62 is a data field diagram of a TXOP access scheduler frame according to at least one embodiment of the present disclosure.

FIG. 62 illustrates an example embodiment 1670 of a TXOP access scheduler frame. A Frame Control and Duration/ID field are shown as in previous message examples. An RA field is set to an address for a STA which is to receive this frame. A TA field contains the address for the STA transmitting this frame. A TXOP Access Allocation Info field defines the TXOP allocation information for the dedicated transmission access, and has subfields described in FIG. 63.

Figure 63:
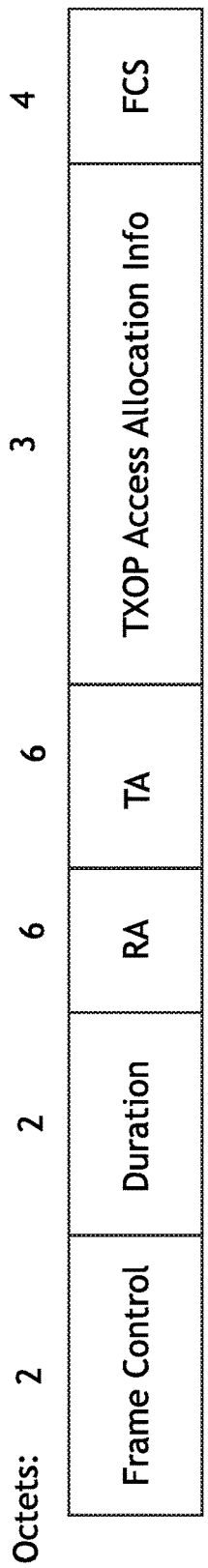
FIG. 63 is a data field diagram of a TXOP Access Allocation Info subfield according to at least one embodiment of the present disclosure.

FIG. 63 illustrates an example embodiment 1690 of TXOP Access Allocation Info subfields. A TID subfield identifies the TC or TS for the TXOP access allocation. An Allocation Type subfield defines the access scheduler type of the TXOP, with possible values according to at least one embodiment listed in Table 1 of AccessRequestType subfield values, B4 and B5 are set as 1 and 0, respectively to indicate this is a dedicated transmission access allocation. A Source AID subfield is set to the AID of the STA that initiates channel access during access allocation. A Destination AID subfield is set to the AID of the STA that the source STA targets during the allocation.

8.8. Broadcast TXOP Schedule Frame

The non-AP TXOP holder STA broadcasts a Broadcast TXOP Scheduler frame to the TXOP share participant STAs, indicating the TX Duration for each of the STAs. Once a STA receives the Broadcast TXOP Scheduler frame, it will send Data to the associated AP in different time slots as indicated in the Broadcast TXOP Scheduler frame.

Figure 64:
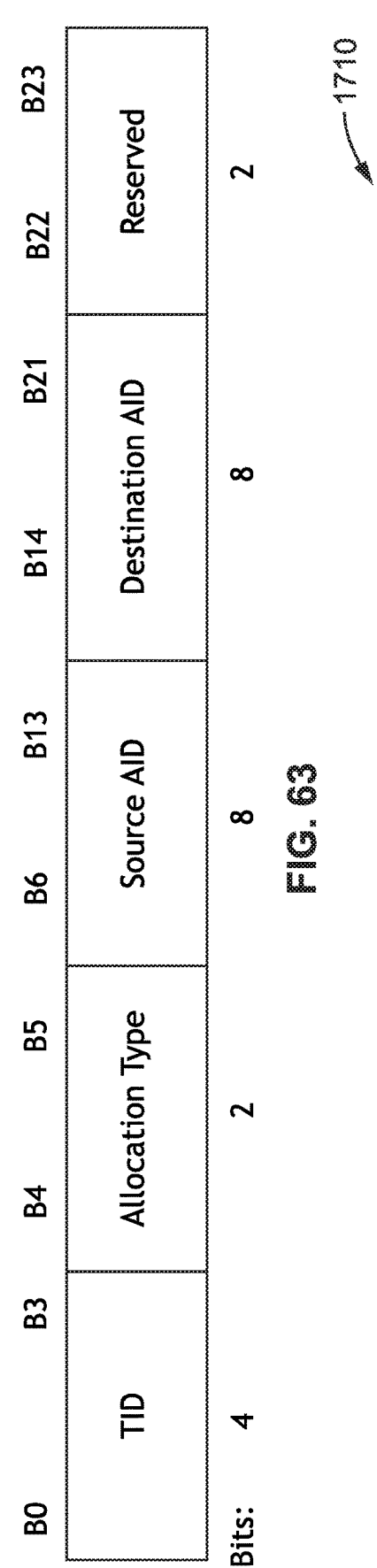
FIG. 64 is a data field diagram of a Broadcast TXOP Schedule frame according to at least one embodiment of the present disclosure.

FIG. 64 illustrates an example embodiment 1710 of a Broadcast TXOP Schedule frame. A Frame Control and Duration/ID field are shown as in previous message examples. An RA field is set to an address for recipient STA which is to receive this frame. A TA field contains the address for the STA transmitting this frame. One or more STA TXOP schedules (e.g., 1-$n$) are seen containing TXOP schedules, and having subfields shown in FIG. 65.

FIG. 65 illustrates an example embodiment 1730 of a TXOP Schedule field. An Allocation Control subfield indicates the TID and the Allocation Type as seen in FIG. 66. A Source AID subfield is set to the AID of the STA that initiates channel access during access allocation. A Destination AID subfield is set to the AID of the STA that the source STA targets during the allocation. An Allocation Start subfield indicates the start time of the access, and by way of example contains the lower 4 octets of the TSF at the time the access starts. For a Dedicated Transmission Access Allocation type as defined in the Allocation Control subfield format, the following holds.

$$\text{Allocation Start}_n = \text{Allocation Start}_1 + (n-1) * \text{Allocation block duration.}$$

Allocation Start$_1$: the Allocation start time for the 1st STA TXOP schedule.

Allocation Start$_n$: the Allocation start time for the nth STA TXOP schedule.

The Allocation Block Duration subfield indicates the duration, in microseconds, of a time block for which the access allocation is made.

For a Dedicated Access Slot Allocation type, the block duration should be smaller, by way of example and not limitation, having a possible value range of from 1 to 32,767. For a Dedicated Transmission Access Allocation type, the block duration should be larger (e.g., double the size) for example having a possible value range of from 1 to 65,535.

FIG. 66 illustrates an example embodiment 1750 of an Allocation Control subfield indicating the TID and Allocation Type.

8.9. Shared TXOP Participant Announcement Frame

After the AP receives all the Access Request frames it unicasts a Shared TXOP Participant Announcement frame to the non-AP TXOP holder STA to announce the TXOP share participant information.

FIG. 67 illustrates an example embodiment 1770 of a Shared TXOP Participant Announcement frame. A Frame Control and Duration/ID field are shown as in previous message examples, along with an RA field and TA field such as previously described. Fields are included for one or more STA TXOP participants, the example showing 1-$n$ participants. The subfields within this participant field are seen in FIG. 68.

Figure 68:
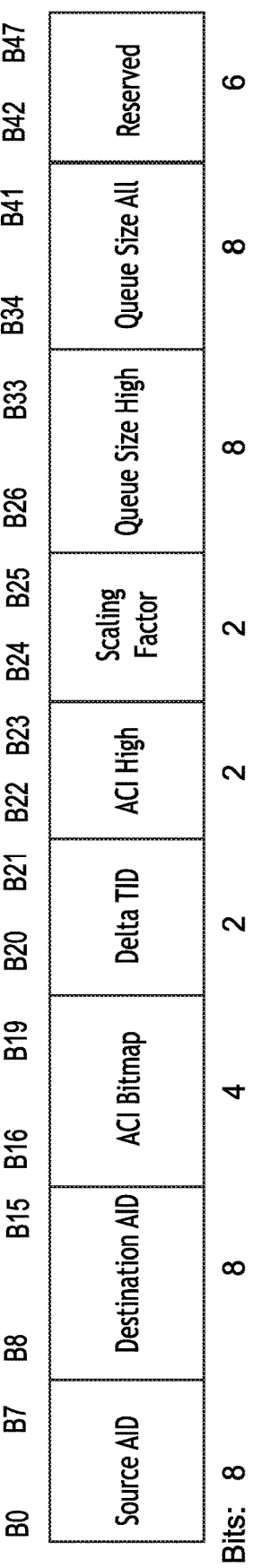
FIG. 68 is a data field diagram of a STA TXOP Participant field according to at least one embodiment of the present disclosure.

FIG. 68 illustrates an example embodiment 1790 of a STA TXOP Participant field. The Source AID subfield is set to the AID that initiates channel access during access allocation. The Destination AID subfield is set to the AID of the STA that the source STA targets during the allocation. An ACI Bitmap subfield indicates the access categories for which the buffer status is reported. A Delta TID subfield is used in combination with the values of the ACI Bitmap subfield, to indicate the number of TIDs for which the STA is reporting the buffer status.

An Access Category Information (ACI) High subfield indicates the ACI of the Access Category (AC) for which the Access Request frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.10 Request TXOP Offer Frame

After the non-AP TXOP holder STA sends Data to the associated AP, it also sends a Request TXOP Offer frame to the associated AP, which indicates the start of the shared TXOP access for the next TXOP share participant STA. After receiving the Request TXOP Offer frame, the AP unicasts a TXOP Offer frame to the next TXOP share participant STA, and indicates the TX Duration for the next STA.

Figure 69:
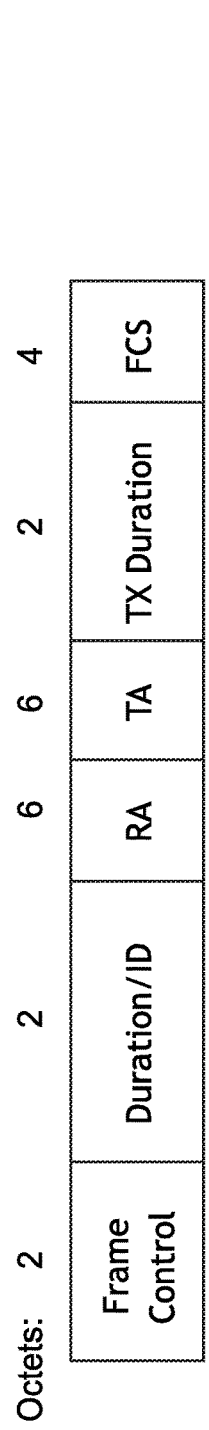
FIG. 69 is a data field diagram of a Request TXOP Offer frame according to at least one embodiment of the present disclosure.

FIG. 69 illustrates an example embodiment 1810 of a Request TXOP Offer frame. A frame control field, Duration/ID field, RA field and TA field are shown as in previous message examples. The Duration/ID field indicates the AID of the STA that the AP should send the TXOP Offer frame to, while the TX duration field indicates to the next STA what the maximum transmission duration is.

8.11 Request TXOP Access Scheduler Frame

Before a non-AP TXOP holder sends Data to the associated AP, it first sends a Request TXOP Access Scheduler frame to the AP, which indicates the shared TXOP access for all other non-AP shared TXOP participant STAs. After receiving the Request TXOP Access Scheduler frame, the AP either unicasts a TXOP Access Scheduler frame to the non-AP shared TXOP participant STAs, and indicates the TX Duration for each of them or broadcasts a Broadcast TXOP Scheduler frame to all the non-AP shared TXOP participant STAs, and indicates the TX Duration for each of them.

Figure 70:
FIG. 70 is a data field diagram of a Request TXOP Access Scheduler frame according to at least one embodiment of the present disclosure.

FIG. 70 illustrates an example embodiment 1830 a Request TXOP Access Scheduler frame. A Frame Control field, Duration field, RA field and TA field are shown as in previous message examples. At least one STA TXOP Access Request field is included, the example is shown with TXOP Access Requests 1 through n. Subfields within the TXOP Access Request field are described in FIG. 67.

Figure 71:
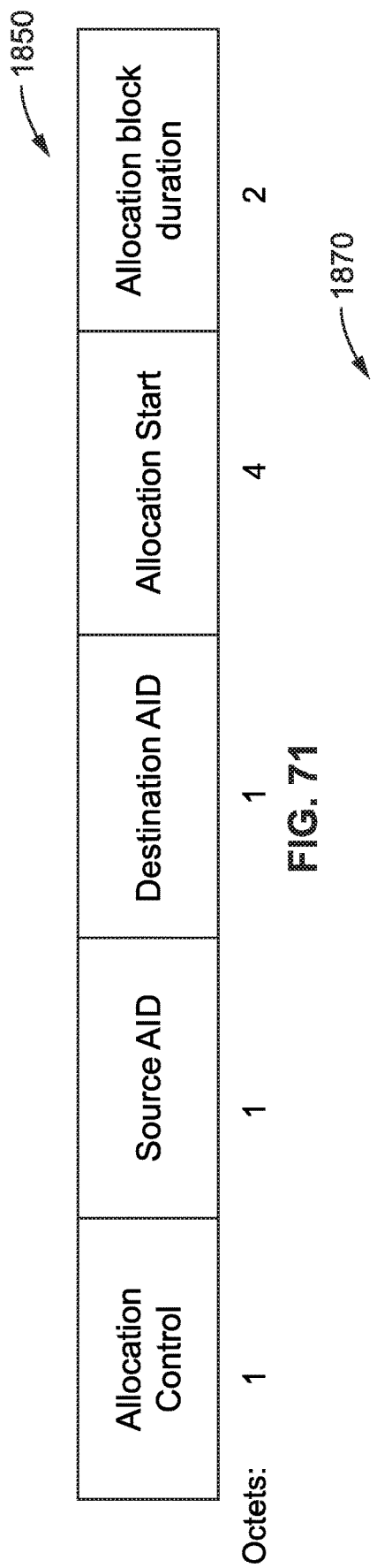
FIG. 71 is a data field diagram of a STA TXOP Access Request field according to at least one embodiment of the present disclosure.

FIG. 71 illustrates an example embodiment 1750 of a STA TXOP Access Request field. An Allocation Control field indicates the number of time slots requested. The Source AID subfield is set to the AID of the STA that initiates channel access during access allocation. A Destination AID subfield is set to the AID of the STA that the source STA targets during the allocation. An Allocation Start subfield indicates the start time of the access, and in at least one embodiment it contains the lower 4 octets of the TSF at the time the access starts. For a Dedicated Transmission Access Allocation type as defined in the Allocation Control subfield format, the following holds.

Allocation Start$_n$=Allocation Start$_1$+(n−1)*Allocation block duration.

Allocation Start$_1$: the Allocation start time for the 1st allocation.

Allocation Start$_n$: the Allocation start time for the nth allocation.

An Allocation Block Duration subfield indicates the duration, in microseconds, of a time block for which the access allocation is made. For a Dedicated Access Slot Allocation type, the block duration is exemplified here with possible values ranging from 1 to 32,767. For a Dedicated Transmission Access Allocation type, the block duration should be larger, such as exemplified with possible values ranging from 1 to 65,535.

Figure 72:
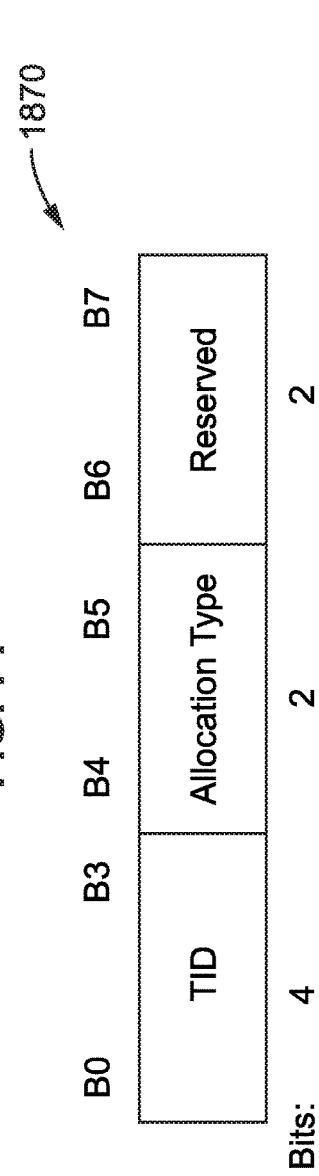
FIG. 72 is a data field diagram of an Allocation Control subfield according to at least one embodiment of the present disclosure.

FIG. 72 illustrates an example embodiment 1870 of an Allocation Control subfield having a TID subfield and an Allocation Type subfield.

8.12. Share Offer/Request Frame

Figure 73:
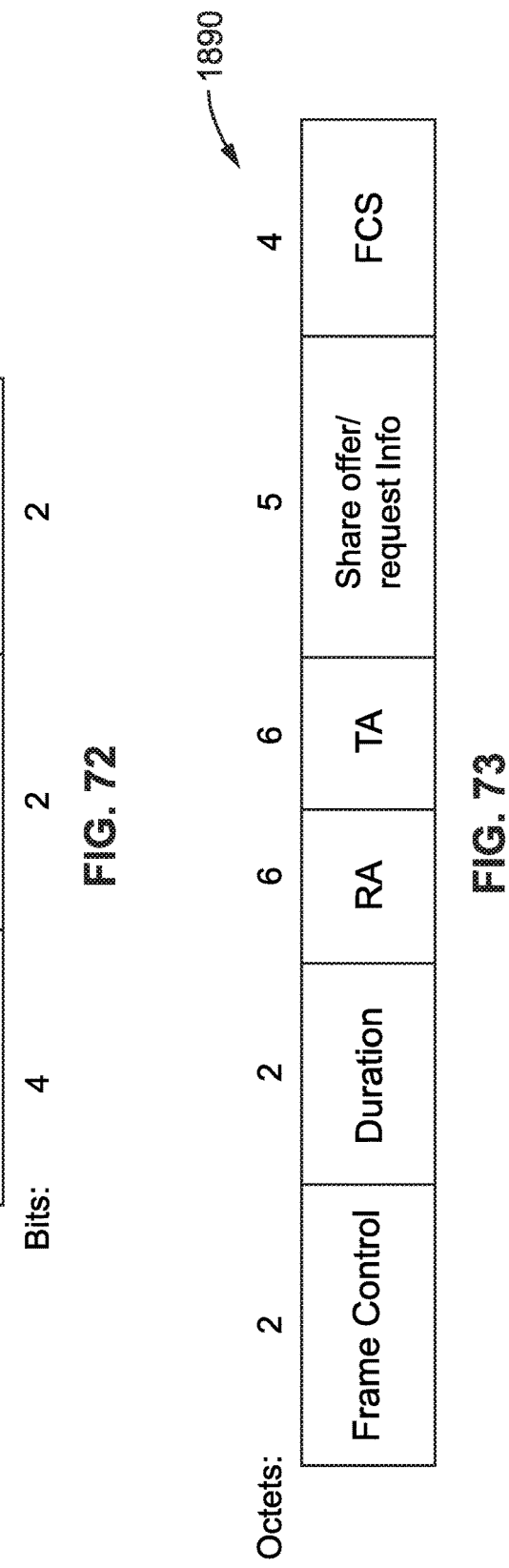
FIG. 73 is a data field diagram of a Share Offer/Request frame according to at least one embodiment of the present disclosure.

FIG. 73 illustrates an example embodiment 1890 of a Share Offer/Request frame. The Share Offer/Request frame has a Frame Control field, Duration/ID field, RA field and TA field as in some previous message examples. A Share Offer/Request field indicates the TXOP share offer/request information of the non-AP STA, and is described in FIG. 74.

FIG. 74 illustrates an example embodiment 1710 of a Share Offer/Request information field. A Priority field indicates the priority of the traffic stored in the buffer of the STA, which can be used by the TXOP holder for the TXOP access scheduler. A TXOP Share Request is set to a first state (e.g., 1) to indicate that this STA is requesting a shared TXOP time; otherwise TXOP Share Request is set to a second state (e.g., 0). When the AP receives a Share Offer/Request frame that has the TXOP Share Request field set to the first state, the AP is made aware (can determine) that the STA who sent this frame is willing to participant in the shared TXOP. A TXOP Duration Request indicates the amount of time in microseconds that the STA requests in the shared TXOP. The AP will broadcast this information in the Sharing Offers/Request frame. A TXOP Share Offered value is set to a first state (e.g., 1) indicating that this STA is willing to be the TXOP holder and share its TXOP with other STAs; otherwise the value is set to a second state (e.g., 0). When the AP receives a Share Offer/Request frame that has the TXOP Share Offered field set to the first state, the AP is made aware that the STA who sent this frame is willing to share the TXOP with other STAs. A TXOP Duration Offered subfield indicates the amount of time in microseconds that the TXOP holder STA is willing to share with other STAs, and the AP will broadcast this information in the Sharing Offers/Request frame.

8.13. Sharing Offers/Request Frame

The AP broadcasts the Sharing Offers/Request frame to all the STAs, and for each STA it has a specific STA Share Offer/Request field which indicates the TXOP share/request information for that specific STA.

FIG. 75 illustrates an example embodiment 1930 of a Sharing Offers/Request frame. The Share Offers/Request frame has a Frame Control field, Duration field, RA field and TA field as in some previous message examples. Multiple STA Share Offer/Requests may be contained in the frame, depicted here as STA Share/Requests 1 through n. The format of a STA Share Offer/Request can be seen in FIG. 76.

FIG. 76 illustrates an example embodiment 1950 of a STA Share Offer/Request Information field. A Priority field indicates the priority of the traffic that is stored in the buffer of the STA which can be used by the TXOP holder for the TXOP access scheduler. A STA Address is the MAC address of the TXOP participant STA, which can be used by the TXOP holder to assign the TXOP access start time and duration for the specific STA. A STA AID is the AID of the TXOP participant STA. The remaining fields of TXOP Share Request, TXOP Duration Request, TXOP Share Offered and TX Duration Offered were described in regard to FIG. 74.

8.14. Sharing Configuration Frame

FIG. 77 illustrates an example embodiment 1970 of a Sharing Configuration frame. The Sharing Configuration frame has a Frame Control field, Duration field, RA field and TA field as in some previous message examples. A TXOP Share Offered field indicates the overall TXOP duration that the TXOP holder STA is willing to share with other STAs. A STA TXOP Access Allocation field indicates the TXOP access start time and duration for each specific STA, of which the example represents that any desired number (e.g., 1-n) of these fields can be used. After the AP receives a Sharing Configuration frame, it will record it in its STA TXOP Access Allocation information and broadcast it with the sharing configurations frame shown in FIG. 80.

FIG. 78 illustrates an example embodiment 1990 of a STA TXOP Access Allocation field. A STA Address subfield indicates the MAC address of the TXOP holder, such as utilized by the AP to set the TXOP Holder MAC Address in the sharing configurations frame shown in FIG. 77. A Participant Address subfield indicates the MAC address of the TXOP participant which is utilized by the AP to set the Participant Address subfield in the STA TXOP Access Allocation field, which is a subfield of the STA Configuration field shown in FIG. 81. An Allocation Start subfield indicates the start time of TXOP transmission of the participant STA. An Allocation Block Duration subfield indicates the duration of the TXOP transmission of the participant STA.

FIG. 79 illustrates an example embodiment 2010 of an Allocation Control subfield exemplified here with a Priority subfield, exemplified with four bits. The priority field indicates the traffic priority of the buffered data.

8.15. Sharing Configurations Frame

The AP broadcasts the Sharing Configurations frame to all the STAs and indicates the configuration for each STA in the STA Configuration field.

FIG. 80 illustrates an example embodiment 2030 of a Sharing Configurations frame. The Sharing Configuration frame has a Frame Control field, Duration field, RA field and TA field as in some previous message examples. The frame contains one or more configurations for specific stations, depicted as STA1 through to STA n. The STA Configuration subfield is described in FIG. 81.

FIG. 81 illustrates an example embodiment 2050 of the subfields within a STA Configuration subfield. A TXOP Holder MAC Address subfield indicates the MAC address of the TXOP holder STA. For any non-TXOP holder STAs: after receiving the CTS-share frame from the AP, the STA maps the RA info indicated in the CTS-share frame with the TXOP Holder MAC Address info. Thus, the STA can determine the TXOP holder, and thus, access to the corresponding STA Configuration information.

One or more STA TXOP Access Allocation fields (e.g., 1-n) is the same as defined in FIG. 77. For non-TXOP holder STAs: after mapping to a specific STA Configuration field, the STA maps its MAC address with the Participant Address subfield to further obtain the TXOP access start (as indicated in the Allocation Start subfield) and duration (as indicated in the Allocation block duration subfield) information scheduled for it.

By way of example and not limitation, at least one embodiment of the present disclosure repurposes the CTS-Share frame structure depicted in FIG. 58 having fields for Frame Control, Duration, RA and FCS.

In the simplified shared TXOP scheme, the non-AP STA sends a CTS-Reject frame to AP to indicate it has finished Data transmission or it doesn't have any Data to transmit. After receiving the CTS-Reject frame, the AP will loop through the next STA by sending a new CTS frame to the next STA. In the CTS-Reject frame the Duration field is the time required to transmit the CTS frame plus one SIFS (in microseconds) and the RA field is set to the MAC address of the AP.

In the simplified shared TXOP scheme, the AP broadcasts a CTS-To-Self frame after it finishes looping through all non-AP STAs before the current maximum TXOP expires. After receiving the CTS-To-Self frame, the non-AP STAs reset the NAV to 0 and start channel access following a random backoff. The CTS-To-Self frame has a Duration field set to the time required to transmit the CTS-To-Self frame plus one SIFS (in microseconds), and an RA field equal to the transmitter's MAC address, which is the AP's MAC address in the simplified shared TXOP scheme.

In the simplified shared TXOP scheme, the AP sends a CTS frame to loop through all non-AP STAs, which indicate the start of the shared TXOP time slot for the non-AP STA. After receiving the CTS frame, the non-AP STA should start UL Data transmission. In the CTS frame the Duration field is the time set to the end of the current maximum TXOP limitation, while the RA field is equal to the next non-AP STA's MAC address that the AP loops through.

9. General Scope of Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were selectively depicted for the sake of simplicity of illustration, as one of ordinary skill in the art recognizes the use of computer devices for carrying out steps involved with digital wireless communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit, as a wireless station (STA), configured for wirelessly communicating over at least one channel with other wireless stations (STAs) on a local area network (WLAN) in its reception area; (b) a processor coupled to said wireless communication circuit within a station configured for operating on the WLAN as a station configured to support communicating using a Transmit Opportunity (TXOP) protocol; (c) a non-transitory memory storing instructions executable by the processor for the station sharing its TXOP with other stations in the same Basic Service Set (BSS); and (d) wherein said instructions, when executed by the processor, perform one or more steps comprising: (d)(i) exchanging messages with an Access Point (AP) of the BSS informing and/or gaining approval for sharing its TXOP with other STAs in the BSS; (d)(ii) gaining access to the channel and communicating that an upcoming TXOP is available to be shared by broadcasting a message from the STA as TXOP holder to other STAs in the BSS, or by communicating to the AP indicating that the STA as TXOP holder is willing to share the TXOP with other STAs; (d)(iii) exchanging messages with other STAs in the BSS, either directly to the TXOP holder or indirectly through the AP, in determining which STAs in the BSS are requesting time in the upcoming TXOP which is available to be shared; and (d)(iv) sending messages from the TXOP holder, or through the AP, to STAs that will share the TXOP with the STA informing them of the duration and time of channel access for the upcoming TXOP which is being shared.

2. An apparatus for wireless communication in a network, the apparatus comprising: (a) a wireless communication circuit, as a wireless station (STA), configured for wirelessly communicating over at least one channel with other wireless stations (STAs) on a local area network (WLAN) in its reception area; (b) a processor coupled to said wireless communication circuit within a station configured for operating on the WLAN as a station configured to support communicating using a Transmit Opportunity (TXOP) protocol; (c) a non-transitory memory storing instructions executable by the processor for the station sharing its TXOP with other stations in the same Basic Service Set (BSS); and (d) wherein said instructions, when executed by the processor, perform one or more steps comprising: (d)(i) exchanging messages with an Access Point (AP) of the BSS informing and/or gaining approval for sharing its TXOP with other STAs in the BSS; (d)(ii) broadcasting a message from the STA as TXOP holder to other STAs in the BSS, after gaining access to the channel, wherein the message indicates that an upcoming TXOP is available to be shared; (d)(iii) exchanging messages with other STAs in the BSS in determining which STAs in the BSS are requesting time in the upcoming TXOP which is available to be shared; and (d)(iv) sending messages to STAs that will share the TXOP with the STA informing them of the duration and time of channel access for the upcoming TXOP which is being shared.

3. An apparatus for wireless communication in a network, the apparatus comprising: (a) a wireless communication circuit, as a wireless station (STA), configured for wirelessly communicating over at least one channel with other wireless stations (STAs) on a local area network (WLAN) in its reception area; (b) a processor coupled to said wireless communication circuit within a station configured for operating on the WLAN as a station configured to support communicating using a Transmit Opportunity (TXOP) protocol; (c) a non-transitory memory storing instructions executable by the processor for the station sharing its TXOP with other stations in the same Basic Service Set (BSS); and (d) wherein said instructions, when executed by the processor, perform one or more steps comprising: (d)(i) exchanging messages with an Access Point (AP) of the BSS informing and/or gaining approval for sharing its TXOP with other STAs in the BSS; (d)(ii) gaining access to the channel and communicating from the TXOP holder STA to the AP that an upcoming TXOP is available to be shared; (d)(iii) receiving messages by the AP from other STAs in the BSS which are requesting to share time in the upcoming TXOP, these messages being forwarded by the AP to the TXOP holder; and (d)(iv) sending messages from the TXOP holder STA to the AP with information on duration and time when the channel access is to occur, with the AP sending messages for sharing this duration and time information with STAs that will share the TXOP, so that these other STAs can share the channel at the time and for the duration specified; and (e) wherein said method is performed by a processor executing instructions stored on a non-transitory medium.

4. A method for performing wireless communication in a network, the apparatus comprising: (a) performing wireless communication over at least one channel of a local area network (WLAN) with other wireless stations (STAs) and Access Points (APs) in its reception area to support communicating using a Transmit Opportunity (TXOP) protocol; (b) sharing its TXOP with other stations in the same Basic Service Set (BSS) by exchanging messages with an Access Point (AP) of the BSS informing and/or gaining approval for sharing its TXOP with other STAs in the BSS; (c) gaining access to the channel and communicating that an upcoming TXOP is available to be shared by broadcasting a message from the STA as TXOP holder to other STAs in the BSS, or by communicating to the AP the that STA as TXOP holder is willing to share the TXOP with other STAs; (d) exchanging messages with other STAs in the BSS, either directly to the TXOP holder or indirectly through the AP, in determining which STAs in the BSS are requesting time in the upcoming TXOP which is available to be shared; (e) sending messages from the TXOP holder, or through the AP, to STAs that will share the TXOP with the STA informing them of the duration and time of channel access for the upcoming TXOP which is being shared; and (f) wherein said method is performed by a processor executing instructions stored on a non-transitory medium; and (G) wherein said method is performed by a processor executing instructions stored on a non-transitory medium.

5. A method for wireless network communications, comprising: (a) performing wireless communication over at least one channel of a local area network (WLAN) with other wireless stations (STAs) and Access Points (APs) in its reception area to support communicating using a Transmit Opportunity (TXOP) protocol; (b) obtaining a TXOP in a wireless LAN network sharing its TXOP with other stations in the same BSS by performing the following steps: (b)(i) exchanging messages with the AP to inform and/or gain approval of sharing its TXOP with other STAs; (b)(ii) broadcasting a message to other STAs in the BSS, upon gaining access to the channel, to indicate that coming TXOP is available to be shared; (b)(iii) exchanging messages with other STAs in the BSS to know which STAs are requesting time in the TXOP open for sharing; and (b)(iv) sending messages to STAs that will share the TXOP with the STA to inform them of the duration and time when the channel access will happen (occur); and (c) wherein said method is performed by a processor executing instructions stored on a non-transitory medium.

6. A method for wireless network communications, comprising: (a) performing wireless communication over at least one channel of a local area network (WLAN) with other wireless stations (STAs) and Access Points (APs) in its reception area to support communicating using a Transmit Opportunity (TXOP) protocol; (b) a station obtaining a TXOP in a wireless LAN network sharing its TXOP with other stations in the same BSS by performing the following steps: (b)(i) exchanging messages with the AP to inform and/or gain approval of sharing its TXOP with other STAs; (b)(ii) informing the AP that it is willing to share the TXOP, upon gaining access to the channel; (b)(iii) broadcasting a message by the AP to other STAs in the BSS to indicate that the upcoming TXOP is available to be shared; (b)(iv) receiving messages by the AP with other STAs in the BSS to know which STAs are requesting time in the TXOP open for sharing, wherein the AP forwards the responses to the STA offering the TXOP for sharing; and (b)(v) sending a message, by the STA offering the TXOP for sharing, to the AP to inform the STAs sharing the TXOP of the duration and time when the channel access is to occur; and (b)(vi) sending messages by the AP to the STAs sharing the TXOP with all this information; and (c) wherein said method is performed by a processor executing instructions stored on a non-transitory medium.

7. The apparatus or method of any preceding embodiment, wherein said message or messages comprise management frames.

8. The apparatus or method of any preceding embodiment, wherein said management frames comprise association request/response and beacon frames.

9. The apparatus or method of any preceding embodiment, wherein said message indicating that an upcoming TXOP is available to be shared is public and available to other STAs in the BSS.

10. The apparatus or method of any preceding embodiment, wherein said message indicating that an upcoming TXOP is available to be shared comprises RTS-Share and CTS-Share frames communicated between the STA sharing the TXOP and the AP before the beginning of the TXOP.

11. The apparatus or method of any preceding embodiment, wherein said instructions when executed by the processor further perform one or more steps comprising the TXOP holder STA receiving access requests from other STAs to indicate said other STAs are requesting time in the shared TXOP.

12. The apparatus or method of any preceding embodiment, wherein said instructions when executed by the processor further perform one or more steps comprising receiving access requests from other STAs to share the TXOP communicated by the other STAs, and randomly accessing the at least one channel at a predefined or dedicated slot time.

13. The apparatus or method of any preceding embodiment, wherein said instructions when executed by the processor further perform one or more steps comprising receiving access requests from other STAs to share the TXOP by the TXOP holder, polling the other STAs to get their access requests.

14. The apparatus or method of any preceding embodiment, wherein said instructions when executed by the processor further perform one or more steps comprising the TXOP holder STA sending to the other STAs a TXOP access scheduler frame containing a scheduled time and specified duration, in response to which the other STAs can transmit Data to the AP at the scheduled time and for the specified duration.

15. The apparatus or method of any preceding embodiment, wherein said instructions when executed by the processor further perform one or more steps comprising sending a TXOP frame as a TXOP offer frame, TXOP access scheduler frame or broadcast TXOP scheduler frame.

16. The apparatus or method of any preceding embodiment, wherein said instructions when executed by the processor further perform one or more steps comprising using an exchange of management frames between the STA and the AP in communicating said message or messages.

17. The apparatus or method of any preceding embodiment, wherein said management frames comprise association request/response frames and/or beacon frames.

18. The apparatus or method of any preceding embodiment, wherein said message from the TXOP holder STA to the AP that an upcoming TXOP is available to be shared is public and available to other STAs in the BSS.

19. The apparatus or method of any preceding embodiment, wherein said message from the TXOP holder STA to the AP that an upcoming TXOP is available to be shared comprises RTS-Share and CTS-Share frames communicated between the STA sharing the TXOP and the AP before the beginning of the TXOP.

20. The apparatus or method of any preceding embodiment, wherein said instructions when executed by the processor further perform one or more steps comprising the AP receiving access request frames from other STAs to indicate they are requesting time in the shared TXOP, after which the AP performs sending the shared TXOP participant information to the TXOP holder STA.

21. The apparatus or method of any preceding embodiment, wherein said instructions when executed by the processor further perform one or more steps comprising the AP sending a TXOP access scheduler frame with scheduled time and specified duration information to other STAs, in response to which the other STAs can transmit Data to the AP at the scheduled time and for the specified duration.

22. The apparatus or method of any preceding embodiment, wherein said instructions when executed by the processor further perform one or more steps comprising sending a TXOP access scheduler frame as a TXOP offer frame, a TXOP access scheduler frame or a broadcast TXOP scheduler frame.

23. The apparatus or method of any preceding embodiment, wherein said instructions when executed by the processor further perform one or more steps comprising the TXOP holder STA determining which of the other STAs can share its TXOP and the duration and order of access.

24. The apparatus or method of any preceding embodiment, wherein said instructions when executed by the processor further perform one or more steps comprising sharing the TXOP and the duration and order of access in a semi-static way through exchanging messages with the AP and STAs, or directly with the STAs.

25. The apparatus or method of any preceding embodiment, wherein said instructions when executed by the processor further perform one or more steps comprising running a setup procedure by the other STAs to setup the semi-static configurations in which (a) STAs exchange share requests with each other through the AP; (b) the AP forwards the information to all STAs; (c) the STAs exchange configuration and semi-static TXOP sharing schedule with all STAs through the AP; and (d) the AP forwards the information to all STAs.

26. The apparatus or method of any preceding embodiment, wherein said instructions when executed by the processor further perform one or more steps comprising the AP receiving access request frames from other STAs to indicate they are requesting time in the shared TXOP, after which the AP performs sending the shared TXOP participant information to the TXOP holder STA.

27. The apparatus or method of any preceding embodiment, wherein said instructions when executed by the processor further perform one or more steps comprising the AP sending a TXOP access scheduler frame with scheduled time and specified duration information to other STAs, in response to which the other STAs can transmit Data to the AP at the scheduled time and for the specified duration.

28. The apparatus or method of any preceding embodiment, wherein said instructions when executed by the processor further perform one or more steps comprising sending a TXOP access scheduler frame as a TXOP offer frame, a TXOP access scheduler frame or a broadcast TXOP scheduler frame.

29. The apparatus or method of any preceding embodiment, wherein said instructions when executed by the processor further perform one or more steps comprising the TXOP holder STA determining which of the other STAs can share its TXOP and the duration and order of access.

30. The apparatus or method of any preceding embodiment, wherein said instructions when executed by the processor further perform one or more steps comprising sharing them in a semi-static way through exchanging messages with the AP and STAs, or directly with the STAs.

31. The apparatus or method of any preceding embodiment, wherein said instructions when executed by the processor further perform one or more steps comprising running a setup procedure by the other STAs to setup the semi-static configurations in which: (a) STAs exchange share requests with each other through the AP; (b) the AP forwards the information to all STAs; (c) the STAs exchange configuration and semi-static TXOP sharing schedule with all STAs through the AP; and (d) the AP forwards the information to all STAs.

32. The apparatus or method of any preceding embodiment, wherein said instructions when executed by the processor further perform one or more steps comprising following the advertised allocation schedule by the STA sharing its TXOP with the other STAs.

33. The apparatus or method of any preceding embodiment, wherein said instructions when executed by the processor further perform one or more steps comprising detecting the TXOP and starting to transmit in the TXOP at the time and for the duration specified, by a STA which has been allocated time in sharing the TXOP.

34. The apparatus or method of any preceding embodiment, wherein STAs and AP exchange information of TXOP shareability and TXOP access time allocation through the exchange of management frames, including association request/response and beacon frames.

35. The apparatus or method of any preceding embodiment, wherein the RTS-share and the CTS-share frames are implemented to indicate that the coming TXOP is available to be shared, and any other frames exchanged between the STA sharing the TXOP and the AP before the beginning of the TXOP and can be heard by other STAs in the BSS.

36. The apparatus or method of any preceding embodiment, wherein the TXOP holder STA receives access request frames from other STAs to indicate they are requesting time in the shared TXOP.

37. The apparatus or method of any preceding embodiment, wherein the access request sent from the STAs requesting to share the TXOP can be through randomly accessing the channel at a predefined slot times or in a dedicated slot times, and wherein the STA might poll the other STAs to get their responses as well.

38. The apparatus or method of any preceding embodiment, wherein the TXOP holder STA sends TXOP access scheduler frames, selected from TXOP offer frames, TXOP access scheduler frames, and broadcast TXOP scheduler frames, to other STAs, wherein according to the scheduler, other STAs transmit DATA to the AP at the scheduled time and for a specified duration.

39. The apparatus or method of any preceding embodiment, wherein STAs and AP exchange information of TXOP shareability and TXOP access time allocation through the exchange of management frames, which may include association request/response and beacon frames.

40. The apparatus or method of any preceding embodiment, wherein the RTS-share and the CTS-share frames are implemented to indicate that the coming TXOP is available to be shared, wherein any other frames exchanged between the STA sharing the TXOP and the AP before the beginning of the TXOP, and which can be heard by other STAs in the BSS.

41. The apparatus or method of any preceding embodiment, wherein the AP receives access request frames from other STAs to indicate they are requesting time in the shared TXOP, and the AP will send the shared TXOP participant information to the TXOP holder STA.

42. The apparatus or method of any preceding embodiment, wherein after receiving the TXOP access scheduler information, including Request TXOP access scheduler frame, from the TXOP holder STA, the AP sends TXOP access scheduler frame, including TXOP offer frame, TXOP access scheduler frame and broadcast TXOP scheduler frame, to other STAs; and wherein according to the scheduler, other STAs transmit DATA to AP at the scheduled time and for a specified duration.

43. The apparatus or method of any preceding embodiment, wherein the STA can decide on the STAs accessing its TXOP and the duration and order of access in a semi-static way through exchanging messages with the AP and STAs or directly with the STAs.

44. The apparatus or method of any preceding embodiment, wherein the STA can decide on the STAs accessing its TXOP and the duration and order of access in a semi-static way through exchanging messages with the AP and STAs or directly with the STAs.

45. The apparatus or method of any preceding embodiment, wherein the STAs runs a setup procedure to setup the semi-static configurations: (a) STAs exchange share request with each others through the AP; (b) the AP forwards the information to all STAs; (c) STAs exchange the configuration, semi-static TXOP sharing schedule with all STAs through the AP; and (d) the AP forwards the information to all STAs.

46. The apparatus or method of any preceding embodiment, wherein a STA sharing its TXOP with other STAs follows the advertised allocation schedule.

48. The apparatus or method of any preceding embodiment, wherein a STA allocated some time in the STA sharing its TXOP, upon detecting a TXOP for that STA start using the TXOP at the advertised time for the advertised duration.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

AccessRequestType subfield values

| Bit 4 | Bit 5 | Meaning |
|---|---|---|
| 0 | 0 | Random access slot allocation |
| 0 | 1 | Dedicated access slot allocation |
| 1 | 0 | Dedicated transmission access allocation |
| 1 | 1 | Reserved |

TABLE 2

RTS/CTS Share Frame Duration Field Encoding

| Bits 0-13 | Bit 14 | Bit 15 | Usage |
|---|---|---|---|
| 0-32, 767 |  | 0 | Duration (uS) of all frames* |
| 0 | 0 | 1 | Fixed value under point coordination function (PCF) within frames transmitted during CFP |
| 1-16, 383 | 0 | 1 | Reserved |
| 0 | 1 | 1 | Reserved |
| 1-2007 | 1 | 1 | AID in PS-Poll Frames |
| 2008-16, 383 | 1 | 1 | Reserved |

*Except PS-Poll frame transmitted during CP, or frames transmitted during CFP using HCF

What is claimed is:

1. An apparatus for wireless communication in a network, the apparatus comprising:
   (a) a wireless communication circuit, as a wireless station (STA), configured for wirelessly communicating over at least one channel with other wireless stations (STAs) on a local area network (WLAN) in its reception area;
   (b) a processor coupled to said wireless communication circuit within a station configured for operating on the WLAN as a station configured to support communicating using a Transmit Opportunity (TXOP) protocol;
   (c) a non-transitory memory storing instructions executable by the processor for the station sharing its TXOP with other stations in the same Basic Service Set (BSS); and
   (d) wherein said instructions, when executed by the processor, perform one or more steps comprising:
      (i) exchanging messages, from a non-access point (non-AP) STA which has obtained the TXOP, with an access point (AP) of the basic service set (BSS) informing and/or gaining approval for sharing its TXOP with other non-AP STAs in the BSS;
      (ii) gaining access to the channel by the non-AP STA and communicating that an upcoming TXOP is available to be shared by broadcasting a message from the non-AP STA as TXOP holder to other STAs in the BSS, or by communicating to the AP indicating that the non-AP STA as TXOP holder is willing to share the TXOP with other STAs;
      (iii) exchanging messages with other STAs in the BSS, in a coordination process for the non-AP STA to share its TXOP, either directly to the TXOP holder or indirectly through the AP, in determining which STAs in the BSS are requesting time in the upcoming TXOP which is available to be shared;
      (iv) sending messages from the TXOP holder, or through the AP, to STAs that will share the TXOP with the STA informing them of the duration and time of channel access for the upcoming TXOP which is being shared; and
      (v) sending data and sharing its TXOP by the non-AP STA TXOP holder, without needing to wait for a trigger frame from the AP of the BSS.

2. An apparatus for wireless communication in a network, the apparatus comprising:
   (a) a wireless communication circuit, as a wireless station (STA), configured for wirelessly communicating over at least one channel with other wireless stations (STAs) on a local area network (WLAN) in its reception area;
   (b) a processor coupled to said wireless communication circuit within a station configured for operating on the WLAN as a station configured to support communicating using a Transmit Opportunity (TXOP) protocol;
   (c) a non-transitory memory storing instructions executable by the processor for the station sharing its TXOP with other stations in the same Basic Service Set (BSS); and
   (d) wherein said instructions, when executed by the processor, perform one or more steps comprising:
      (i) exchanging messages, from a non-access point (non-AP) STA which has obtained the TXOP, with an access point (AP) of the basic service set (BSS) informing and/or gaining approval for sharing its TXOP with other non-AP STAs in the BSS;
      (ii) broadcasting a message from the non-AP STA as TXOP holder to other STAs in the BSS, after gaining access to the channel, wherein the message indicates that an upcoming TXOP is available to be shared;
      (iii) exchanging messages, by the non-AP STA as TXOP holder, with other STAs in the BSS, in a coordination process to share its TXOP, in determining which STAs in the BSS are requesting time in the upcoming TXOP which is available to be shared;
      (iv) sending messages, from the non-AP station to STAs that will share the TXOP with the STA informing them of the duration and time of channel access for the upcoming TXOP which is being shared by the non-AP STA; and
      (v) sending data and sharing its TXOP by the non-AP STA TXOP holder, without needing to wait for a trigger frame from the AP of the BSS.

3. The apparatus of claim 2, wherein said message or messages in element (d)(i) through (d)(iv) are communicated through utilizing management frames.

4. The apparatus of claim 3, wherein said management frames comprise association request/response and beacon frames.

5. The apparatus of claim 2, wherein said message indicating that an upcoming TXOP is available to be shared is public and available to other STAs in the BSS.

6. The apparatus of claim 2, wherein said message indicating that an upcoming TXOP is available to be shared comprises RTS-Share and CTS-Share frames communicated between the STA sharing the TXOP and the AP before the beginning of the TXOP.

7. The apparatus of claim 2, wherein said instructions when executed by the processor further perform one or more steps comprising the TXOP holder STA receiving access requests from other STAs to indicate that said other STAs are requesting time in the shared TXOP.

8. The apparatus of claim 2, wherein said instructions when executed by the processor further perform one or more steps comprising receiving access requests from other STAs to share the TXOP communicated by the other STAs, and randomly accessing the at least one channel at a predefined or dedicated slot time.

9. The apparatus of claim 2, wherein said instructions when executed by the processor further perform one or more steps comprising receiving access requests from other STAs to share the TXOP by the TXOP holder, polling the other STAs to get their access requests.

10. The apparatus of claim 2, wherein said instructions when executed by the processor further perform one or more steps comprising the TXOP holder STA sending to the other STAs a TXOP access scheduler frame containing a scheduled time and specified duration, in response to which the other STAs can transmit Data to the AP at the scheduled time and for the specified duration.

11. The apparatus of claim 2, wherein said instructions when executed by the processor further perform one or more steps comprising sending a TXOP frame as a TXOP offer frame, TXOP access scheduler frame or broadcast TXOP scheduler frame.

12. An apparatus for wireless communication in a network, the apparatus comprising:
  (a) a wireless communication circuit, as a wireless station (STA), configured for wirelessly communicating over at least one channel with other wireless stations (STAs) on a local area network (WLAN) in its reception area;
  (b) a processor coupled to said wireless communication circuit within a station configured for operating on the WLAN as a station configured to support communicating using a Transmit Opportunity (TXOP) protocol;
  (c) a non-transitory memory storing instructions executable by the processor for the station sharing its TXOP with other stations in the same Basic Service Set (BSS); and
  (d) wherein said instructions, when executed by the processor, perform one or more steps comprising:
    (i) exchanging messages, from a non-access point (non-AP) STA which has obtained the TXOP, with an access point (AP) of the basic service set (BSS) informing and/or gaining approval for sharing its TXOP with other non-AP STAs in the BSS;
    (ii) gaining access to the channel by the non-AP STA and communicating a message from the non-AP STA as TXOP holder to the AP that an upcoming TXOP is available to be shared;
    (iii) receiving messages by the AP from other STAs in the BSS which are requesting to share time in the upcoming TXOP, these messages being forwarded by the AP to the non-AP STA as TXOP holder;
    (iv) sending messages from the non-AP STA as TXOP holder to the AP with information on duration and time when the channel access is to occur, with the AP sending messages for sharing this duration and time information with STAs that will share the TXOP, so that these other STAs can share the channel at the time and for the duration specified; and
    (v) sending data and sharing its TXOP by the non-AP STA TXOP holder, without needing to wait for a trigger frame from the AP of the BSS.

13. The apparatus of claim 12, wherein said message or messages in element (d)(i) through (d)(iv) are communicated through utilizing management frames.

14. The apparatus of claim 13, wherein said management frames comprise association request/response frames and/or beacon frames.

15. The apparatus of claim 12, wherein said message from the TXOP holder STA to the AP that an upcoming TXOP is available to be shared is public and available to other STAs in the BSS.

16. The apparatus of claim 12, wherein said message from the TXOP holder STA to the AP that an upcoming TXOP is available to be shared comprises RTS-Share and CTS-Share frames communicated between the STA sharing the TXOP and the AP before the beginning of the TXOP.

17. The apparatus of claim 12, wherein said instructions when executed by the processor further perform one or more steps comprising the AP receiving access request frames from other STAs to indicate they are requesting time in the shared TXOP, after which the AP performs sending the shared TXOP participant information to the TXOP holder STA.

18. The apparatus of claim 12, wherein said instructions when executed by the processor further perform one or more steps comprising the AP sending a TXOP access scheduler frame with scheduled time and specified duration information to other STAs, in response to which the other STAs can transmit Data to the AP at the scheduled time and for the specified duration.

19. The apparatus of claim 18, wherein said instructions when executed by the processor further perform one or more steps comprising sending a TXOP access scheduler frame as a TXOP offer frame, a TXOP access scheduler frame or a broadcast TXOP scheduler frame.

20. The apparatus of claim 12, wherein said instructions when executed by the processor further perform one or more steps comprising the TXOP holder STA determining which of the other STAs can share its TXOP and the duration and order of access.

21. The apparatus of claim 20, wherein said instructions when executed by the processor further perform one or more steps comprising sharing the TXOP in a semi-static way through exchanging messages with the AP and STAs, or directly with the STAs.

22. The apparatus of claim 21, wherein said instructions when executed by the processor further perform one or more steps comprising running a setup procedure by the other STAs to setup the semi-static configurations in which (a) STAs exchange share requests with each other through the AP; (b) the AP forwards the information to all STAs; (c) the STAs exchange configuration and semi-static TXOP sharing schedule with all STAs through the AP; and (d) the AP forwards the information to all STAs.

23. The apparatus of claim 12, wherein said instructions when executed by the processor further perform one or more steps comprising following the advertised allocation schedule by the STA sharing its TXOP with the other STAs.

24. The apparatus of claim 12, wherein said instructions when executed by the processor further perform one or more steps comprising detecting the TXOP and starting to transmit in the TXOP at the time and for the duration specified, by a STA which has been allocated time in sharing the TXOP.

25. A method for performing wireless communication in a network, the apparatus comprising:
  (a) performing wireless communication over at least one channel of a local area network (WLAN) with other wireless stations (STAs) and access points (APs) in its reception area to support communicating using a Transmit Opportunity (TXOP) protocol;
  (b) a non-AP STA sharing its TXOP with other stations in the same Basic Service Set (BSS) by exchanging messages with an access point (AP) of the basic service set (BSS) informing and/or gaining approval for sharing its TXOP with other STAs in the BSS;
(c) gaining access to the channel by the non-AP STA and communicating that an upcoming TXOP is available to be shared by broadcasting a message from the non-AP STA as TXOP holder to other STAs in the BSS, or by communicating to the AP that the non-AP STA as TXOP holder is willing to share the TXOP with other STAs;
(d) exchanging messages with other STAs in the BSS, in a coordination process for the non-AP STA to share its TXOP, either directly to the TXOP holder or indirectly through the AP, in determining which STAs in the BSS are requesting time in the upcoming TXOP which is available to be shared;
(e) sending messages from the TXOP holder, or through the AP, to STAs that will share the TXOP of the non-AP STA with the STA informing them of the duration and time of channel access for the upcoming TXOP which is being shared;
(f) sending data and sharing its TXOP by the non-AP STA TXOP holder, without needing to wait for a trigger frame from the AP of the BSS; and
(g) wherein said method is performed by a processor executing instructions stored on a non-transitory medium.

* * * * *